(12) United States Patent
Silverbrook et al.

(10) Patent No.: US 7,891,548 B2
(45) Date of Patent: Feb. 22, 2011

(54) PRINTER HAVING STRAIGHT MEDIA PATH

(75) Inventors: Kia Silverbrook, Balmain (AU); Tobin Allen King, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 12/506,241

(22) Filed: Jul. 20, 2009

(65) Prior Publication Data

US 2009/0279931 A1  Nov. 12, 2009

Related U.S. Application Data

(63) Continuation of application No. 12/138,359, filed on Jun. 12, 2008, now Pat. No. 7,575,151, which is a continuation of application No. 11/738,518, filed on Apr. 23, 2007, now Pat. No. 7,398,916, which is a continuation of application No. 11/248,435, filed on Oct. 13, 2005, now Pat. No. 7,222,780, which is a continuation of application No. 10/296,535, filed as application No. PCT/AU00/00517 on May 24, 2000, now Pat. No. 7,070,098.

(51) Int. Cl.
 *G06F 17/00* (2006.01)
(52) U.S. Cl. ............ 235/375; 400/613.2; 400/625; 283/38
(58) Field of Classification Search ......... 235/375; 400/613.2, 625; 283/38
See application file for complete search history.

(56) References Cited

U.S. PATENT DOCUMENTS 4,754,127 A   6/1988  Brass et al.
4,896,353 A   1/1990  Dehgani et al.
5,006,002 A   4/1991  Brodbeck
5,333,908 A   8/1994  Dorney et al.
5,465,213 A  11/1995  Ross
5,477,012 A  12/1995  Sekendur
5,652,412 A   7/1997  Lazzouni et al.
5,661,506 A   8/1997  Lazzouni et al.
5,685,529 A  11/1997  McFarland
5,726,435 A   3/1998  Hara et al.
6,120,201 A   9/2000  McKay et al.
6,231,043 B1  5/2001  James et al.
6,236,463 B1  5/2001  Cyman et al.
6,549,997 B2  4/2003  Kalyanasundharam
6,622,999 B1  9/2003  King et al.
6,644,642 B1 11/2003  King et al.
6,669,385 B1 12/2003  King et al.
6,705,603 B1  3/2004  Kirino et al.
6,757,437 B1  6/2004  Keith et al.
6,961,134 B1 11/2005  Hanna
2001/0033611 A1 10/2001  Grimwood et al.
2001/0055124 A1 12/2001  Varga
2002/0047233 A1  4/2002  Coombs et al.
2005/0061882 A1  3/2005  Walmsley et al.

FOREIGN PATENT DOCUMENTS

AU      94090/98 A    6/1999

(Continued)

*Primary Examiner*—Allyson N Trail

(57) ABSTRACT

A printer is provided having a media path along which media is transported, at least one pagewidth printhead arranged to print on the media on the media path, and a binder arranged on the media path for binding the printed media. The printhead and the binder are arranged so that the media path is substantially straight.

7 Claims, 52 Drawing Sheets

FOREIGN PATENT DOCUMENTS

| | | |
|---|---|---|
| EP | 0932299 A | 7/1999 |
| JP | 08-256255 | 10/1996 |
| JP | 09-164739 | 6/1997 |
| JP | 10-224540 | 8/1998 |
| WO | WO 96/32261 A | 10/1996 |
| WO | WO 96/32263 A | 10/1996 |
| WO | WO 96/32813 A | 10/1996 |
| WO | WO 99/19823 | 4/1999 |
| WO | WO 99/50787 A | 10/1999 |

PRINTER HAVING STRAIGHT MEDIA PATH

CROSS-REFERENCE TO RELATED APPLICATION

This application is a continuation of U.S. application Ser. No. 12/138,359 filed Jun. 12, 2008, which is a application is a continuation of U.S. application Ser. No. 11/738,518 filed on Apr. 23, 2007, now issued U.S. Pat. No. 7,398,916, which is a continuation of U.S. application Ser. No. 11/248,435 filed on Oct. 13, 2005, now issued U.S. Pat. No. 7,222,780, which is a continuation of U.S. application Ser. No. 10/296,535 filed on Nov. 23, 2002, now issued U.S. Pat. No. 7,070,098, which is a national phase (371) of PCT/AU00/00517, filed on May 24, 2000 all of which are herein incorporated by reference.

FIELD OF INVENTION

The present invention relates generally to methods, systems and apparatus for interacting with computers.

In more specific terms, the present invention relates to the formatting of a coded tag, a tag to be added to a printed page during the printing of the page, and a tag encoder to effect the production of tags in accordance with the format. The tag encoder is particularly able to be implemented in a print engine/controller by which to produce printed pages incorporating tags, along with other graphic and textual matter.

The invention has been developed primarily to allow a large number of distributed users to interact with networked information via printed matter and optical sensors, thereby to obtain interactive printed matter on demand via high-speed networked color printers. Although the invention will largely be described herein with reference to this use, it will be appreciated that the invention is not limited to use in this field.

CO-PENDING APPLICATIONS

Various methods, systems and apparatus relating to the present invention are disclosed in the following co-pending applications filed by the applicant or assignee of the present invention simultaneously with the present application:

PCT/AU00/00518, PCT/AU00/00519, PCT/AU00/00520, PCT/AU00/00521, PCT/AU00/00522, PCT/AU00/00523, PCT/AU00/00524, PCT/AU00/00525, PCT/AU00/00526, PCT/AU00/00527, PCT/AU00/00528, PCT/AU00/00529, PCT/AU00/00530, PCT/AU00/00531, PCT/AU00/00532, PCT/AU00/00533, PCT/AU00/00534, PCT/AU00/00535, PCT/AU00/00536, PCT/AU00/00537, PCT/AU00/00538, PCT/AU00/00539, PCT/AU00/00540, PCT/AU00/00541, PCT/AU00/00542, PCT/AU00/00543, PCT/AU00/00544, PCT/AU00/00545, PCT/AU00/00547, PCT/AU00/00546, PCT/AU00/00554, PCT/AU00/00556, PCT/AU00/00557, PCT/AU00/00558, PCT/AU00/00559, PCT/AU00/00560, PCT/AU00/00561, PCT/AU00/00562, PCT/AU00/00563, PCT/AU00/00564, PCT/AU00/00565, PCT/AU00/00566, PCT/AU00/00567, PCT/AU00/00568, PCT/AU00/00569, PCT/AU00/00570, PCT/AU00/00571, PCT/AU00/00572, PCT/AU00/00573, PCT/AU00/00574, PCT/AU00/00575, PCT/AU00/00576, PCT/AU00/00577, PCT/AU00/00578, PCT/AU00/00579, PCT/AU00/00581, PCT/AU00/00580, PCT/AU00/00582, PCT/AU00/00587, PCT/AU00/00588, PCT/AU00/00589, PCT/AU00/00583, PCT/AU00/00593, PCT/AU00/00590, PCT/AU00/00591, PCT/AU00/00592, PCT/AU00/00584, PCT/AU00/00585, PCT/AU00/00586, PCT/AU00/00594, PCT/AU00/00595, PCT/AU00/00596, PCT/AU00/00597, PCT/AU00/00598, PCT/AU00/00516, PCT/AU00/00511, PCT/AU00/00501, PCT/AU00/00502, PCT/AU00/00503, PCT/AU00/00504, PCT/AU00/00505, PCT/AU00/00506, PCT/AU00/00507, PCT/AU00/00508, PCT/AU00/00509, PCT/AU00/00510, PCT/AU00/00512, PCT/AU00/00513, PCT/AU00/00514, PCT/AU00/00515

The disclosures of these co-pending applications are incorporated herein by cross-reference.

BACKGROUND

Paper is widely used to display and record information. Printed information is easier to read than information displayed on a computer screen. Hand-drawing and handwriting afford greater richness of expression than input via a computer keyboard and mouse. Moreover, paper doesn't run on batteries, can be read in bright light, more robustly accepts coffee spills, and is portable and disposable.

Online publication has many advantages over traditional paper-based publication. From a consumer's point of view, information is available on demand, information can be navigated via hypertext links, searched and automatically personalized.

From the publisher's point of view, the costs of printing and physical distribution are eliminated, and the publication becomes more attractive to the advertisers who pay for it because it can be targeted to specific demographics and linked to product sites.

Online publication also has disadvantages. Computer screens are inferior to paper. At the same quality as a magazine page, an SVGA computer screen displays only about a fifth as much information. Both CRTs and LCDs have brightness and contrast problems, particularly when ambient light is strong, while ink on paper, being reflective rather than emissive, is both bright and sharp in ambient light.

SUMMARY OF THE INVENTION

In one form the invention resides in a printed page tag encoder comprising:
an input at which to receive a tag structure template;
an input at which to receive fixed data bits;
an input at which to receive variable data bit records; and
a tag dot generator outputting single bits depending on position in the tag defined by the tag structure template and said fixed and said variable data.

A print engine/controller that includes the present tag encoder preferably uses a high speed serial interface at which to receive compressed page data. Page data may include contone image planes that are decoded by a JPEG decoder and they may be scaled in the halftoner/compositor under control of a margin unit. A bi-level image plane may be decoded by a Group 4 facsimile decoder and it also can be scaled in the halftoner/compositor under control of the margin unit. A preferably infrared tag encoder within the print engine/controller serves to produce infrared data line by line in step with processing of the image planes so as to place infrared ink printed tags into a printed page.

The purpose of the tag encoder is to place tags over the printed page in such as way that they can be read at some later time by a suitable pen or equivalent device. Each tag can be a 2D package of data (although the tag may be printed on an arbitrary shaped surface) that is to be written out and able to read later. Typically there will some data to be stored in the package that is written to the page, although sometimes the mere presence of the package of data (our tag) is information in itself. With the present tag encoder it is desired to write out lots of these packets of data all over the page. The generation of these packets is controlled in any or all of size, structure, and how the data is stored inside. The tag encoder and the Tag Format Structure (described below) gives this control.

The Tag Format Structure allows the tag designer to specify for a given tag which dots are printed as part of the physical printed tag structure and which dots are to be derived from the data. The data part of a tag is broken into variable and fixed portions. The fixed portions are the same data for each and every tag on the page, while the variable portions are specified for each tag. One limit case might be that all the data is variable, but just happens to contain the same value, thus making the data effectively fixed. Rather than force the user of the print engine/controller (PEC) to supply data for each and every tag always we allow the possibility of having fixed data for each tag. Exactly what data is in the tag will be completely application specific. One page may have tags that contain X/Y coordinate of the tag as the variable data, and a page id as the fixed data component. A page interactive pen (or equivalent) could subsequently read those coordinates back from tags on the page and perform actions depending on the position on the page. A different page may have fixed data over the entire page so that no matter where the pen clicks on the page, the same data will be returned. Another page may simply have giant tags over the page as a form of watermark—the mere presence of the tag is enough. The fixed data and variable data can be anything—as long as the reading application can extract the data from the read tag and then interpret the data it is useful.

The structure of the tag is user-definable to enable different applications build appropriate structures to hold their data. Ideally a tag has some structure to help the locating software (in the pen) detect it, and some orientation features to enable the data bits to be extracted correctly. Finally, the data embedded in the tag should be redundantly encoded to allow the reading equipment (the pen) to correct errors due to dust, grime, dirt, reading noise etc.

The tag is defined in terms of 1600 dpi dots to enable nicely shaped tag structures. However it is not useful at present to print data dots on to a page where each data dot is represented by a single printed dot. The error introduced in the reading environment would be too severe. You would need at least a 3200 dpi scanner in the pen to be able to get the 1600 dpi dots back again. Consequently a tag designer will typically cluster a number of physical printed dots on the page to represent a single data dot. This cluster of printed dots is referred to as a macrodot since it represents a single logical dot, and is clustered together to ease dot detection and decoding algorithms in the reading device. Since the Tag Format Structure allows any output dot within a tag to come from any data bit the size and shape of a macrodot is completely arbitrary. The tag designer will design the macrodot based upon the reading and optical capabilities of the pen.

A Tag Encoder should ideally be capable of printing tags in landscape and portrait modes. A single Tag Format Structure that is internally rotated by the Tag Encoder is one way of doing it, but in our Tag Encoder we simply have the Tag Encoder read a pre-rotated Tag Format Structure to save the bother of rotating it ourselves.

Finally, in terms of placement of tags on a page, placing tags in a triangular grid is better than on a rectangular grid in terms of ink usage. Triangular grids are also convenient when placing tags on an arbitrarily curved surface, although our particular tag encoder only copes with rectangular planes. Thus the same tag interactive pen can read tags printed on other surfaces.

The tag encoder typically requires the presence of IR ink at the print head although other inks such as K might be used for tags in limited circumstances.

The tag encoder works to effect tag generation at speed, in step with whatever other image planes are being worked. It achieves speed by working with a predefined tag format into which fixed and variable components of a tag are fed to generate tags dot by dot delivering them line by line to a compositor as image planes are composited. It can encode fixed data for the page being printed, together with specific variable tag data values, into an error-correctable encoded tag which is subsequently printed, usually in infrared, or sometimes in black ink on the page. The tag encoder ideally regularly locates tags on a page, ideally placing tags on a preferably triangular grid. Those skilled in the art will recognise that other tag arrays beside triangular might be used. The tag encoder allows for both landscape and portrait orientations. Basic tag structures are rendered at 1600 dpi, while tag data is encoded as arbitrarily shaped macrodots (with a minimum size of 1 dot at 1600 dpi). The output dot stream might be created in an output order set to match a particular printer, although those skilled in the art will appreciate that other regimes might be evolved. Further, those skilled in the art will appreciate the advantages of use of infrared ink, not visible to the eye but detectable by appropriate sensors, and will realise that other inks may sometimes have a use.

Instead of sending data packages to the print engine/controller (PEC) already encoded, bandwidth to the PEC is reduced by having the PEC do the redundancy encoding. Specifically described is use of Reed-Solomon encoding, but it could equally be any other encoder. The PEC preferably encodes both the fixed and variable parts of the tag data.

The invention defines a template that gives a generic data package that includes dots that are always off, always on, and derived from the encoded data. This allows for development of any of a range of data package definitions, including macrodots of different sizes, large objects to help location, and so forth. Tag structures might be stored in associated DRAM where implementation does not involve fabrication of an all embracing chip. A trivial extension is to have the tag structure on-chip instead of in the external DRAM.

BRIEF DESCRIPTION OF THE DRAWINGS

Preferred and other embodiments of the invention will now be described, by way of non-limiting example only, with reference to the accompanying drawings, in which.

DETAILED DESCRIPTION OF THE PREFERRED EMBODIMENTS

Note: Memjet™ is a trade mark of Silverbrook Research Pty Ltd, Australia.

In the preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
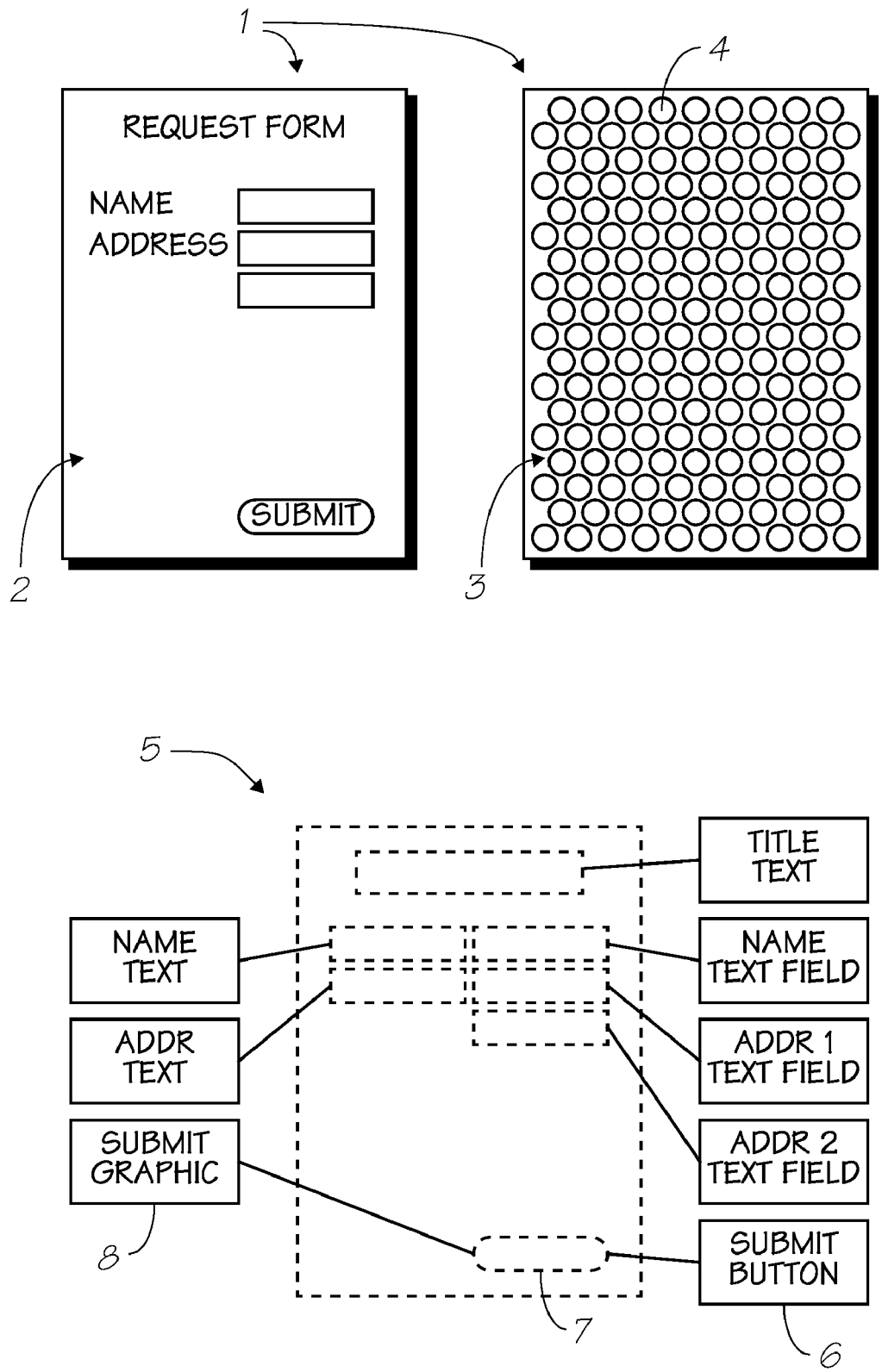
FIG. 1 is a schematic of a the relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
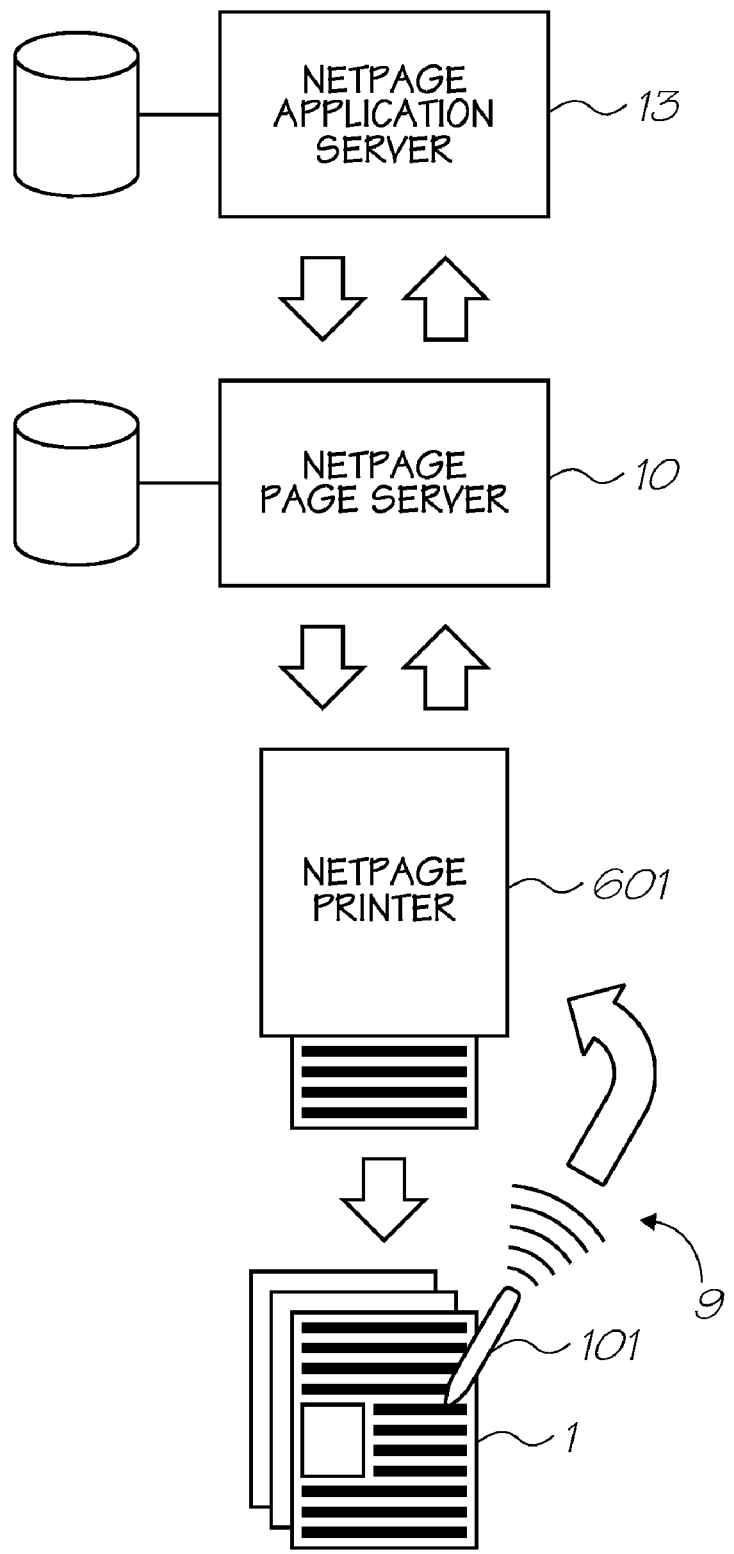
FIG. 2 is a schematic view of a interaction between a netpage pen, a netpage printer, a netpage page server, and a netpage application server.
Figure 8:
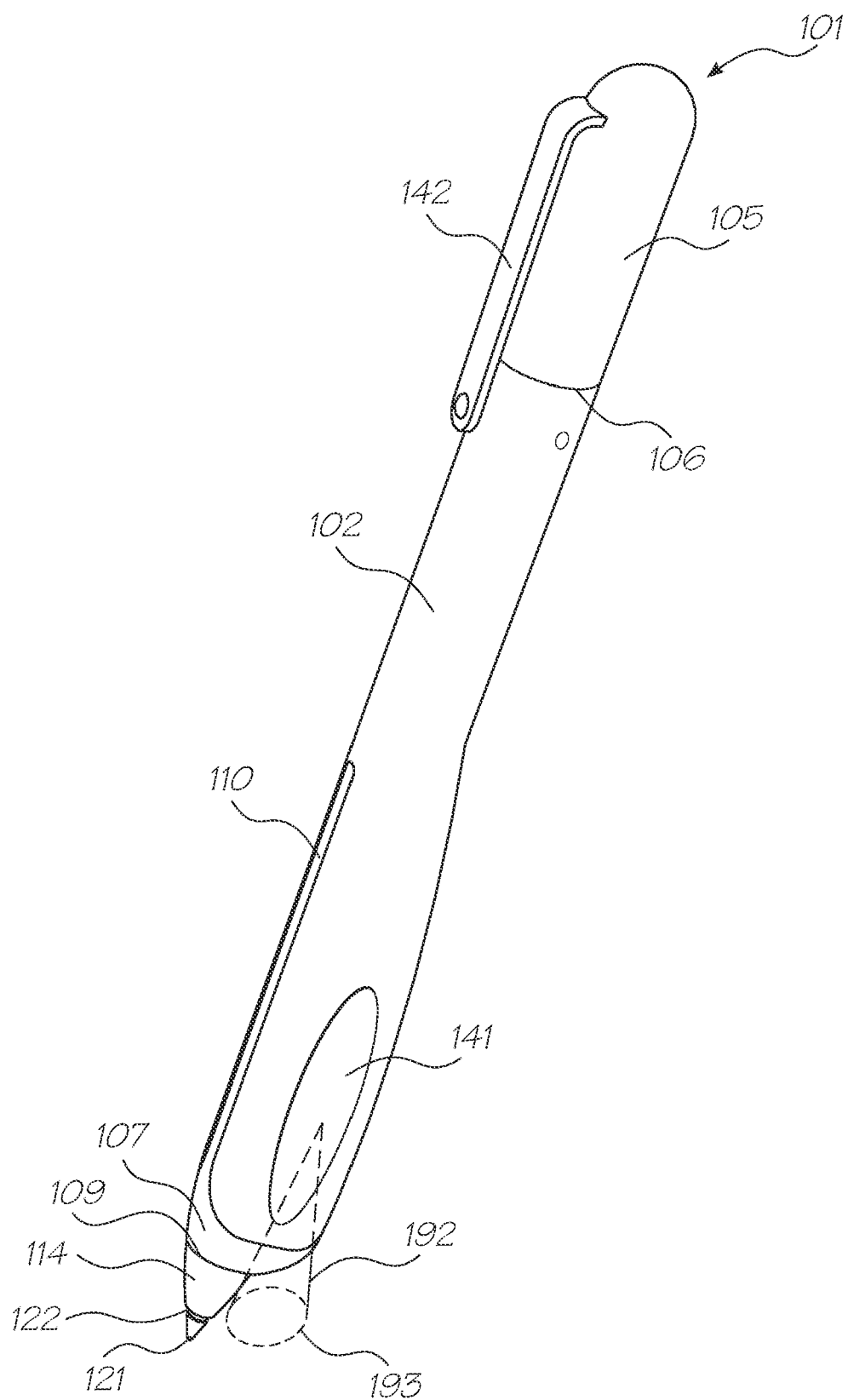
FIG. 8 is a perspective view of a netpage pen and its associated tag-sensing field-of-view cone.
Figure 9:
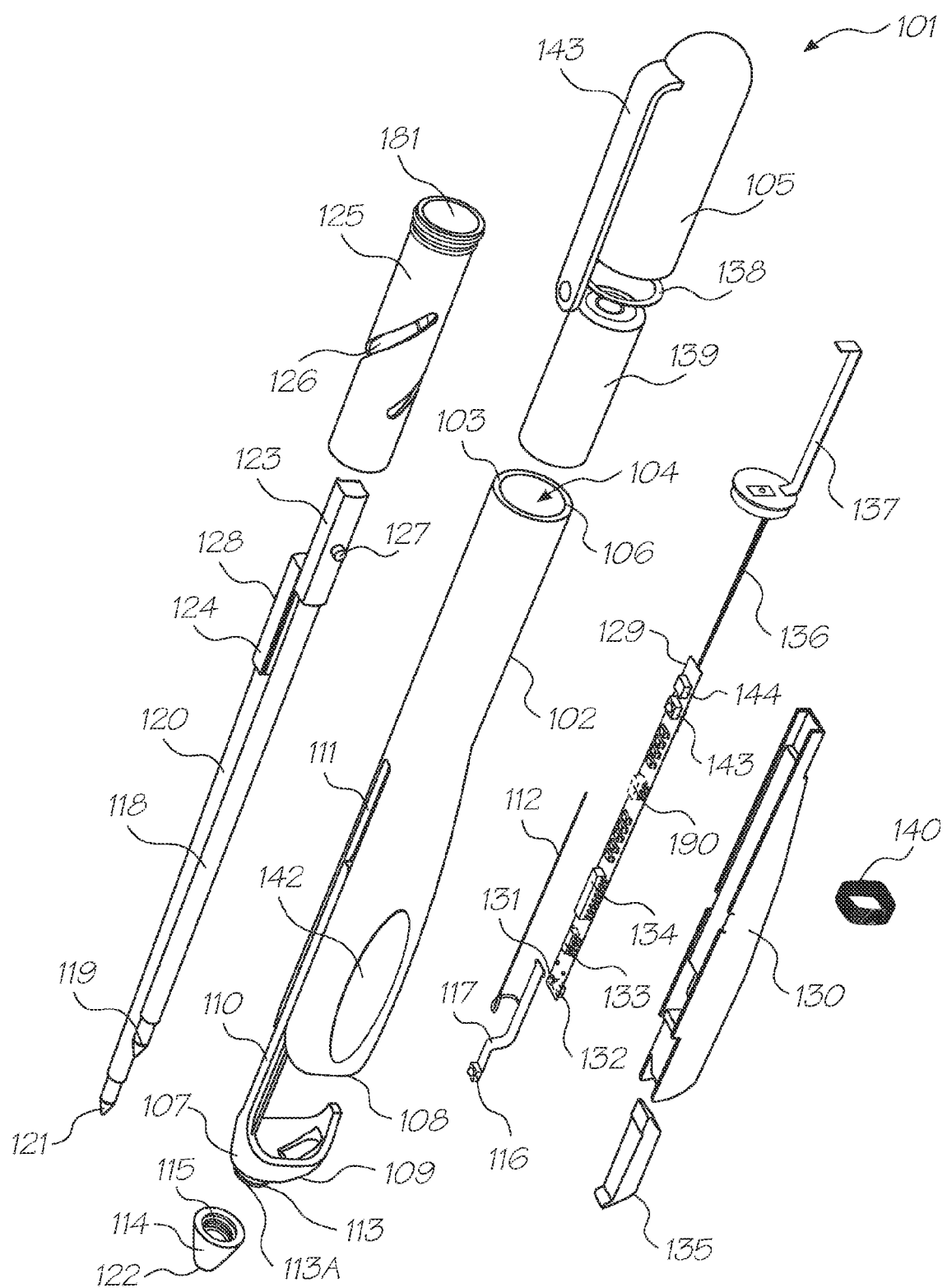
FIG. 9 is a perspective exploded view of the netpage pen shown in FIG. 8.

As illustrated in FIG. 2, the netpage pen 101, a preferred form of which is shown in FIGS. 8 and 9 and described in more detail below, works in conjunction with a netpage printer 601, an Internet-connected printing appliance for home, office or mobile use. The pen is wireless and communicates securely with the netpage printer via a short-range radio link 9.

Figure 11:
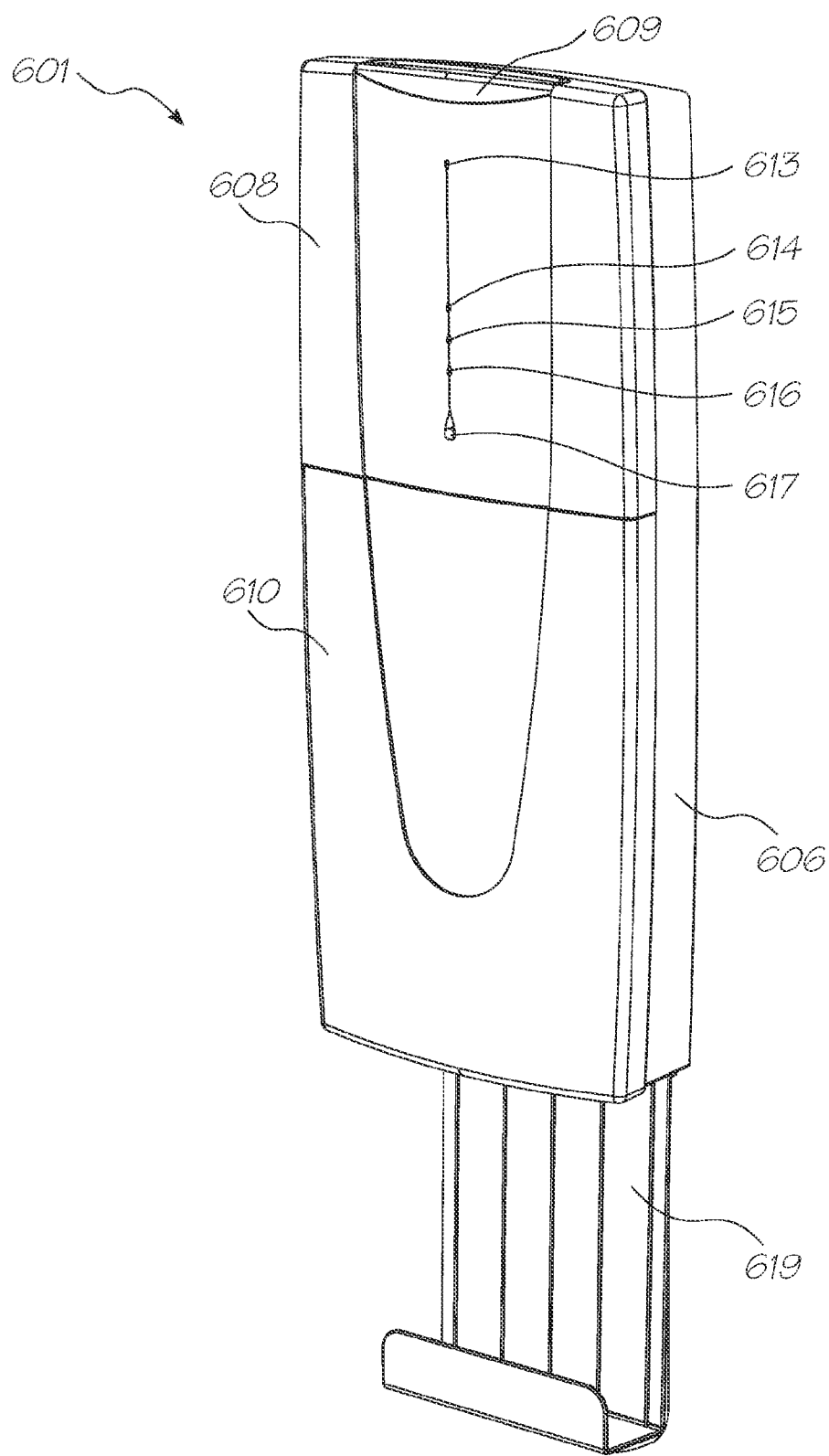
FIG. 11 is a perspective view of a wall-mounted netpage printer.
Figure 12:
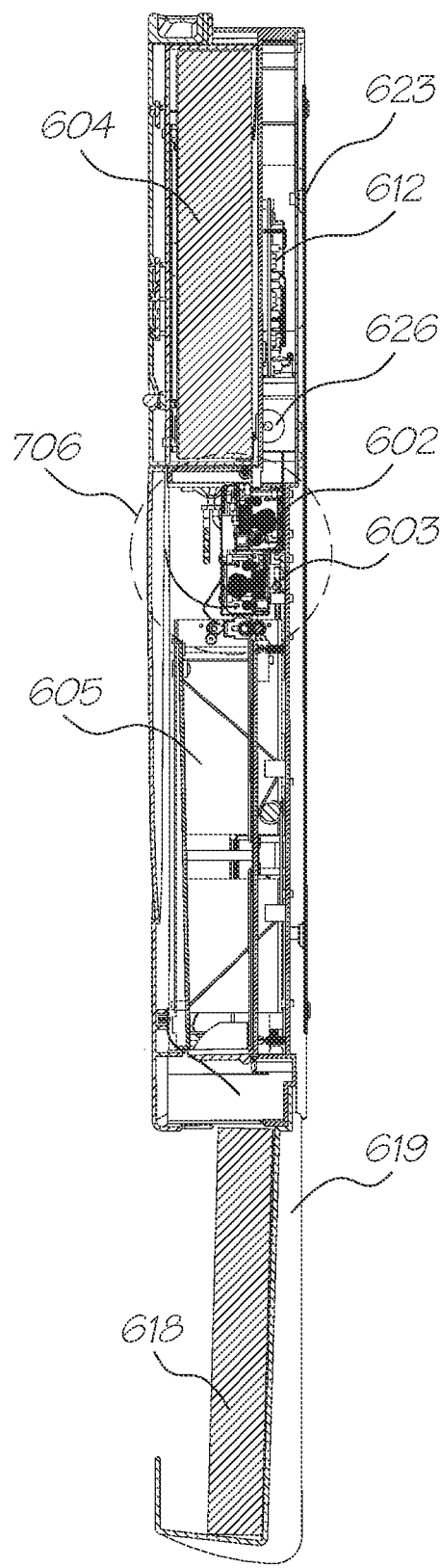
FIG. 12 is a section through the length of the netpage printer of FIG. 11.
Figure 13:
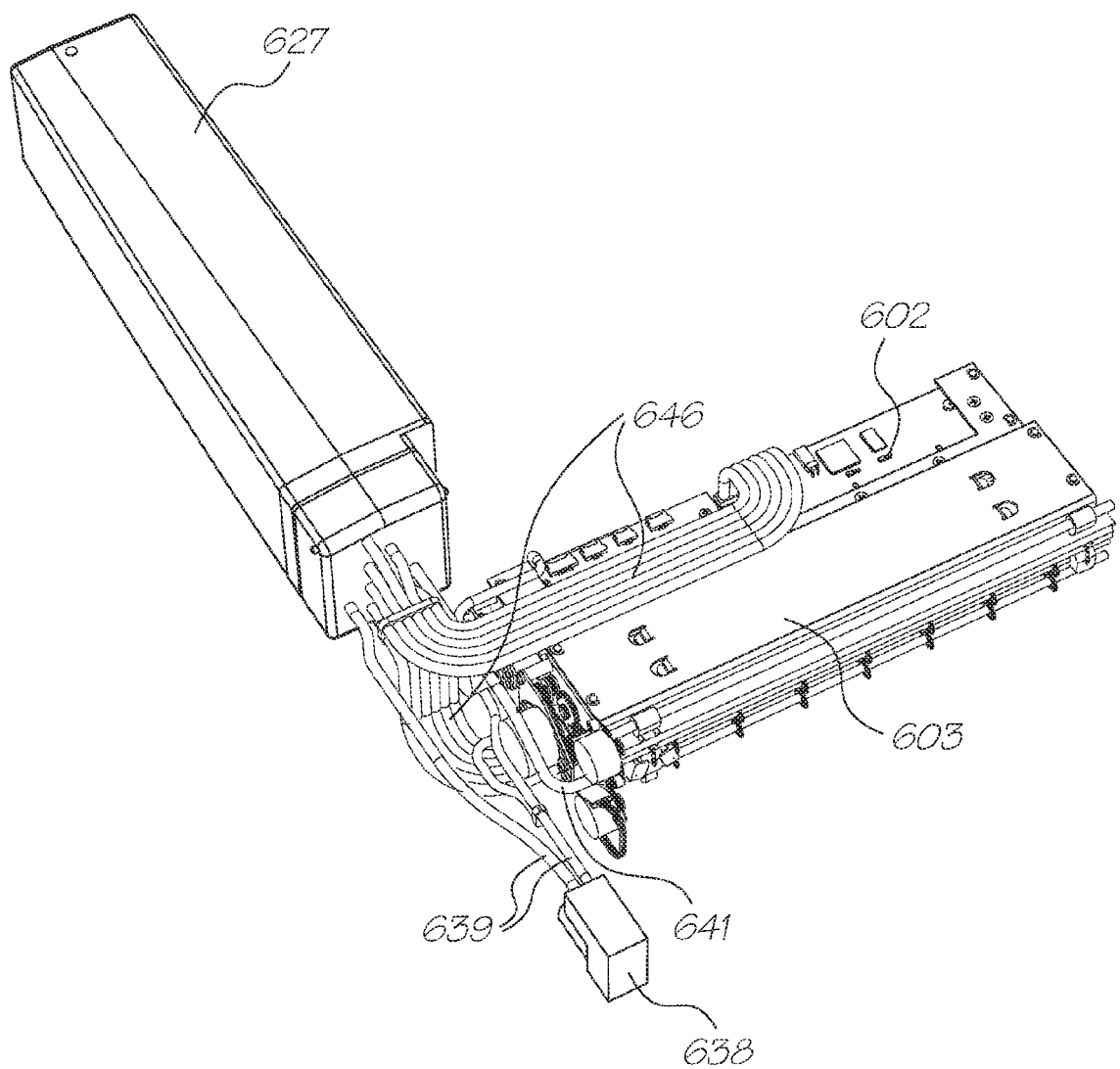
FIG. 13 is a detailed view of the ink cartridge, ink, air and glue paths, and print engines of the netpage printer of FIGS. 11 and 12.

The netpage printer 601, a preferred form of which is shown in FIGS. 11 to 13 and described in more detail below, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. Cable service is available to 95% of households in the United States, and cable modem service offering broadband Internet access is already available to 20% of these. The netpage printer can also operate with slower connections, but with longer delivery times and lower image quality. Indeed, the netpage system can be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or email address.

1 Netpage System Architecture

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. The UML does not directly support second-order modelling—i.e. classes of classes.

Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled.

An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line.

A generalization relationship ("is-a") is drawn as a solid line joining two classes, with an arrow (in the form of an open triangle) at the generalization end.

When a class diagram is broken up into multiple diagrams, any class which is duplicated is shown with a dashed outline in all but the main diagram which defines it. It is shown with attributes only where it is defined.

1.1 Netpages

Netpages are the foundation on which a netpage network is built. They provide a paper-based user interface to published information and interactive services.

A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 4:
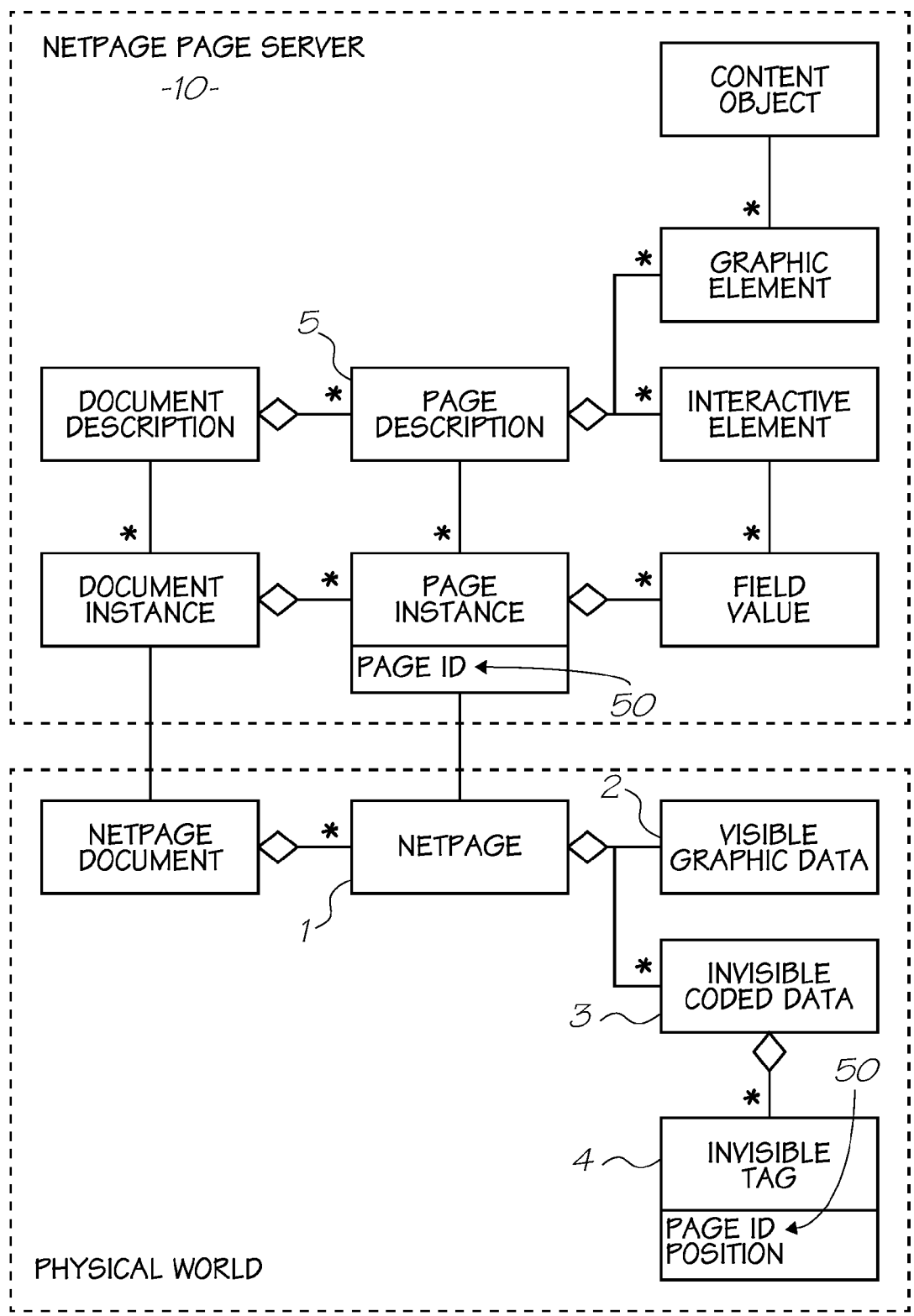
FIG. 4 is a schematic view of a high-level structure of a printed netpage and its online page description.

The relationship between the page description, the page instance, and the printed netpage is shown in FIG. 4. The page instance is associated with both the netpage printer which printed it and, if known, the netpage user who requested it.

1.2 Netpage Tags 1.2.1 Tag Data Content

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

As will be more clearly explained below, in a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

TABLE 1

| Tag data | |
| --- | --- |
| Field | Precision (bits) |
| Region ID | 100 |
| Tag ID | 16 |
| Flags | 4 |
| Total | 120 |

Each tag contains 120 bits of information, typically allocated as shown in Table 1. Assuming a maximum tag density of 64 per square inch, a 16-bit tag ID supports a region size of up to 1024 square inches. Larger regions can be mapped continuously without increasing the tag ID precision simply by using abutting regions and maps. The 100-bit region ID allows 2100 ($\sim 10^{30}$ or a million trillion trillion) different regions to be uniquely identified.

1.2.2 Tag Data Encoding

The 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword.

Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

1.2.3 Physical Tag Structure

Figure 5:
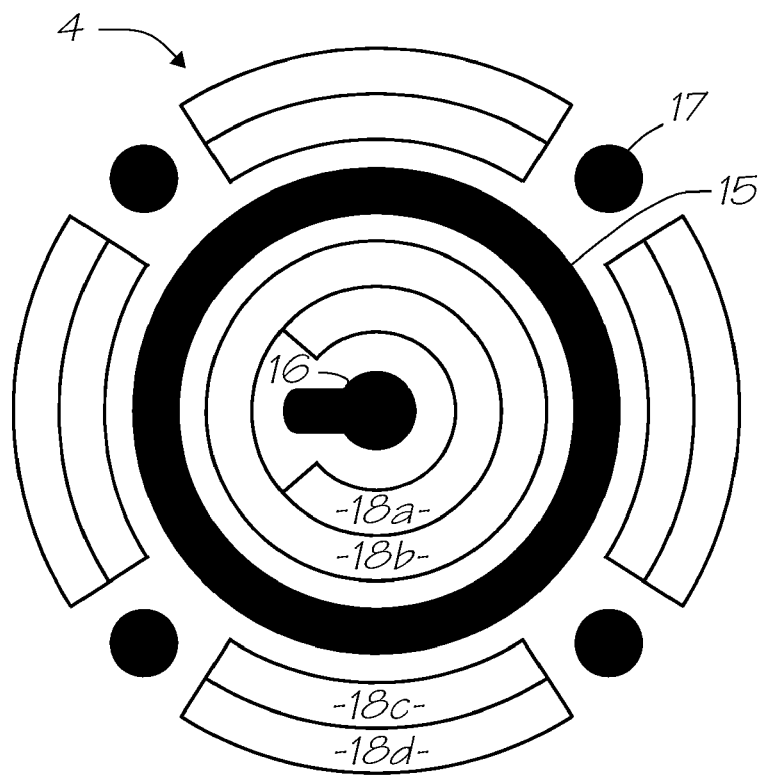
FIG. 5 is a plan view showing a structure of a netpage tag.

The physical representation of the tag, shown in FIG. 5, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data.

To achieve proper tag reproduction, the tag is rendered at a resolution of 256×256 dots. When printed at 1600 dots per inch this yields a tag with a diameter of about 4 mm. At this resolution the tag is designed to be surrounded by a "quiet area" of radius 16 dots. Since the quiet area is also contributed by adjacent tags, it only adds 16 dots to the effective diameter of the tag.

The tag includes six target structures. A detection ring 15 allows the sensing device to initially detect the tag. The ring is easy to detect because it is rotationally invariant and because a simple correction of its aspect ratio removes most of the effects of perspective distortion. An orientation axis 16 allows the sensing device to determine the approximate planar orientation of the tag due to the yaw of the sensor. The orientation axis is skewed to yield a unique orientation. Four perspective targets 17 allow the sensing device to infer an accurate two-dimensional perspective transform of the tag and hence an accurate three-dimensional position and orientation of the tag relative to the sensor.

All target structures are redundantly large to improve their immunity to noise.

The overall tag shape is circular. This supports, amongst other things, optimal tag packing on an irregular triangular grid. In combination with the circular detection ring, this makes a circular arrangement of data bits within the tag optimal. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges.

The 15 4-bit data symbols of each of the six codewords are allocated to the four concentric symbol rings 18a to 18d in interleaved fashion. Symbols are allocated alternately in circular progression around the tag.

The interleaving is designed to maximise the average spatial distance between any two symbols of the same codeword.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags.

Figure 6:
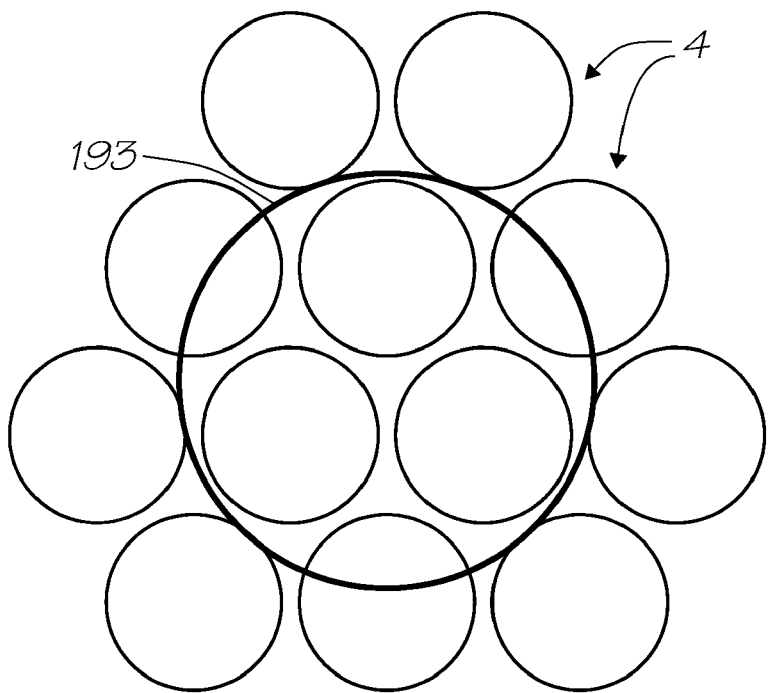
FIG. 6 is a plan view showing a relationship between a set of the tags shown in FIG. 5 and a field of view of a netpage sensing device in the form of a netpage pen.

Assuming a circular tag shape, the minimum diameter of the sensor field of view is obtained when the tags are tiled on a equilateral triangular grid, as shown in FIG. 6.

1.2.5 Tag Image Processing and Decoding

Figure 7:
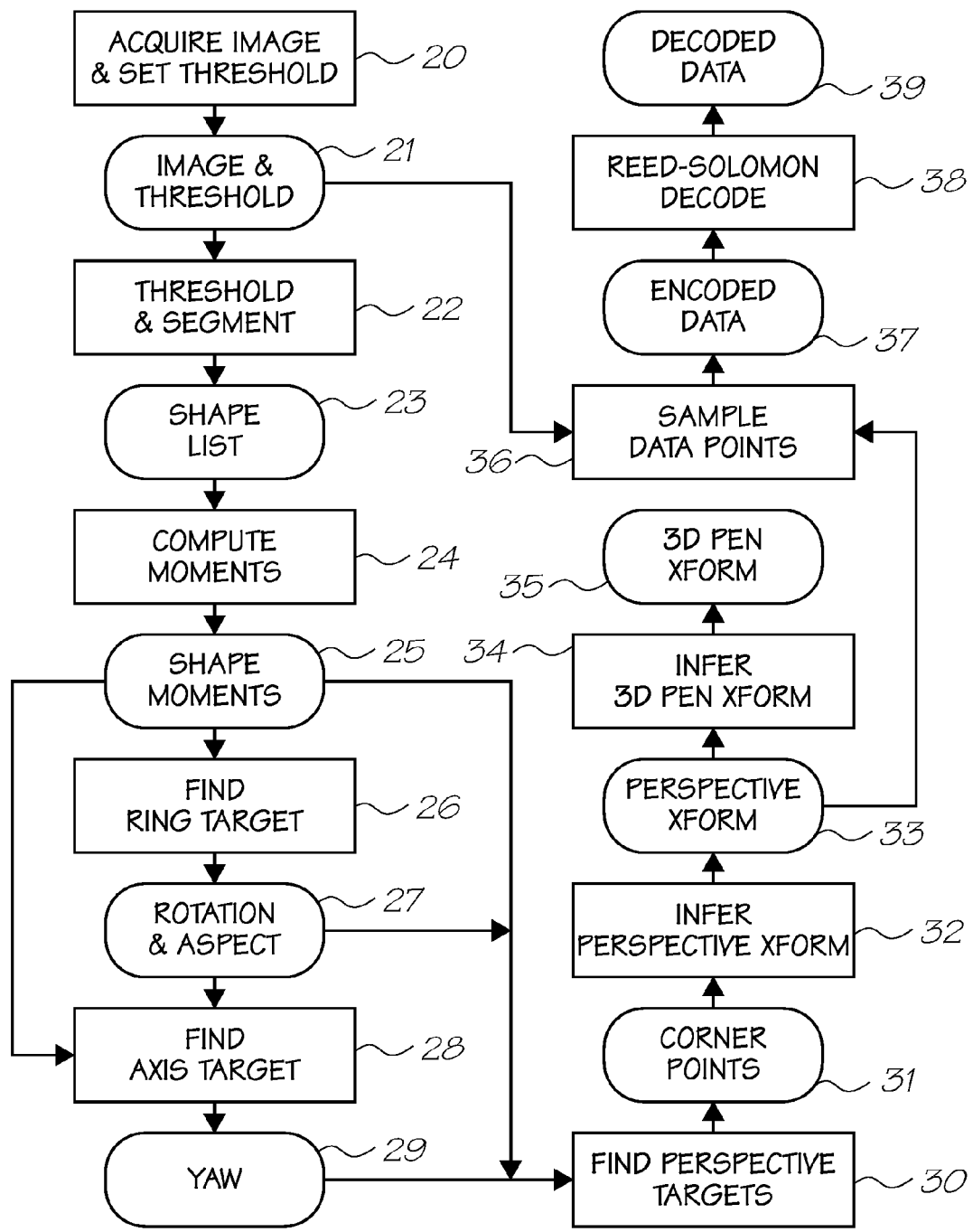
FIG. 7 is a flowchart of a tag image processing and decoding algorithm.

The tag image processing and decoding performed by a sensing device such as the netpage pen is shown in FIG. 7. While a captured image is being acquired from the image sensor, the dynamic range of the image is determined (at 20). The center of the range is then chosen as the binary threshold for the image 21. The image is then thresholded and segmented into connected pixel regions (i.e. shapes 23) (at 22). Shapes which are too small to represent tag target structures are discarded. The size and centroid of each shape is also computed.

Binary shape moments 25 are then computed (at 24) for each shape, and these provide the basis for subsequently locating target structures. Central shape moments are by their nature invariant of position, and can be easily made invariant of scale, aspect ratio and rotation.

The ring target structure 15 is the first to be located (at 26). A ring has the advantage of being very well behaved when perspective-distorted. Matching proceeds by aspect-normalizing and rotation-normalizing each shape's moments. Once its second-order moments are normalized the ring is easy to recognize even if the perspective distortion was significant. The ring's original aspect and rotation 27 together provide a useful approximation of the perspective transform.

The axis target structure 16 is the next to be located (at 28). Matching proceeds by applying the ring's normalizations to each shape's moments, and rotation-normalizing the resulting moments. Once its second-order moments are normalized the axis target is easily recognized. Note that one third order moment is required to disambiguate the two possible orientations of the axis. The shape is deliberately skewed to one side to make this possible. Note also that it is only possible to rotation-normalize the axis target after it has had the ring's normalizations applied, since the perspective distortion can hide the axis target's axis. The axis target's original rotation provides a useful approximation of the tag's rotation due to pen yaw 29.

The four perspective target structures 17 are the last to be located (at 30). Good estimates of their positions are computed based on their known spatial relationships to the ring and axis targets, the aspect and rotation of the ring, and the rotation of the axis. Matching proceeds by applying the ring's normalizations to each shape's moments. Once their second-order moments are normalized the circular perspective targets are easy to recognize, and the target closest to each estimated position is taken as a match. The original centroids of the four perspective targets are then taken to be the perspective-distorted corners 31 of a square of known size in tag space, and an eight-degree-of-freedom perspective transform 33 is inferred (at 32) based on solving the well-understood equations relating the four tag-space and image-space point pairs.

The inferred tag-space to image-space perspective transform is used to project (at 36) each known data bit position in tag space into image space where the real-valued position is used to bilinearly interpolate (at 36) the four relevant adjacent pixels in the input image. The previously computed image threshold 21 is used to threshold the result to produce the final bit value 37.

Once all 360 data bits 37 have been obtained in this way, each of the six 60-bit Reed-Solomon codewords is decoded (at 38) to yield 20 decoded bits 39, or 120 decoded bits in total. Note that the codeword symbols are sampled in codeword order, so that codewords are implicitly de-interleaved during the sampling process.

The ring target 15 is only sought in a subarea of the image whose relationship to the image guarantees that the ring, if found, is part of a complete tag. If a complete tag is not found and successfully decoded, then no pen position is recorded for the current frame. Given adequate processing power and ideally a non-minimal field of view 193, an alternative strategy involves seeking another tag in the current image.

The obtained tag data indicates the identity of the region containing the tag and the position of the tag within the region. An accurate position 35 of the pen nib in the region, as well as the overall orientation 35 of the pen, is then inferred (at 34) from the perspective transform 33 observed on the tag and the known spatial relationship between the pen's physical axis and the pen's optical axis.

1.2.6 Tag Map

Figure 22:
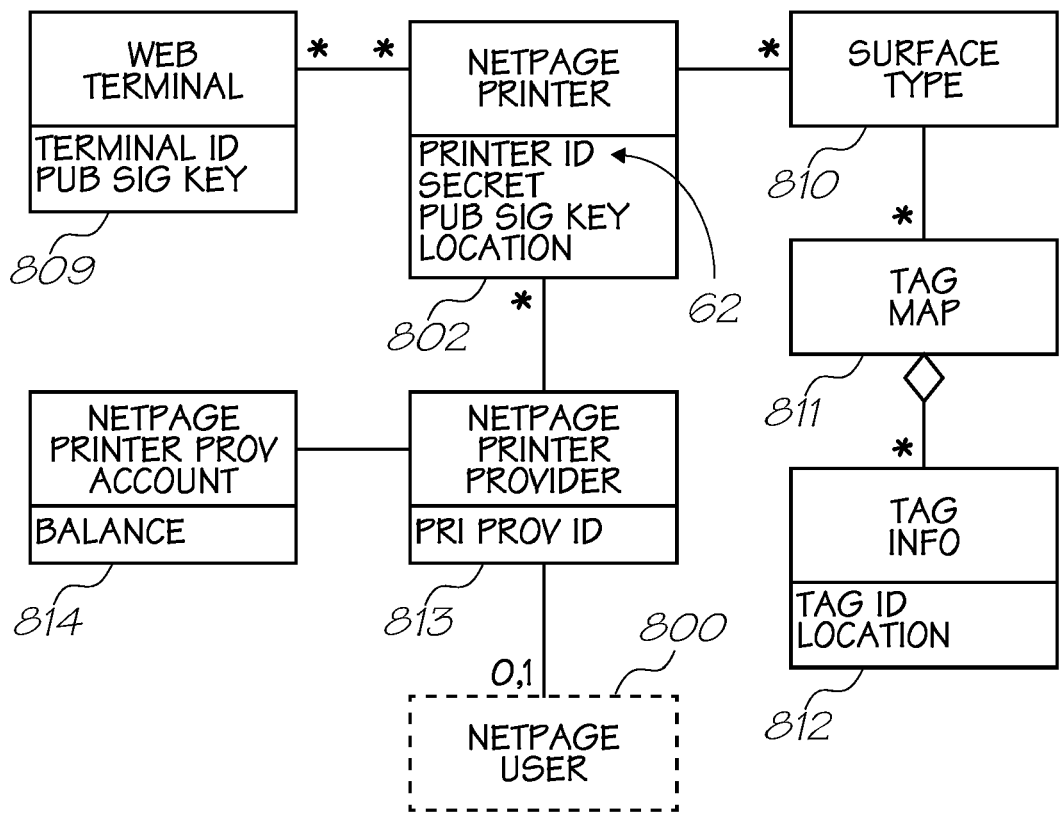
FIG. 22 is a schematic view of a printer class diagram.

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. The tag map class diagram is shown in FIG. 22, as part of the netpage printer class diagram.

A tag map reflects the scheme used to tile the surface region with tags, and this can vary according to surface type. When multiple tagged regions share the same tiling scheme and the same tag numbering scheme, they can also share the same tag map.

The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

1.2.7 Tagging Schemes

Two distinct surface coding schemes are of interest, both of which use the tag structure described earlier in this section. The preferred coding scheme uses "location-indicating" tags as already discussed. An alternative coding scheme uses object-indicating tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating tag contains a tag ID which directly identifies a user interface element in the page description associated with the region. All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

1.3 Document and Page Descriptions

Figure 25:
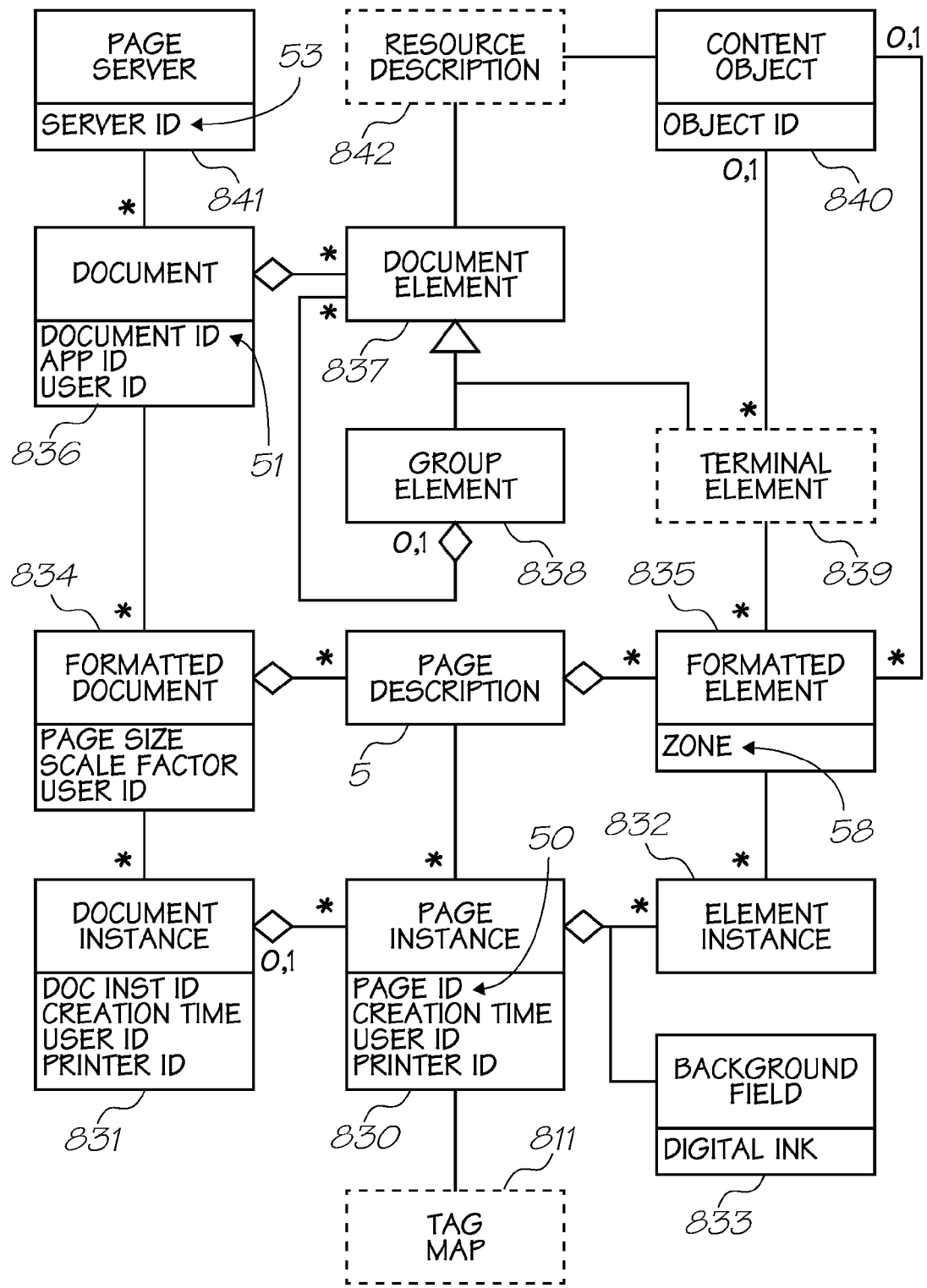
FIG. 25 is a schematic view of a document and page description class diagram.
Figure 26:
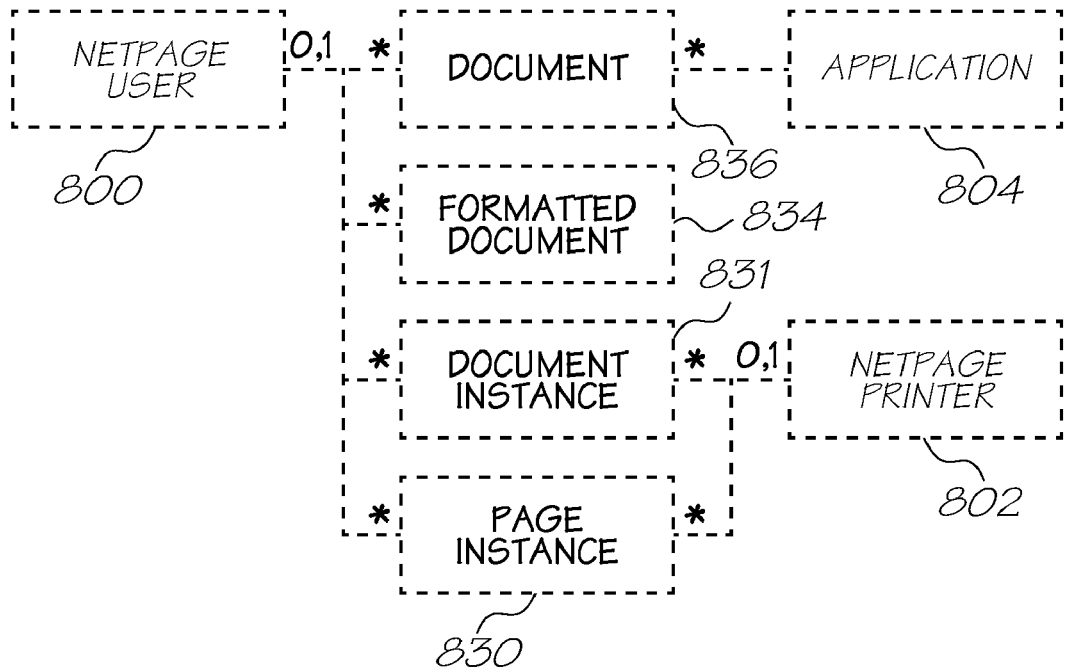
FIG. 26 is a schematic view of a document and page ownership class diagram.

A preferred embodiment of a document and page description class diagram is shown in FIGS. 25 and 26.

In the netpage system a document is described at three levels. At the most abstract level the document 836 has a hierarchical structure whose terminal elements 839 are associated with content objects 840 such as text objects, text style objects, image objects, etc. Once the document is printed on a printer with a particular page size and according to a particular user's scale factor preference, the document is paginated and otherwise formatted. Formatted terminal elements 835 will in some cases be associated with content objects which are different from those associated with their corresponding terminal elements, particularly where the content objects are style-related. Each printed instance of a document and page is also described separately, to allow input captured through a particular page instance 830 to be recorded separately from input captured through other instances of the same page description.

The presence of the most abstract document description on the page server allows a user to request a copy of a document without being forced to accept the source document's specific format. The user may be requesting a copy through a printer with a different page size, for example. Conversely, the presence of the formatted document description on the page server allows the page server to efficiently interpret user actions on a particular printed page.

A formatted document 834 consists of a set of formatted page descriptions 5, each of which consists of a set of formatted terminal elements 835. Each formatted element has a spatial extent or zone 58 on the page. This defines the active area of input elements such as hyperlinks and input fields.

A document instance 831 corresponds to a formatted document 834. It consists of a set of page instances 830, each of which corresponds to a page description 5 of the formatted document. Each page instance 830 describes a single unique printed netpage 1, and records the page ID 50 of the netpage. A page instance is not part of a document instance if it represents a copy of a page requested in isolation.

A page instance consists of a set of terminal element instances 832. An element instance only exists if it records instance-specific information. Thus, a hyperlink instance exists for a hyperlink element because it records a transaction ID 55 which is specific to the page instance, and a field instance exists for a field element because it records input specific to the page instance. An element instance does not exist, however, for static elements such as textflows.

Figure 27:
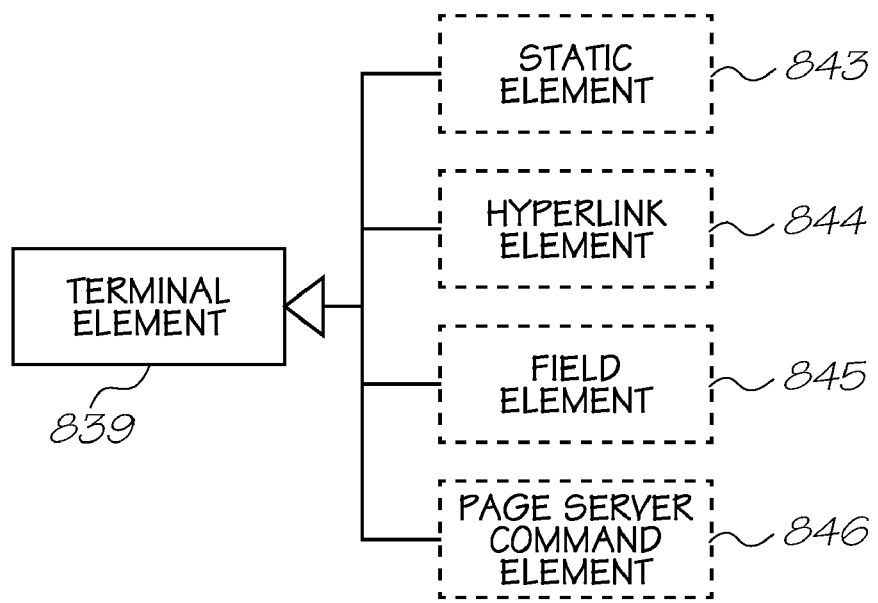
FIG. 27 is a schematic view of a terminal element specialization class diagram.
Figure 28:
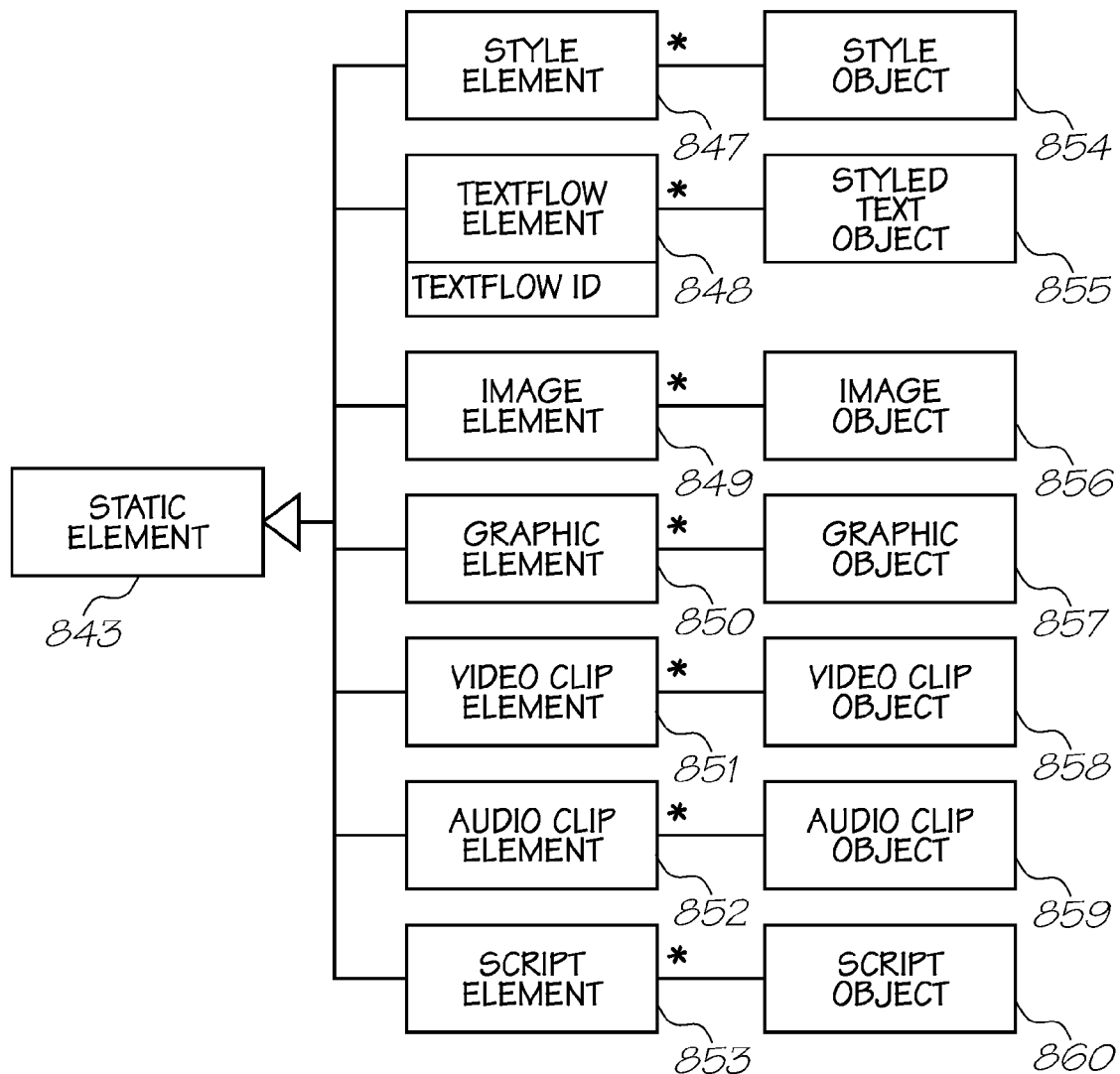
FIG. 28 is a schematic view of a static element specialization class diagram.

A terminal element can be a static element 843, a hyperlink element 844, a field element 845 or a page server command element 846, as shown in FIG. 27. A static element 843 can be a style element 847 with an associated style object 854, a textflow element 848 with an associated styled text object 855, an image element 849 with an associated image element 856, a graphic element 850 with an associated graphic object 857, a video clip element 851 with an associated video clip object 858, an audio clip element 852 with an associated audio clip object 859, or a script element 853 with an associated script object 860, as shown in FIG. 28.

A page instance has a background field 833 which is used to record any digital ink captured on the page which does not apply to a specific input element.

In the preferred form of the invention, a tag map 811 is associated with each page instance to allow tags on the page to be translated into locations on the page.

1.4 The Netpage Network

Figure 3:
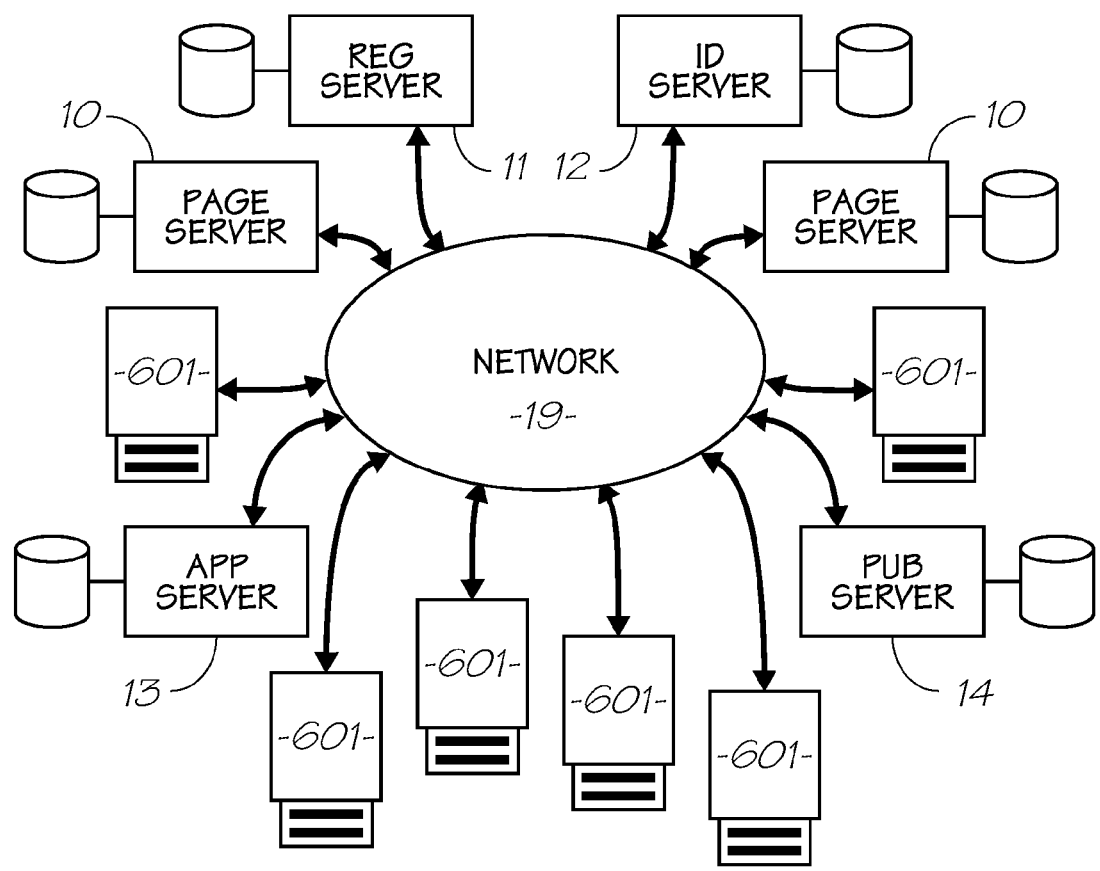
FIG. 3 illustrates a collection of netpage servers and printers interconnected via a network.

In a preferred embodiment, a netpage network consists of a distributed set of netpage page servers 10, netpage registration servers 11, netpage ID servers 12, netpage application servers 13, netpage publication servers 14, and netpage printers 601 connected via a network 19 such as the Internet, as shown in FIG. 3.

The netpage registration server 11 is a server which records relationships between users, pens, printers, applications and publications, and thereby authorizes various network activities. It authenticates users and acts as a signing proxy on behalf of authenticated users in application transactions. It also provides handwriting recognition services. As described above, a netpage page server 10 maintains persistent information about page descriptions and page instances. The netpage network includes any number of page servers, each handling a subset of page instances. Since a page server also maintains user input values for each page instance, clients such as netpage printers send netpage input directly to the appropriate page server. The page server interprets any such input relative to the description of the corresponding page.

A netpage ID server 12 allocates document IDs 51 on demand, and provides load-balancing of page servers via its ID allocation scheme.

A netpage printer uses the Internet Distributed Name System (DNS), or similar, to resolve a netpage page ID 50 into the network address of the netpage page server handling the corresponding page instance.

A netpage application server 13 is a server which hosts interactive netpage applications. A netpage publication server 14 is an application server which publishes netpage documents to netpage printers. They are described in detail in Section 2.

Netpage servers can be hosted on a variety of network server platforms from manufacturers such as IBM, Hewlett-Packard, and Sun. Multiple netpage servers can run concurrently on a single host, and a single server can be distributed over a number of hosts. Some or all of the functionality provided by netpage servers, and in particular the functionality provided by the ID server and the page server, can also be provided directly in a netpage appliance such as a netpage printer, in a computer workstation, or on a local network.

1.5 The Netpage Printer

The netpage printer 601 is an appliance which is registered with the netpage system and prints netpage documents on demand and via subscription. Each printer has a unique printer ID 62, and is connected to the netpage network via a network such as the Internet, ideally via a broadband connection.

Apart from identity and security settings in non-volatile memory, the netpage printer contains no persistent storage. As far as a user is concerned, "the network is the computer". Netpages function interactively across space and time with the help of the distributed netpage page servers 10, independently of particular netpage printers.

The netpage printer receives subscribed netpage documents from netpage publication servers 14. Each document is distributed in two parts: the page layouts, and the actual text and image objects which populate the pages. Because of personalization, page layouts are typically specific to a particular subscriber and so are pointcast to the subscriber's printer via the appropriate page server. Text and image objects, on the other hand, are typically shared with other subscribers, and so are multicast to all subscribers' printers and the appropriate page servers.

The netpage publication server optimizes the segmentation of document content into pointcasts and multicasts. After receiving the pointcast of a document's page layouts, the printer knows which multicasts, if any, to listen to.

Once the printer has received the complete page layouts and objects that define the document to be printed, it can print the document.

The printer rasterizes and prints odd and even pages simultaneously on both sides of the sheet. It contains duplexed print engine controllers 760 and print engines utilizing Memjet™ printheads 350 for this purpose.

The printing process consists of two decoupled stages: rasterization of page descriptions, and expansion and printing of page images. The raster image processor (RIP) consists of one or more standard DSPs 757 running in parallel. The duplexed print engine controllers consist of custom processors which expand, dither and print page images in real time, synchronized with the operation of the printheads in the print engines.

Printers not enabled for IR printing have the option to print tags using IR-absorptive black ink, although this restricts tags to otherwise empty areas of the page. Although such pages have more limited functionality than IR-printed pages, they are still classed as netpages.

A normal netpage printer prints netpages on sheets of paper. More specialised netpage printers may print onto more specialised surfaces, such as globes. Each printer supports at least one surface type, and supports at least one tag tiling scheme, and hence tag map, for each surface type. The tag map 811 which describes the tag tiling scheme actually used to print a document becomes associated with that document so that the document's tags can be correctly interpreted.

FIG. 2 shows the netpage printer class diagram, reflecting printer-related information maintained by a registration server 11 on the netpage network.

A preferred embodiment of the netpage printer is described in greater detail in Section 6 below, with reference to FIGS. 11 to 16.

1.5.1 Memjet™ Printheads

The netpage system can operate using printers made with a wide range of digital printing technologies, including thermal inkjet, piezoelectric inkjet, laser electrophotographic, and others. However, for wide consumer acceptance, it is desirable that a netpage printer have the following characteristics:

- photographic quality color printing
- high quality text printing
- high reliability
- low printer cost
- low ink cost
- low paper cost
- simple operation
- nearly silent printing
- high printing speed
- simultaneous double sided printing
- compact form factor
- low power consumption No commercially available printing technology has all of these characteristics.

Figure 17:
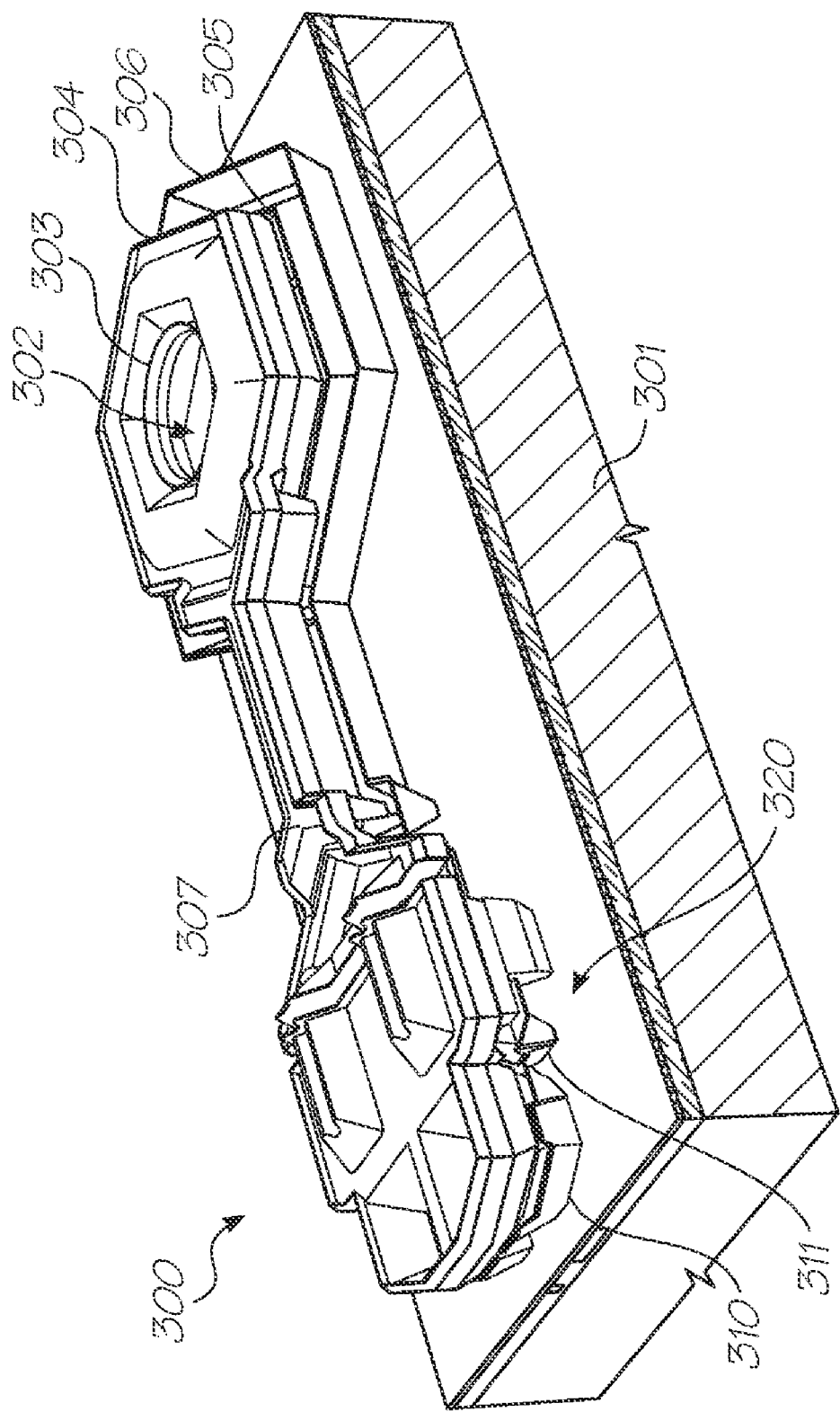
FIG. 17 is a perspective view of a single Memjet printing element, as used in, for example, the netpage printer of FIGS. 10 to 12.

To enable to production of printers with these characteristics, the present applicant has invented a new print technology, referred to as Memjet™ technology. Memjet™ is a drop-on-demand inkjet technology that incorporates pagewidth printheads fabricated using microelectromechanical systems (MEMS) technology. FIG. 17 shows a single printing element 300 of a Memjet™ printhead. The netpage wallprinter incorporates 168960 printing elements 300 to form a 1600 dpi pagewidth duplex printer. This printer simultaneously prints cyan, magenta, yellow, black, and infrared inks as well as paper conditioner and ink fixative.

The printing element 300 is approximately 110 microns long by 32 microns wide. Arrays of these printing elements are formed on a silicon substrate 301 that incorporates CMOS logic, data transfer, timing, and drive circuits (not shown).

Major elements of the printing element 300 are the nozzle 302, the nozzle rim 303, the nozzle chamber 304, the fluidic seal 305, the ink channel rim 306, the lever arm 307, the active actuator beam pair 308, the passive actuator beam pair 309, the active actuator anchor 310, the passive actuator anchor 311, and the ink inlet 312.

The active actuator beam pair 308 is mechanically joined to the passive actuator beam pair 309 at the join 319. Both beams pairs are anchored at their respective anchor points 310 and 311. The combination of elements 308, 309, 310, 311, and 319 form a cantilevered electrothermal bend actuator 320.

Figure 18:
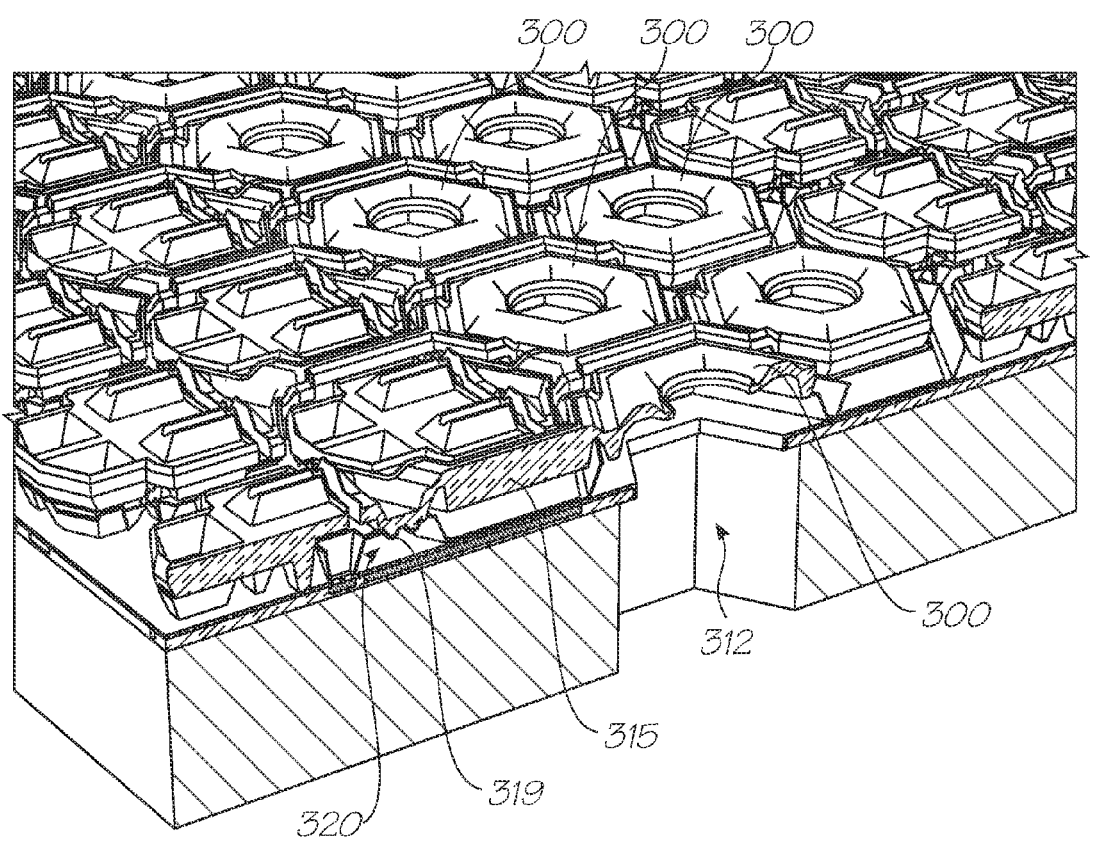
FIG. 18 is a perspective view of a small part of an array of Memjet printing elements.

FIG. 18 shows a small part of an array of printing elements 300, including a cross section 315 of a printing element 300.

The cross section 315 is shown without ink, to clearly show the ink inlet 312 that passes through the silicon wafer 301.

Figure 19A:
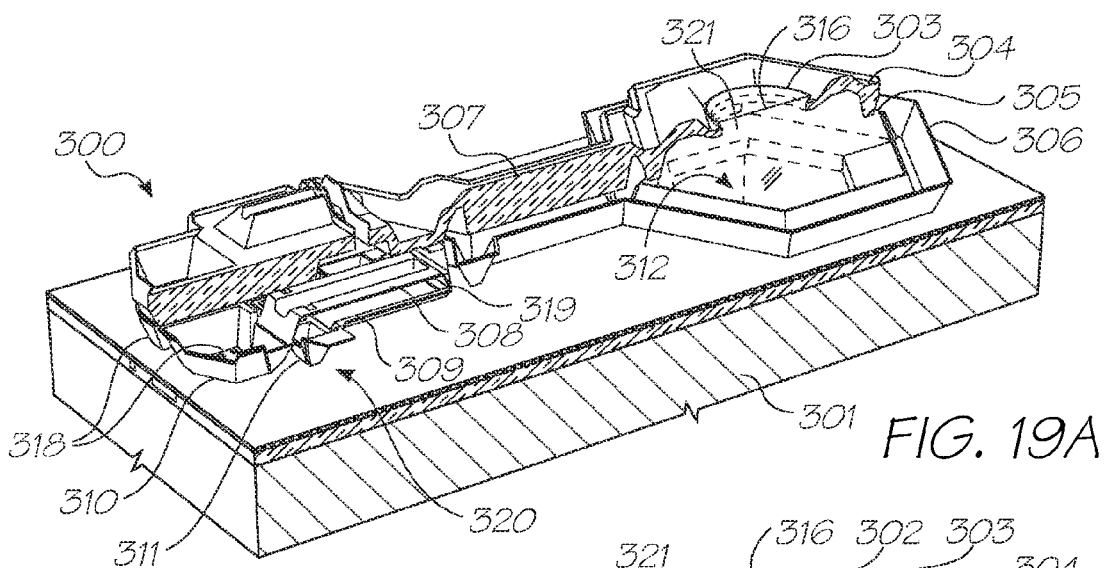
FIG. 19 is a series of perspective views illustrating the operating cycle of the Memjet printing element shown in FIG. 13.
Figure 19B:
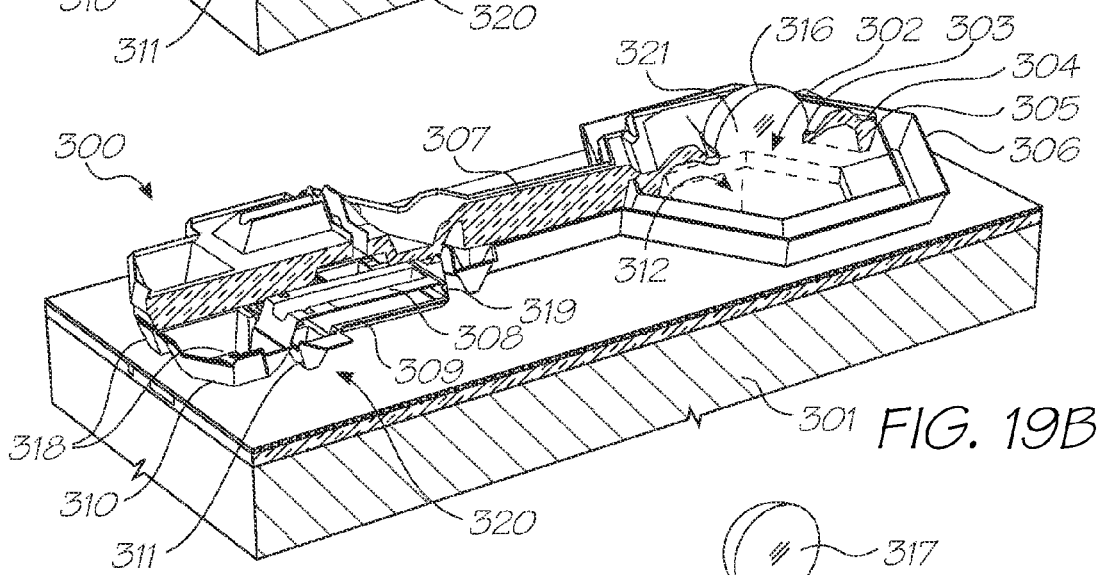
Figure 19C:
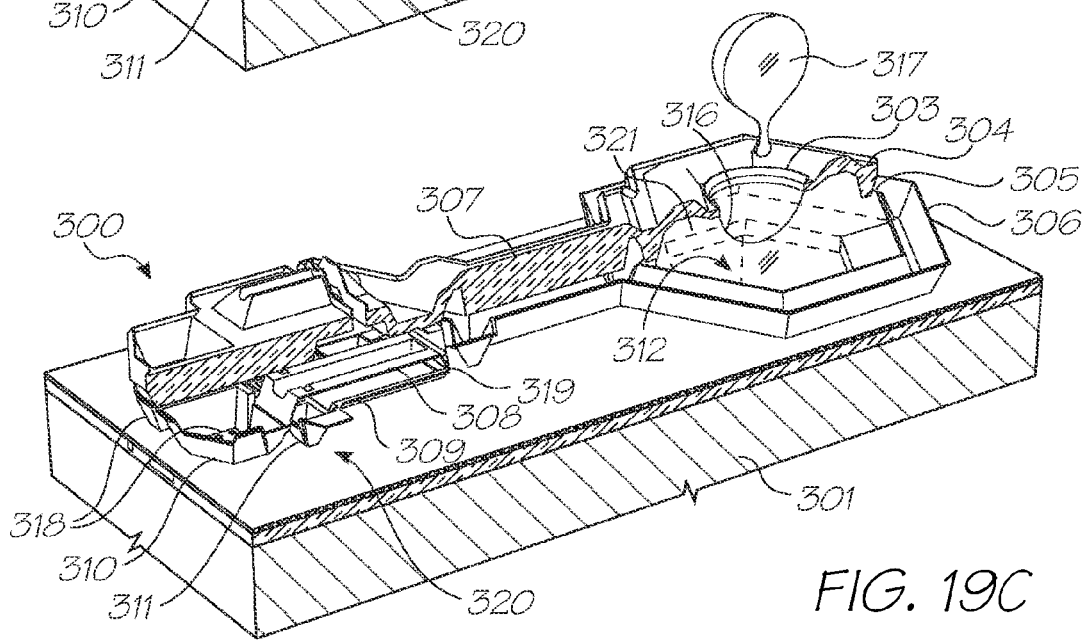

FIGS. 19(a), 19(b) and 19(c) show the operating cycle of a Memjet™ printing element 300.

FIG. 19(a) shows the quiescent position of the ink meniscus 316 prior to printing an ink droplet. Ink is retained in the nozzle chamber by surface tension at the ink meniscus 316 and at the fluidic seal 305 formed between the nozzle chamber 304 and the ink channel rim 306.

While printing, the printhead CMOS circuitry distributes data from the print engine controller to the correct printing element, latches the data, and buffers the data to drive the electrodes 318 of the active actuator beam pair 308. This causes an electrical current to pass through the beam pair 308 for about one microsecond, resulting in Joule heating. The temperature increase resulting from Joule heating causes the beam pair 308 to expand. As the passive actuator beam pair 309 is not heated, it does not expand, resulting in a stress difference between the two beam pairs. This stress difference is partially resolved by the cantilevered end of the electro-thermal bend actuator 320 bending towards the substrate 301. The lever arm 307 transmits this movement to the nozzle chamber 304. The nozzle chamber 304 moves about two microns to the position shown in FIG. 19(b). This increases the ink pressure, forcing ink 321 out of the nozzle 302, and causing the ink meniscus 316 to bulge. The nozzle rim 303 prevents the ink meniscus 316 from spreading across the surface of the nozzle chamber 304.

As the temperature of the beam pairs 308 and 309 equalizes, the actuator 320 returns to its original position. This aids in the break-off of the ink droplet 317 from the ink 321 in the nozzle chamber, as shown in FIG. 19(c). The nozzle chamber is refilled by the action of the surface tension at the meniscus 316.

Figure 20:
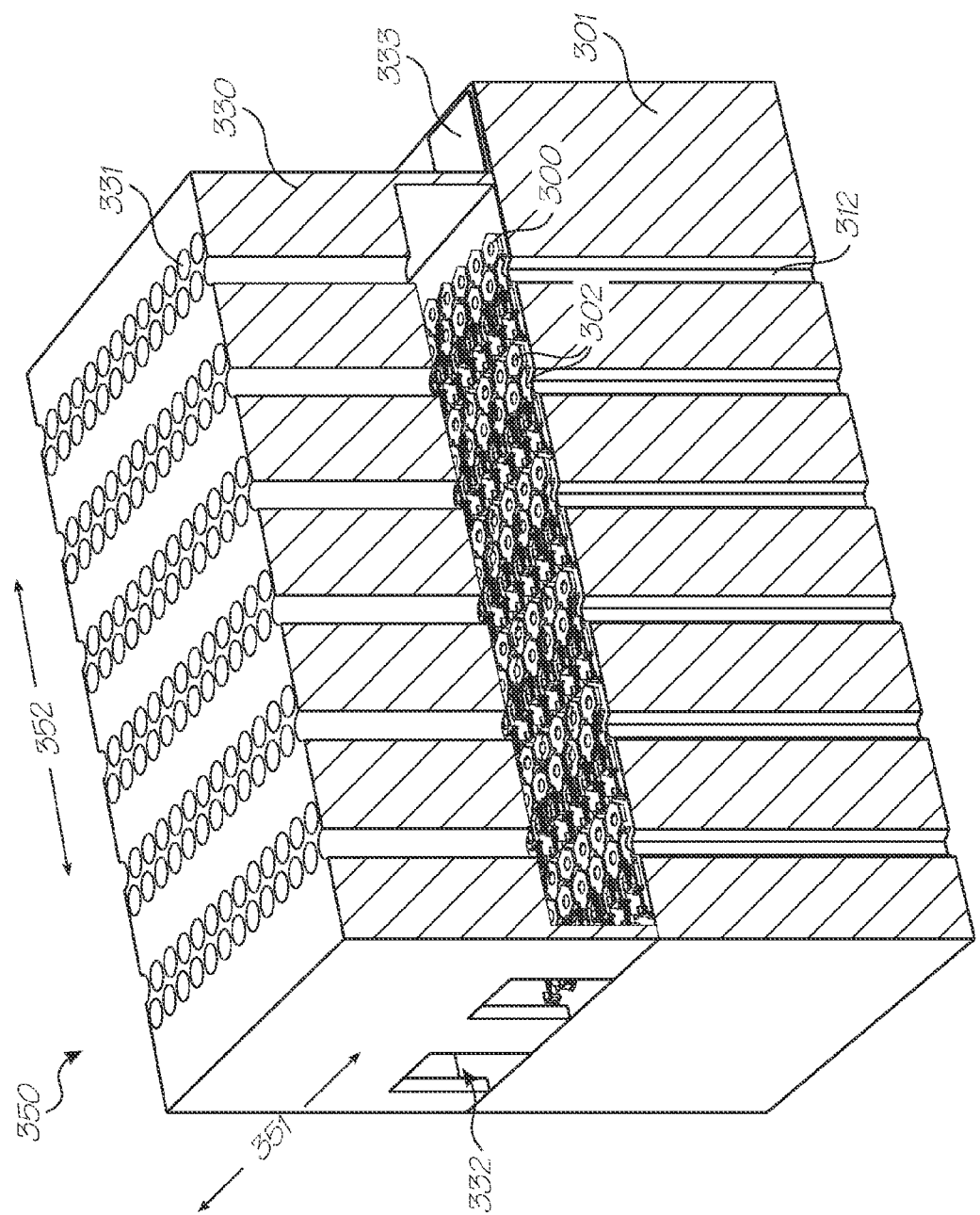
FIG. 20 is a perspective view of a short segment of a pagewidth Memjet printhead.
Figure 21:
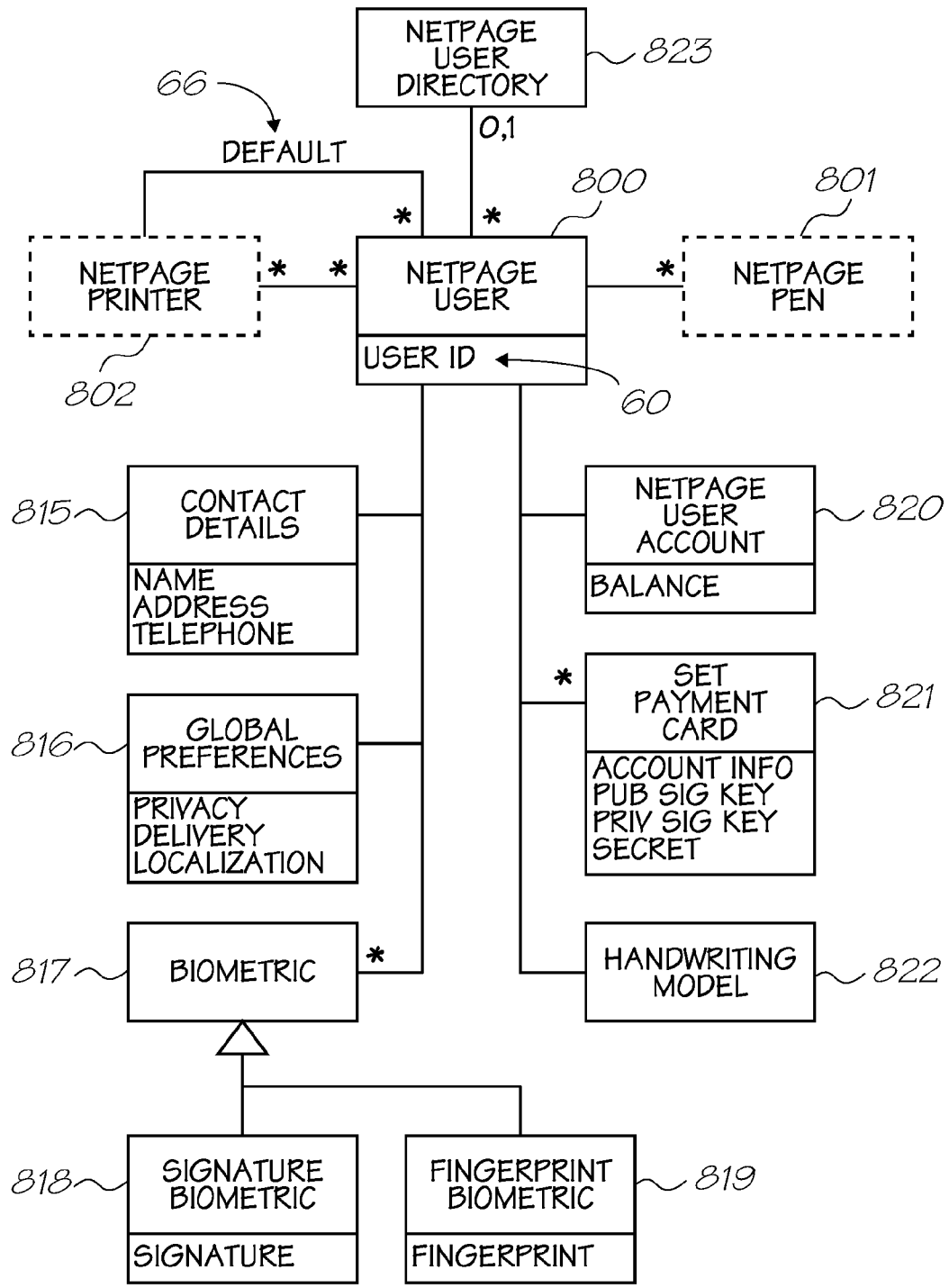
FIG. 21 is a schematic view of a user class diagram.

FIG. 20 shows a segment of a printhead 350. In a netpage printer, the length of the printhead is the full width of the paper (typically 210 mm) in the direction 351. The segment shown is 0.4 mm long (about 0.2% of a complete printhead). When printing, the paper is moved past the fixed printhead in the direction 352. The printhead has 6 rows of interdigitated printing elements 300, printing the six colors or types of ink supplied by the ink inlets 312.

To protect the fragile surface of the printhead during operation, a nozzle guard wafer 330 is attached to the printhead substrate 301. For each nozzle 302 there is a corresponding nozzle guard hole 331 through which the ink droplets are fired. To prevent the nozzle guard holes 331 from becoming blocked by paper fibers or other debris, filtered air is pumped through the air inlets 332 and out of the nozzle guard holes during printing. To prevent ink 321 from drying, the nozzle guard is sealed while the printer is idle.

1.6 The Netpage Pen

The active sensing device of the netpage system is typically a pen 101, which, using its embedded controller 134, is able to capture and decode IR position tags from a page via an image sensor. The image sensor is a solid-state device provided with an appropriate filter to permit sensing at only near-infrared wavelengths. As described in more detail below, the system is able to sense when the nib is in contact with the surface, and the pen is able to sense tags at a sufficient rate to capture human handwriting (i.e. at 200 dpi or greater and 100 Hz or faster). Information captured by the pen is encrypted and wirelessly transmitted to the printer (or base station), the printer or base station interpreting the data with respect to the (known) page structure.

Figure 23:
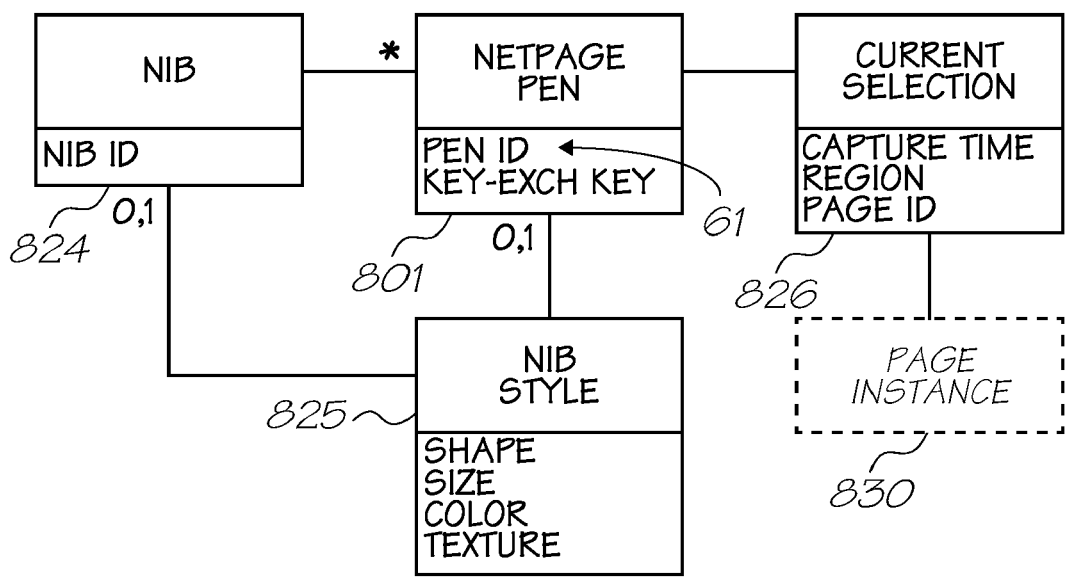
FIG. 23 is a schematic view of a pen class diagram.

The preferred embodiment of the netpage pen operates both as a normal marking ink pen and as a non-marking stylus. The marking aspect, however, is not necessary for using the netpage system as a browsing system, such as when it is used as an Internet interface. Each netpage pen is registered with the netpage system and has a unique pen ID 61. FIG. 23 shows the netpage pen class diagram, reflecting pen-related information maintained by a registration server 11 on the netpage network.

When either nib is in contact with a netpage, the pen determines its position and orientation relative to the page. The nib is attached to a force sensor, and the force on the nib is interpreted relative to a threshold to indicate whether the pen is "up" or "down". This allows a interactive element on the page to be 'clicked' by pressing with the pen nib, in order to request, say, information from a network. Furthermore, the force is captured as a continuous value to allow, say, the full dynamics of a signature to be verified.

The pen determines the position and orientation of its nib on the netpage by imaging, in the infrared spectrum, an area 193 of the page in the vicinity of the nib. It decodes the nearest tag and computes the position of the nib relative to the tag from the observed perspective distortion on the imaged tag and the known geometry of the pen optics. Although the position resolution of the tag may be low, because the tag density on the page is inversely proportional to the tag size, the adjusted position resolution is quite high, exceeding the minimum resolution required for accurate handwriting recognition.

Pen actions relative to a netpage are captured as a series of strokes. A stroke consists of a sequence of time-stamped pen positions on the page, initiated by a pen-down event and completed by the subsequent pen-up event. A stroke is also tagged with the page ID 50 of the netpage whenever the page ID changes, which, under normal circumstances, is at the commencement of the stroke.

Each netpage pen has a current selection 826 associated with it, allowing the user to perform copy and paste operations etc. The selection is timestamped to allow the system to discard it after a defined time period. The current selection describes a region of a page instance. It consists of the most recent digital ink stroke captured through the pen relative to the background area of the page. It is interpreted in an application-specific manner once it is submitted to an application via a selection hyperlink activation.

Each pen has a current nib 824. This is the nib last notified by the pen to the system. In the case of the default netpage pen described above, either the marking black ink nib or the non-marking stylus nib is current. Each pen also has a current nib style 825. This is the nib style last associated with the pen by an application, e.g. in response to the user selecting a color from a palette. The default nib style is the nib style associated with the current nib. Strokes captured through a pen are tagged with the current nib style. When the strokes are subsequently reproduced, they are reproduced in the nib style with which they are tagged.

Whenever the pen is within range of a printer with which it can communicate, the pen slowly flashes its "online" LED. When the pen fails to decode a stroke relative to the page, it momentarily activates its "error" LED. When the pen succeeds in decoding a stroke relative to the page, it momentarily activates its "ok" LED.

A sequence of captured strokes is referred to as digital ink. Digital ink forms the basis for the digital exchange of drawings and handwriting, for online recognition of handwriting, and for online verification of signatures.

The pen is wireless and transmits digital ink to the netpage printer via a short-range radio link. The transmitted digital ink is encrypted for privacy and security and packetized for efficient transmission, but is always flushed on a pen-up event to ensure timely handling in the printer.

When the pen is out-of-range of a printer it buffers digital ink in internal memory, which has a capacity of over ten minutes of continuous handwriting. When the pen is once again within range of a printer, it transfers any buffered digital ink.

A pen can be registered with any number of printers, but because all state data resides in netpages both on paper and on the network, it is largely immaterial which printer a pen is communicating with at any particular time.

Figure 10:
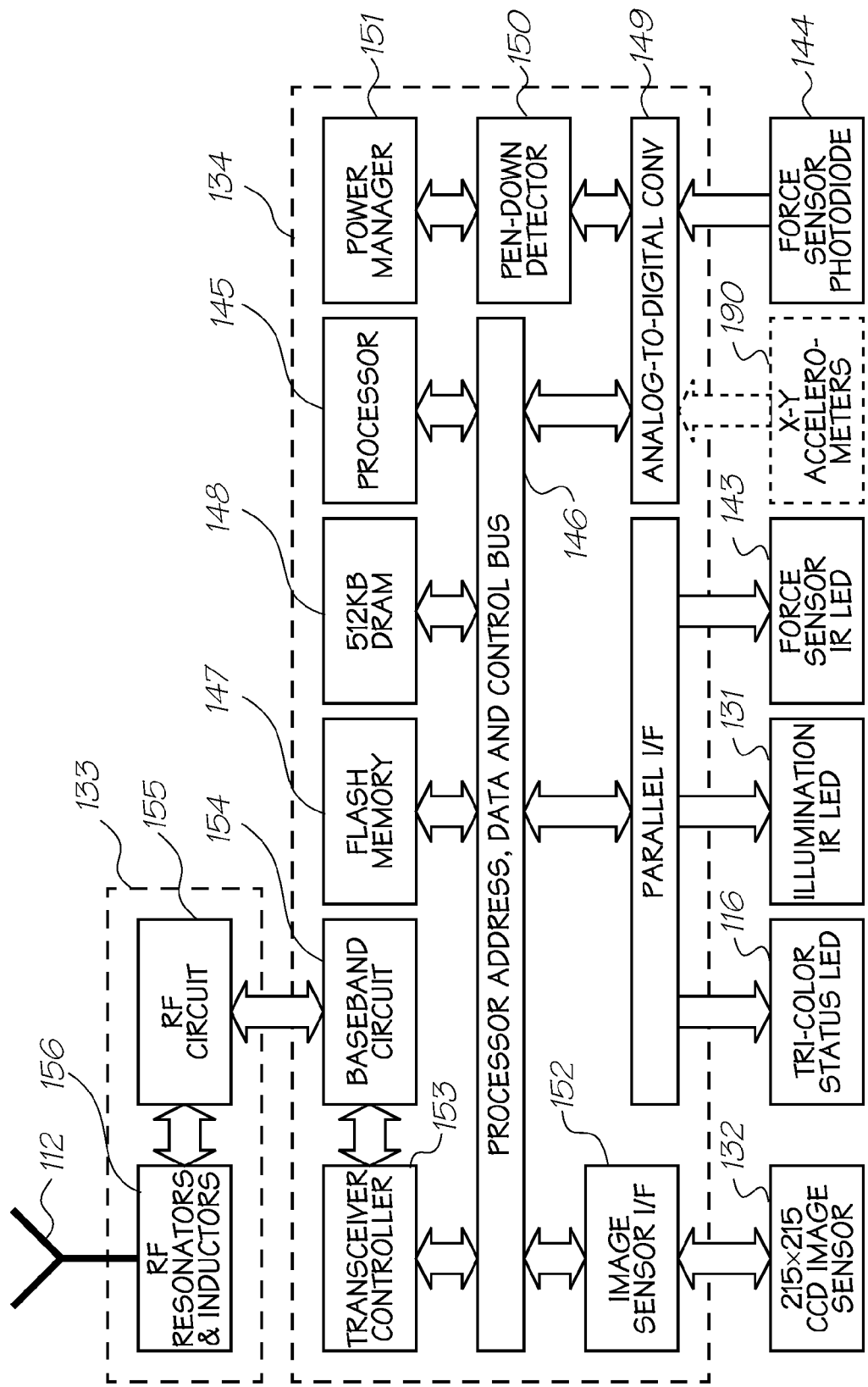
FIG. 10 is a schematic block diagram of a pen controller for the netpage pen shown in FIGS. 8 and 9.

A preferred embodiment of the pen is described in greater detail in Section 6 below, with reference to FIGS. 8 to 10.

1.7 Netpage Interaction

The netpage printer 601 receives data relating to a stroke from the pen 101 when the pen is used to interact with a netpage 1. The coded data 3 of the tags 4 is read by the pen when it is used to execute a movement, such as a stroke. The data allows the identity of the particular page and associated interactive element to be determined and an indication of the relative positioning of the pen relative to the page to be obtained. The indicating data is transmitted to the printer, where it resolves, via the DNS, the page ID 50 of the stroke into the network address of the netpage page server 10 which maintains the corresponding page instance 830. It then transmits the stroke to the page server. If the page was recently identified in an earlier stroke, then the printer may already have the address of the relevant page server in its cache. Each netpage consists of a compact page layout maintained persistently by a netpage page server (see below). The page layout refers to objects such as images, fonts and pieces of text, typically stored elsewhere on the netpage network.

When the page server receives the stroke from the pen, it retrieves the page description to which the stroke applies, and determines which element of the page description the stroke intersects. It is then able to interpret the stroke in the context of the type of the relevant element.

A "click" is a stroke where the distance and time between the pen down position and the subsequent pen up position are both less than some small maximum. An object which is activated by a click typically requires a click to be activated, and accordingly, a longer stroke is ignored. The failure of a pen action, such as a "sloppy" click, to register is indicated by the lack of response from the pen's "ok" LED.

There are two kinds of input elements in a netpage page description: hyperlinks and form fields. Input through a form field can also trigger the activation of an associated hyperlink.

1.7.1 Hyperlinks

A hyperlink is a means of sending a message to a remote application, and typically elicits a printed response in the netpage system.

Figure 29:
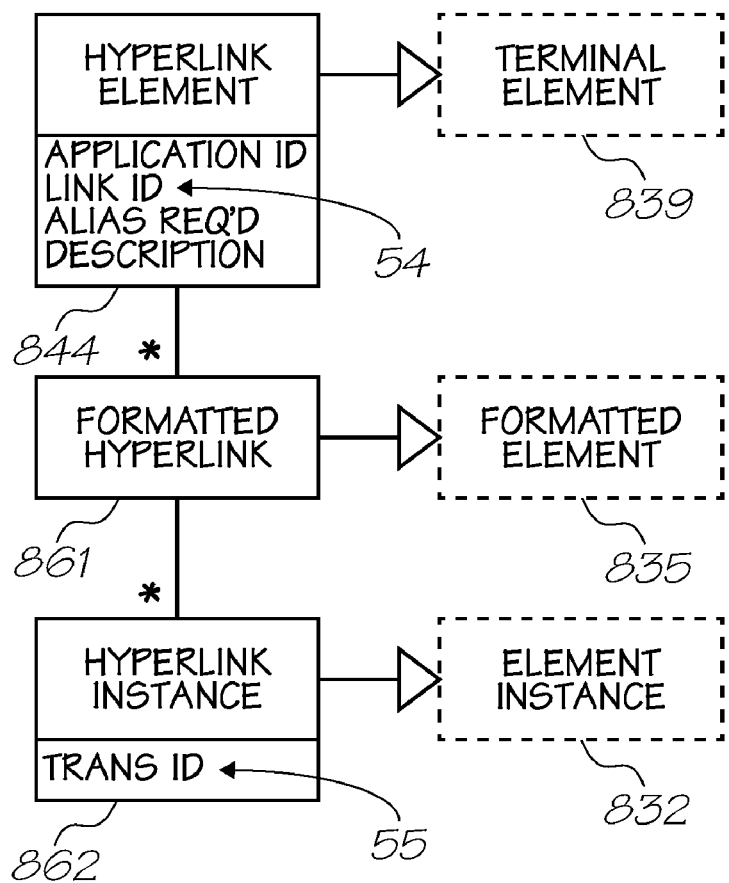
FIG. 29 is a schematic view of a hyperlink element class diagram.

A hyperlink element 844 identifies the application 71 which handles activation of the hyperlink, a link ID 54 which identifies the hyperlink to the application, an "alias required" flag which asks the system to include the user's application alias ID 65 in the hyperlink activation, and a description which is used when the hyperlink is recorded as a favorite or appears in the user's history. The hyperlink element class diagram is shown in FIG. 29.

When a hyperlink is activated, the page server sends a request to an application somewhere on the network. The application is identified by an application ID 64, and the application ID is resolved in the normal way via the DNS.

Figure 30:
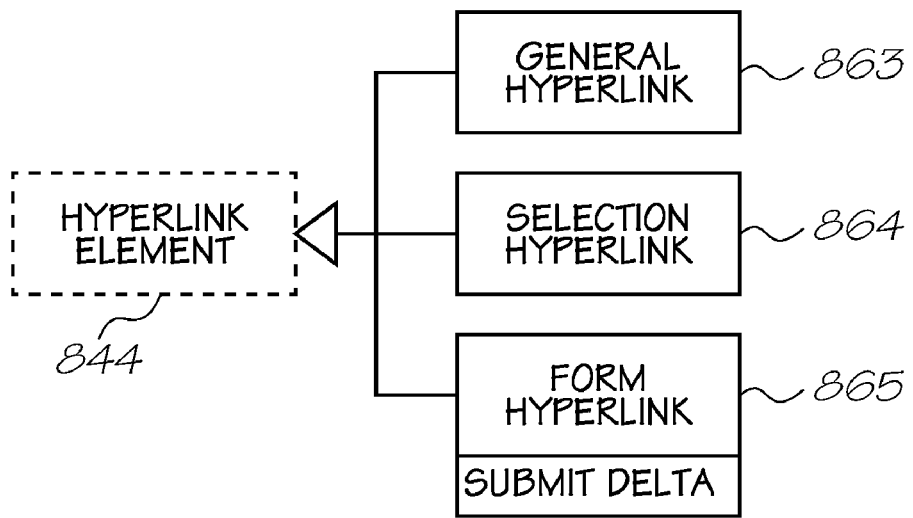
FIG. 30 is a schematic view of a hyperlink element specialization class diagram.

There are three types of hyperlinks: general hyperlinks 863, form hyperlinks 865, and selection hyperlinks 864, as shown in FIG. 30. A general hyperlink can implement a request for a linked document, or may simply signal a preference to a server. A form hyperlink submits the corresponding form to the application. A selection hyperlink submits the current selection to the application. If the current selection contains a single-word piece of text, for example, the application may return a single-page document giving the word's meaning within the context in which it appears, or a translation into a different language. Each hyperlink type is characterized by what information is submitted to the application.

The corresponding hyperlink instance 862 records a transaction ID 55 which can be specific to the page instance on which the hyperlink instance appears. The transaction ID can identify user-specific data to the application, for example a "shopping cart" of pending purchases maintained by a purchasing application on behalf of the user.

The system includes the pen's current selection 826 in a selection hyperlink activation. The system includes the content of the associated form instance 868 in a form hyperlink activation, although if the hyperlink has its "submit delta" attribute set, only input since the last form submission is included. The system includes an effective return path in all hyperlink activations.

Figure 31:
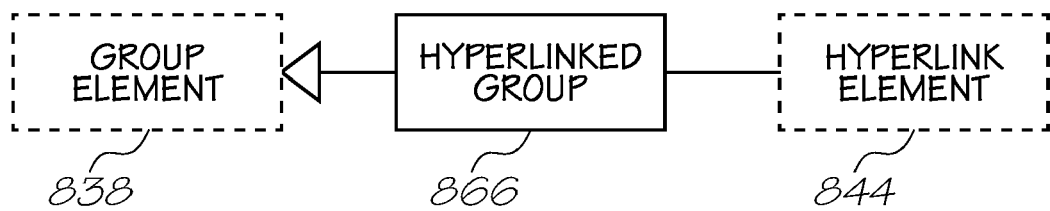
FIG. 31 is a schematic view of a hyperlinked group class diagram.

A hyperlinked group 866 is a group element 838 which has an associated hyperlink, as shown in FIG. 31. When input occurs through any field element in the group, the hyperlink 844 associated with the group is activated. A hyperlinked group can be used to associate hyperlink behavior with a field such as a checkbox. It can also be used, in conjunction with the "submit delta" attribute of a form hyperlink, to provide continuous input to an application. It can therefore be used to support a "blackboard" interaction model, i.e. where input is captured and therefore shared as soon as it occurs.

1.7.2 Forms

A form defines a collection of related input fields used to capture a related set of inputs through a printed netpage. A form allows a user to submit one or more parameters to an application software program running on a server.

Figure 32:
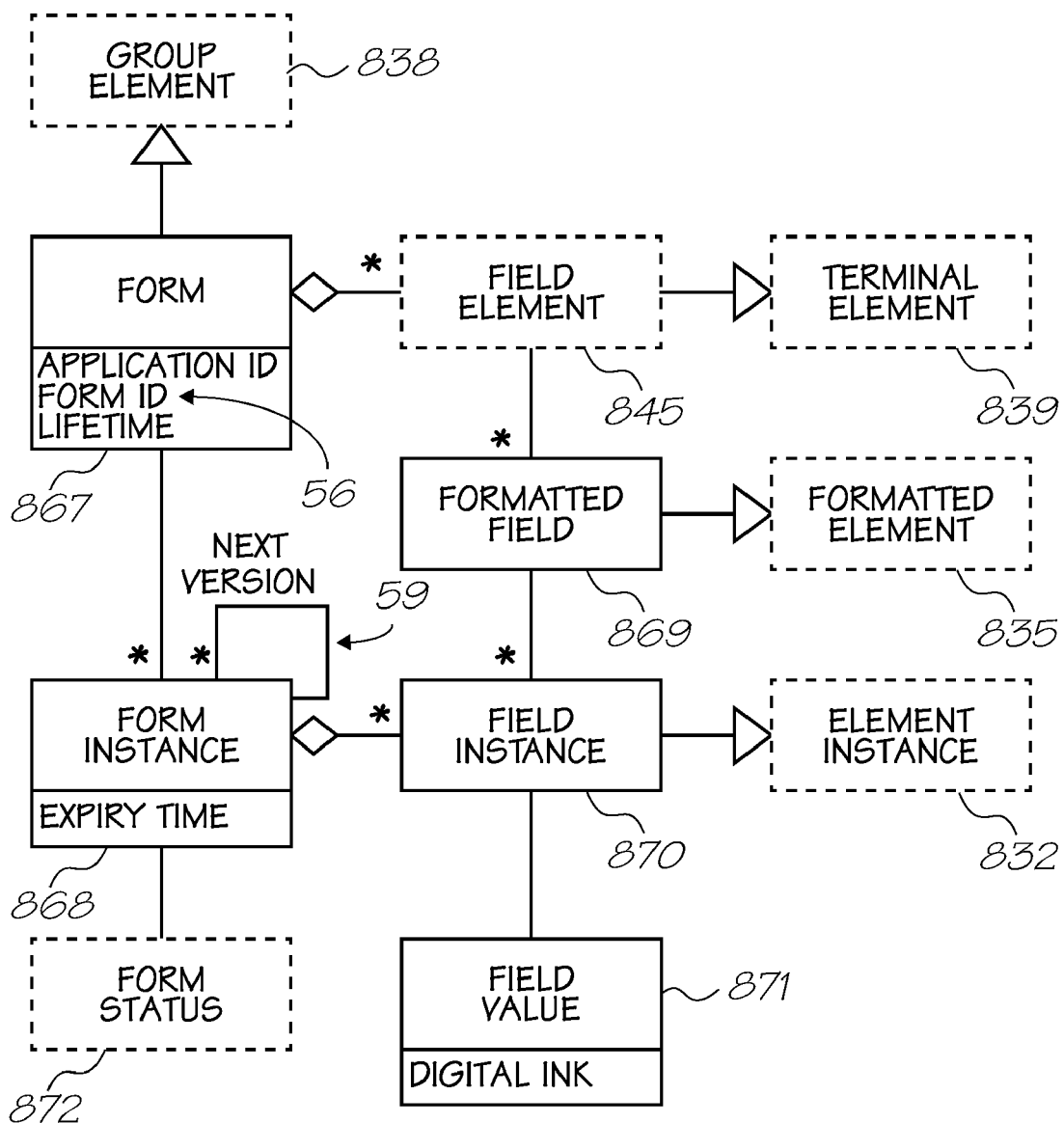
FIG. 32 is a schematic view of a form class diagram.

A form 867 is a group element 838 in the document hierarchy. It ultimately contains a set of terminal field elements 839. A form instance 868 represents a printed instance of a form. It consists of a set of field instances 870 which correspond to the field elements 845 of the form. Each field instance has an associated value 871, whose type depends on the type of the corresponding field element. Each field value records input through a particular printed form instance, i.e. through one or more printed netpages. The form class diagram is shown in FIG. 32.

Each form instance has a status 872 which indicates whether the form is active, frozen, submitted, void or expired. A form is active when first printed. A form becomes frozen once it is signed. A form becomes submitted once one of its submission hyperlinks has been activated, unless the hyperlink has its "submit delta" attribute set. A form becomes void when the user invokes a void form, reset form or duplicate form page command. A form expires when the time the form has been active exceeds the form's specified lifetime. While the form is active, form input is allowed. Input through a form which is not active is instead captured in the background field 833 of the relevant page instance.

When the form is active or frozen, form submission is allowed. Any attempt to submit a form when the form is not active or frozen is rejected, and instead elicits an form status report.

Each form instance is associated (at 59) with any form instances derived from it, thus providing a version history. This allows all but the latest version of a form in a particular time period to be excluded from a search.

Figure 33:
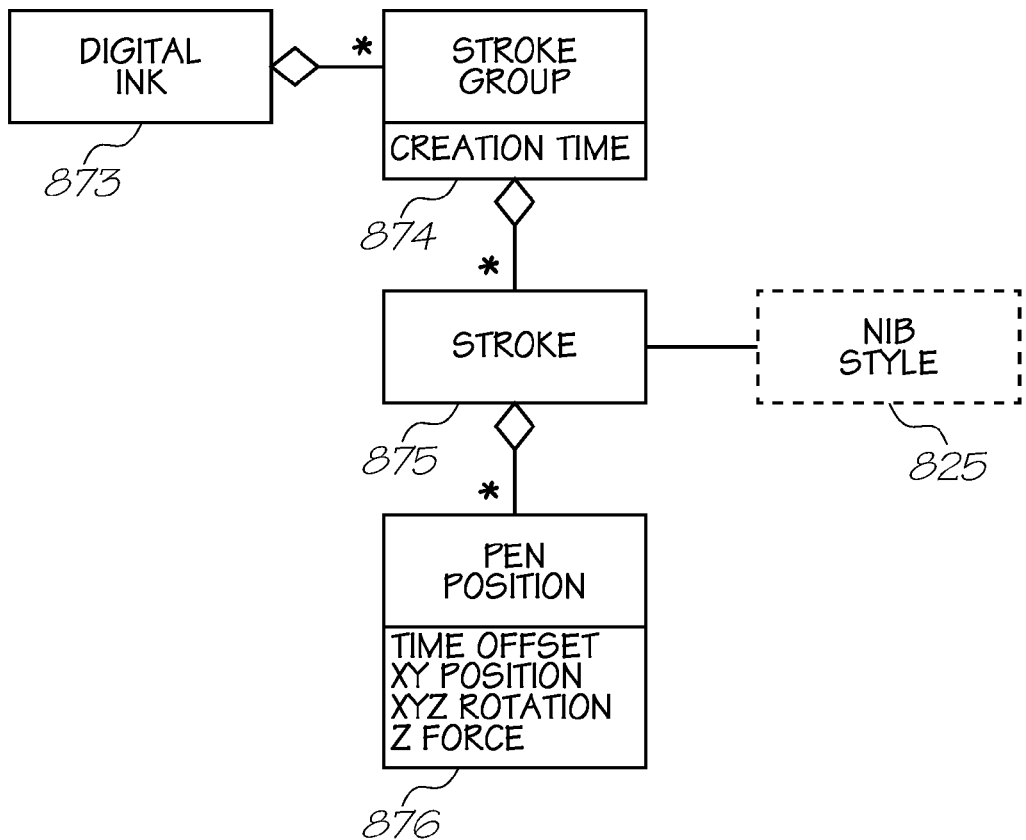
FIG. 33 is a schematic view of a digital ink class diagram.

All input is captured as digital ink. Digital ink 873 consists of a set of timestamped stroke groups 874, each of which consists of a set of styled strokes 875. Each stroke consists of a set of timestamped pen positions 876, each of which also includes pen orientation and nib force. The digital ink class diagram is shown in FIG. 33.

Figure 34:
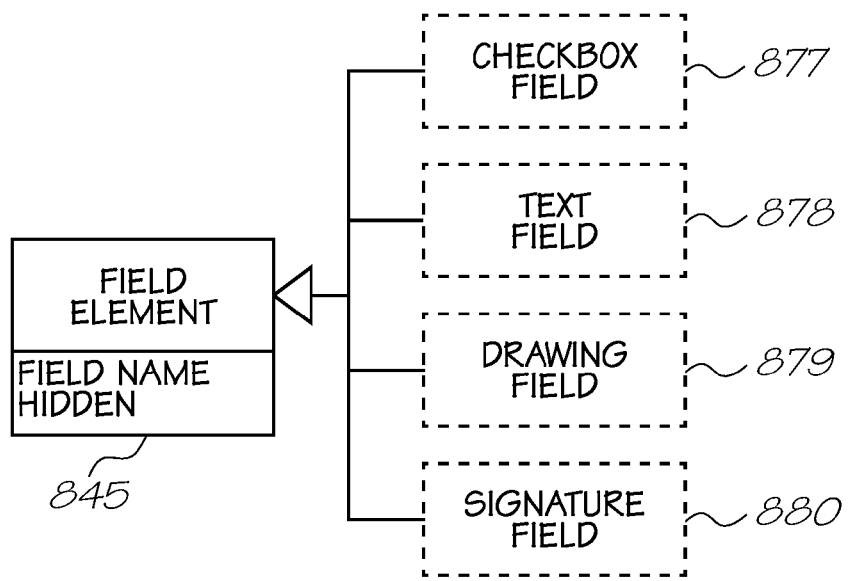
FIG. 34 is a schematic view of a field element specialization class diagram.

A field element 845 can be a checkbox field 877, a text field 878, a drawing field 879, or a signature field 880. The field element class diagram is shown in FIG. 34. Any digital ink captured in a field's zone 58 is assigned to the field.

Figure 35:
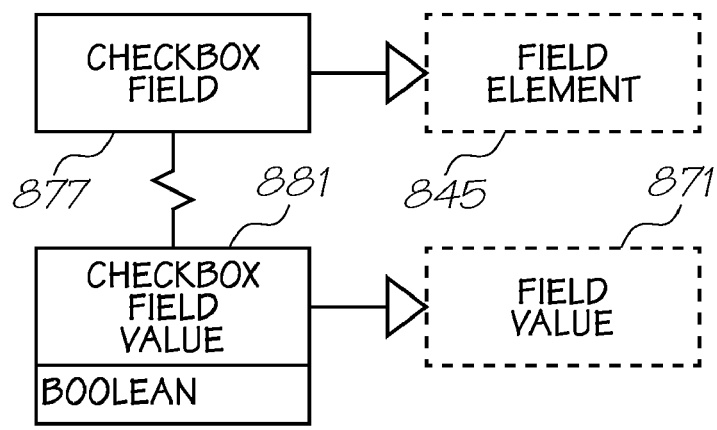
FIG. 35 is a schematic view of a checkbox field class diagram.

A checkbox field has an associated boolean value 881, as shown in FIG. 35. Any mark (a tick, a cross, a stroke, a fill zigzag, etc.) captured in a checkbox field's zone causes a true value to be assigned to the field's value.

Figure 36:
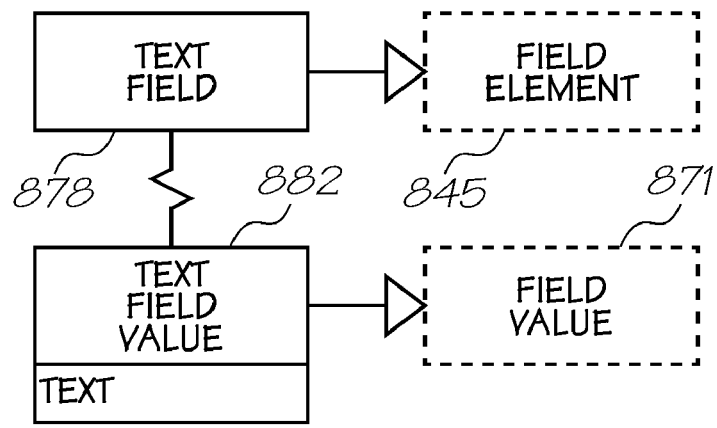
FIG. 36 is a schematic view of a text field class diagram.

A text field has an associated text value 882, as shown in FIG. 36. Any digital ink captured in a text field's zone is automatically converted to text via online handwriting recognition, and the text is assigned to the field's value. Online handwriting recognition is well-understood (see for example Tappert, C., C. Y. Suen and T. Wakahara, "The State of the Art in On-Line Handwriting Recognition", IEEE Transactions on Pattern Analysis and Machine Intelligence, Vol. 12, No. 8, August 1990).

Figure 37:
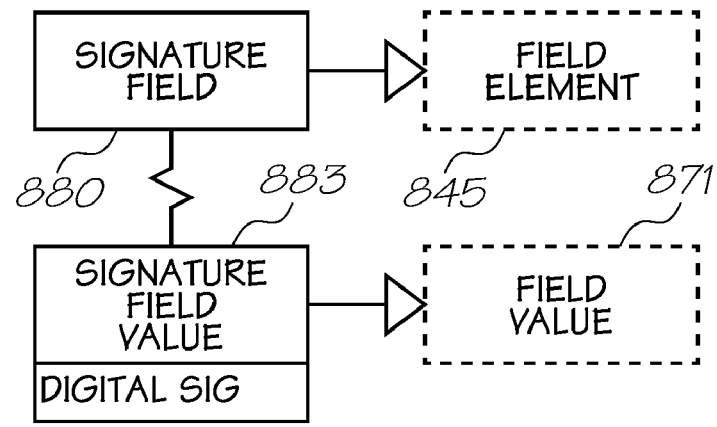
FIG. 37 is a schematic view of a signature field class diagram.

A signature field has an associated digital signature value 883, as shown in FIG. 37. Any digital ink captured in a signature field's zone is automatically verified with respect to the identity of the owner of the pen, and a digital signature of the content of the form of which the field is part is generated and assigned to the field's value. The digital signature is generated using the pen user's private signature key specific to the application which owns the form. Online signature verification is well-understood (see for example Plamondon, R. and G. Lorette, "Automatic Signature Verification and Writer Identification—The State of the Art", Pattern Recognition, Vol. 22, No. 2, 1989).

A field element is hidden if its "hidden" attribute is set. A hidden field element does not have an input zone on a page and does not accept input. It can have an associated field value which is included in the form data when the form containing the field is submitted. "Editing" commands, such as strikethroughs indicating deletion, can also be recognized in form fields.

Because the handwriting recognition algorithm works "online" (i.e. with access to the dynamics of the pen movement), rather than "offline" (i.e. with access only to a bitmap of pen markings), it can recognize run-on discretely-written characters with relatively high accuracy, without a writer-dependent training phase. A writer-dependent model of handwriting is automatically generated over time, however, and can be generated up-front if necessary, Digital ink, as already stated, consists of a sequence of strokes. Any stroke which starts in a particular element's zone is appended to that element's digital ink stream, ready for interpretation. Any stroke not appended to an object's digital ink stream is appended to the background field's digital ink stream.

Digital ink captured in the background field is interpreted as a selection gesture. Circumscription of one or more objects is generally interpreted as a selection of the circumscribed objects, although the actual interpretation is application-specific.

Table 2 summarizes these various pen interactions with a netpage.

TABLE 2

Summary of pen interactions with a netpage

| Object | Type | Pen input | Action |
| --- | --- | --- | --- |
| Hyperlink | General | Click | Submit action to application |
| | Form | Click | Submit form to application |
| | Selection | Click | Submit selection to application |
| Form field | Checkbox | Any mark | Assign true to field |
| | Text | Handwriting | Convert digital ink to text; assign text to field |
| | Drawing | Digital ink | Assign digital ink to field |
| | Signature | Signature | Verify digital ink signature; generate digital signature of form; assign digital signature to field |
| None | — | Circumscription | Assign digital ink to current selection |

The system maintains a current selection for each pen. The selection consists simply of the most recent stroke captured in the background field. The selection is cleared after an inactivity timeout to ensure predictable behavior.

The raw digital ink captured in every field is retained on the netpage page server and is optionally transmitted with the form data when the form is submitted to the application. This allows the application to interrogate the raw digital ink should it suspect the original conversion, such as the conversion of handwritten text. This can, for example, involve human intervention at the application level for forms that fail certain application-specific consistency checks. As an extension to this, the entire background area of a form can be designated as a drawing field. The application can then decide, on the basis of the presence of digital ink outside the explicit fields of the form, to route the form to a human operator, on the assumption that the user may have indicated amendments to the filled-in fields outside of those fields.

Figure 38:
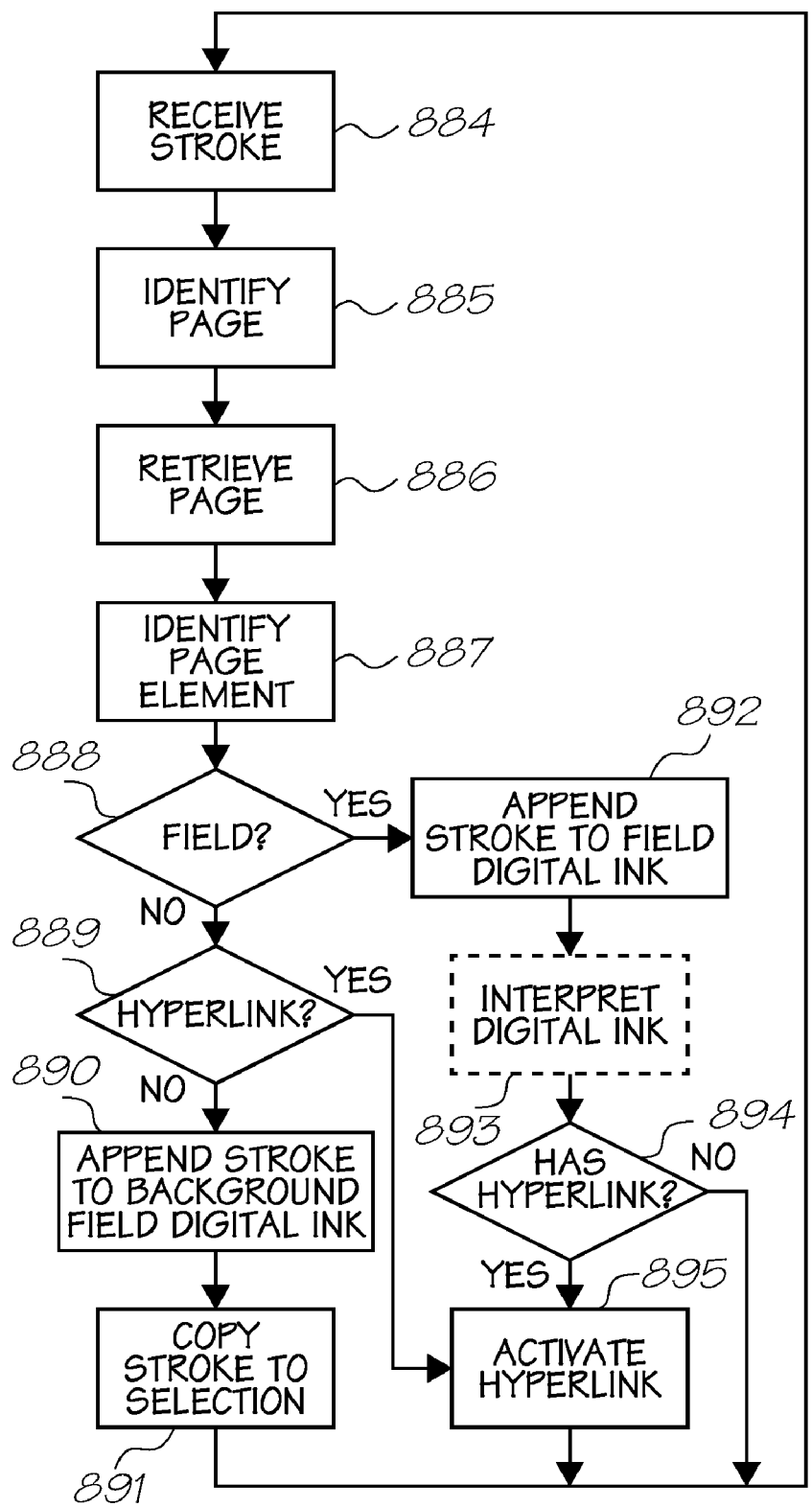
FIG. 38 is a flowchart of an input processing algorithm.

FIG. 38 shows a flowchart of the process of handling pen input relative to a netpage. The process consists of receiving (at 884) a stroke from the pen; identifying (at 885) the page instance 830 to which the page ID 50 in the stroke refers; retrieving (at 886) the page description 5; identifying (at 887) a formatted element 839 whose zone 58 the stroke intersects; determining (at 888) whether the formatted element corresponds to a field element, and if so appending (at 892) the received stroke to the digital ink of the field value 871, interpreting (at 893) the accumulated digital ink of the field, and determining (at 894) whether the field is part of a hyperlinked group 866 and if so activating (at 895) the associated hyperlink; alternatively determining (at 889) whether the formatted element corresponds to a hyperlink element and if so activating (at 895) the corresponding hyperlink; alternatively, in the absence of an input field or hyperlink, appending (at 890) the received stroke to the digital ink of the background field 833; and copying (at 891) the received stroke to the current selection 826 of the current pen, as maintained by the registration server.

Figure 38A:
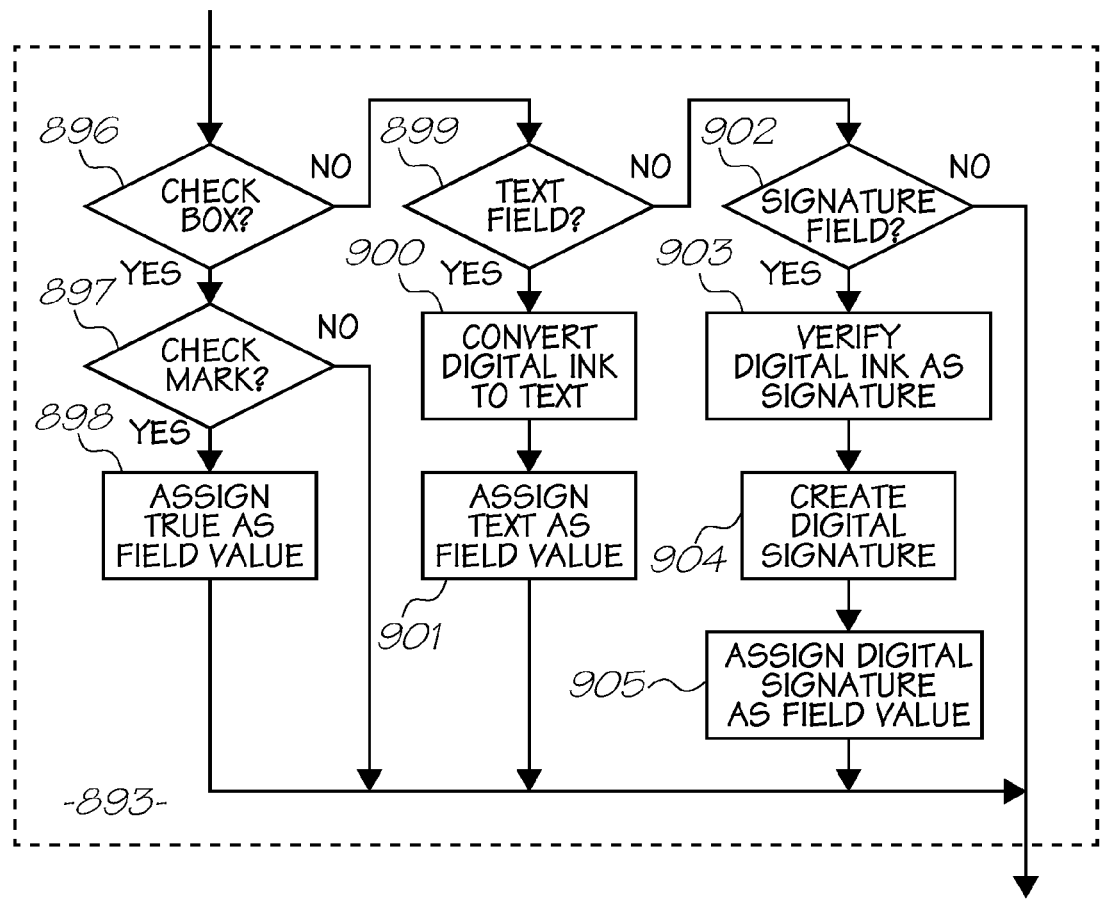
FIG. 38a is a detailed flowchart of one step of the flowchart of FIG. 38.

FIG. 38*a* shows a detailed flowchart of step 893 in the process shown in FIG. 38, where the accumulated digital ink of a field is interpreted according to the type of the field. The process consists of determining (at 896) whether the field is a checkbox and (at 897) whether the digital ink represents a checkmark, and if so assigning (at 898) a true value to the field value; alternatively determining (at 899) whether the field is a text field and if so converting (at 900) the digital ink to computer text, with the help of the appropriate registration server, and assigning (at 901) the converted computer text to the field value; alternatively determining (at 902) whether the field is a signature field and if so verifying (at 903) the digital ink as the signature of the pen's owner, with the help of the appropriate registration server, creating (at 904) a digital signature of the contents of the corresponding form, also with the help of the registration server and using the pen owner's private signature key relating to the corresponding application, and assigning (at 905) the digital signature to the field value.

1.7.3 Page Server Commands

A page server command is a command which is handled locally by the page server. It operates directly on form, page and document instances.

Figure 39:
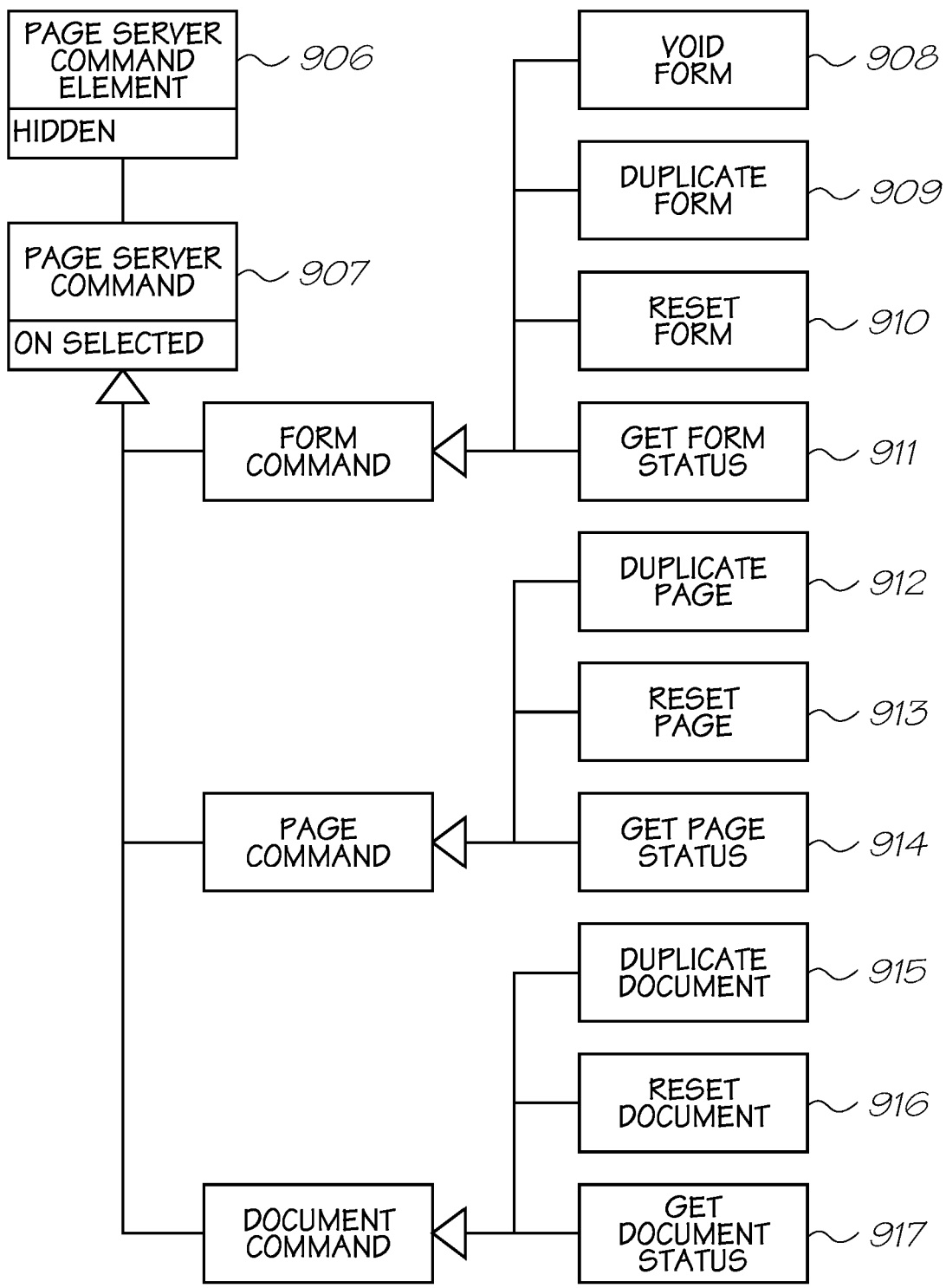
FIG. 39 is a schematic view of a page server command element class diagram.

A page server command 907 can be a void form command 908, a duplicate form command 909, a reset form command 910, a get form status command 911, a duplicate page command 912, a reset page command 913, a get page status command 914, a duplicate document command 915, a reset document command 916, or a get document status command 917, as shown in FIG. 39.

A void form command voids the corresponding form instance. A duplicate form command voids the corresponding form instance and then produces an active printed copy of the current form instance with field values preserved. The copy contains the same hyperlink transaction IDs as the original, and so is indistinguishable from the original to an application. A reset form command voids the corresponding form instance and then produces an active printed copy of the form instance with field values discarded. A get form status command produces a printed report on the status of the corresponding form instance, including who published it, when it was printed, for whom it was printed, and the form status of the form instance.

Since a form hyperlink instance contains a transaction ID, the application has to be involved in producing a new form instance. A button requesting a new form instance is therefore typically implemented as a hyperlink.

A duplicate page command produces a printed copy of the corresponding page instance with the background field value preserved. If the page contains a form or is part of a form, then the duplicate page command is interpreted as a duplicate form command. A reset page command produces a printed copy of the corresponding page instance with the background field value discarded. If the page contains a form or is part of a form, then the reset page command is interpreted as a reset form command. A get page status command produces a printed report on the status of the corresponding page instance, including who published it, when it was printed, for whom it was printed, and the status of any forms it contains or is part of.

The netpage logo which appears on every netpage is usually associated with a duplicate page element.

When a page instance is duplicated with field values preserved, field values are printed in their native form, i.e. a checkmark appears as a standard checkmark graphic, and text appears as typeset text. Only drawings and signatures appear in their original form, with a signature accompanied by a standard graphic indicating successful signature verification.

A duplicate document command produces a printed copy of the corresponding document instance with background field values preserved. If the document contains any forms, then the duplicate document command duplicates the forms in the same way a duplicate form command does. A reset document command produces a printed copy of the corresponding document instance with background field values discarded. If the document contains any forms, then the reset document command resets the forms in the same way a reset form command does. A get document status command produces a printed report on the status of the corresponding document instance, including who published it, when it was printed, for whom it was printed, and the status of any forms it contains.

If the page server command's "on selected" attribute is set, then the command operates on the page identified by the pen's current selection rather than on the page containing the command. This allows a menu of page server commands to be printed. If the target page doesn't contain a page server command element for the designated page server command, then the command is ignored.

An application can provide application-specific handling by embedding the relevant page server command element in a hyperlinked group. The page server activates the hyperlink associated with the hyperlinked group rather than executing the page server command.

A page server command element is hidden if its "hidden" attribute is set. A hidden command element does not have an input zone on a page and so cannot be activated directly by a user. It can, however, be activated via a page server command embedded in a different page, if that page server command has its "on selected" attribute set.

1.8 Standard Features of Netpages

In the preferred form, each netpage is printed with the netpage logo at the bottom to indicate that it is a netpage and therefore has interactive properties. The logo also acts as a copy button. In most cases pressing the logo produces a copy of the page. In the case of a form, the button produces a copy of the entire form. And in the case of a secure document, such as a ticket or coupon, the button elicits an explanatory note or advertising page.

The default single-page copy function is handled directly by the relevant netpage page server. Special copy functions are handled by linking the logo button to an application.

1.9 User Help System

In a preferred embodiment, the netpage printer has a single button labelled "Help". When pressed it elicits a single page of information, including:

- status of printer connection
- status of printer consumables
- top-level help menu
- document function menu
- top-level netpage network directory The help menu provides a hierarchical manual on how to use the netpage system.

The document function menu includes the following functions:

- print a copy of a document
- print a clean copy of a form
- print the status of a document A document function is initiated by simply pressing the button and then touching any page of the document. The status of a document indicates who published it and when, to whom it was delivered, and to whom and when it was subsequently submitted as a form.

The netpage network directory allows the user to navigate the hierarchy of publications and services on the network. As an alternative, the user can call the netpage network "900" number "yellow pages" and speak to a human operator. The operator can locate the desired document and route it to the user's printer. Depending on the document type, the publisher or the user pays the small "yellow pages" service fee.

The help page is obviously unavailable if the printer is unable to print. In this case the "error" light is lit and the user can request remote diagnosis over the network.

2 Personalized Publication Model

In the following description, news is used as a canonical publication example to illustrate personalization mechanisms in the netpage system. Although news is often used in the limited sense of newspaper and newsmagazine news, the intended scope in the present context is wider.

In the netpage system, the editorial content and the advertising content of a news publication are personalized using different mechanisms. The editorial content is personalized according to the reader's explicitly stated and implicitly captured interest profile. The advertising content is personalized according to the reader's locality and demographic.

2.1 Editorial Personalization

A subscriber can draw on two kinds of news sources: those that deliver news publications, and those that deliver news streams. While news publications are aggregated and edited by the publisher, news streams are aggregated either by a news publisher or by a specialized news aggregator. News publications typically correspond to traditional newspapers and newsmagazines, while news streams can be many and varied: a "raw" news feed from a news service, a cartoon strip, a freelance writer's column, a friend's bulletin board, or the reader's own e-mail.

The netpage publication server supports the publication of edited news publications as well as the aggregation of multiple news streams. By handling the aggregation and hence the formatting of news streams selected directly by the reader, the server is able to place advertising on pages over which it otherwise has no editorial control.

The subscriber builds a daily newspaper by selecting one or more contributing news publications, and creating a personalized version of each. The resulting daily editions are printed and bound together into a single newspaper. The various members of a household typically express their different interests and tastes by selecting different daily publications and then customizing them.

For each publication, the reader optionally selects specific sections. Some sections appear daily, while others appear weekly. The daily sections available from The New York Times online, for example, include "Page One Plus", "National", "International", "Opinion", "Business", "Arts/Living", "Technology", and "Sports". The set of available sections is specific to a publication, as is the default subset.

The reader can extend the daily newspaper by creating custom sections, each one drawing on any number of news streams. Custom sections might be created for e-mail and friends' announcements ("Personal"), or for monitoring news feeds for specific topics ("Alerts" or "Clippings").

For each section, the reader optionally specifies its size, either qualitatively (e.g. short, medium, or long), or numerically (i.e. as a limit on its number of pages), and the desired proportion of advertising, either qualitatively (e.g. high, normal, low, none), or numerically (i.e. as a percentage).

The reader also optionally expresses a preference for a large number of shorter articles or a small number of longer articles. Each article is ideally written (or edited) in both short and long forms to support this preference.

An article may also be written (or edited) in different versions to match the expected sophistication of the reader, for example to provide children's and adults' versions. The appropriate version is selected according to the reader's age. The reader can specify a "reading age" which takes precedence over their biological age.

The articles which make up each section are selected and prioritized by the editors, and each is assigned a useful lifetime. By default they are delivered to all relevant subscribers, in priority order, subject to space constraints in the subscribers' editions.

In sections where it is appropriate, the reader may optionally enable collaborative filtering. This is then applied to articles which have a sufficiently long lifetime. Each article which qualifies for collaborative filtering is printed with rating buttons at the end of the article. The buttons can provide an easy choice (e.g. "liked" and "disliked"), making it more likely that readers will bother to rate the article.

Articles with high priorities and short lifetimes are therefore effectively considered essential reading by the editors and are delivered to most relevant subscribers.

The reader optionally specifies a serendipity factor, either qualitatively (e.g. do or don't surprise me), or numerically. A high serendipity factor lowers the threshold used for matching during collaborative filtering. A high factor makes it more likely that the corresponding section will be filled to the reader's specified capacity. A different serendipity factor can be specified for different days of the week.

The reader also optionally specifies topics of particular interest within a section, and this modifies the priorities assigned by the editors.

The speed of the reader's Internet connection affects the quality at which images can be delivered. The reader optionally specifies a preference for fewer images or smaller images or both. If the number or size of images is not reduced, then images may be delivered at lower quality (i.e. at lower resolution or with greater compression).

At a global level, the reader specifies how quantities, dates, times and monetary values are localized. This involves specifying whether units are imperial or metric, a local timezone and time format, and a local currency, and whether the localization consist of in situ translation or annotation. These preferences are derived from the reader's locality by default.

To reduce reading difficulties caused by poor eyesight, the reader optionally specifies a global preference for a larger presentation. Both text and images are scaled accordingly, and less information is accommodated on each page.

The language in which a news publication is published, and its corresponding text encoding, is a property of the publication and not a preference expressed by the user. However, the netpage system can be configured to provide automatic translation services in various guises.

2.2 Advertising Localization and Targeting

The personalization of the editorial content directly affects the advertising content, because advertising is typically placed to exploit the editorial context. Travel ads, for example, are more likely to appear in a travel section than elsewhere. The value of the editorial content to an advertiser (and therefore to the publisher) lies in its ability to attract large numbers of readers with the right demographics.

Effective advertising is placed on the basis of locality and demographics. Locality determines proximity to particular services, retailers etc., and particular interests and concerns associated with the local community and environment. Demographics determine general interests and preoccupations as well as likely spending patterns.

A news publisher's most profitable product is advertising "space", a multi-dimensional entity determined by the publication's geographic coverage, the size of its readership, its readership demographics, and the page area available for advertising.

In the netpage system, the netpage publication server computes the approximate multi-dimensional size of a publication's saleable advertising space on a per-section basis, taking into account the publication's geographic coverage, the section's readership, the size of each reader's section edition, each reader's advertising proportion, and each reader's demographic.

In comparison with other media, the netpage system allows the advertising space to be defined in greater detail, and allows smaller pieces of it to be sold separately. It therefore allows it to be sold at closer to its true value.

For example, the same advertising "slot" can be sold in varying proportions to several advertisers, with individual readers' pages randomly receiving the advertisement of one advertiser or another, overall preserving the proportion of space sold to each advertiser.

The netpage system allows advertising to be linked directly to detailed product information and online purchasing. It therefore raises the intrinsic value of the advertising space.

Because personalization and localization are handled automatically by netpage publication servers, an advertising aggregator can provide arbitrarily broad coverage of both geography and demographics. The subsequent disaggregation is efficient because it is automatic. This makes it more cost-effective for publishers to deal with advertising aggregators than to directly capture advertising. Even though the advertising aggregator is taking a proportion of advertising revenue, publishers may find the change profit-neutral because of the greater efficiency of aggregation. The advertising aggregator acts as an intermediary between advertisers and publishers, and may place the same advertisement in multiple publications.

It is worth noting that ad placement in a netpage publication can be more complex than ad placement in the publication's traditional counterpart, because the publication's advertising space is more complex. While ignoring the full complexities of negotiations between advertisers, advertising aggregators and publishers, the preferred form of the netpage system provides some automated support for these negotiations, including support for automated auctions of advertising space. Automation is particularly desirable for the placement of advertisements which generate small amounts of income, such as small or highly localized advertisements.

Once placement has been negotiated, the aggregator captures and edits the advertisement and records it on a netpage ad server. Correspondingly, the publisher records the ad placement on the relevant netpage publication server. When the netpage publication server lays out each user's personalized publication, it picks the relevant advertisements from the netpage ad server.

2.3 User Profiles

2.3.1 Information Filtering

The personalization of news and other publications relies on an assortment of user-specific profile information, including:

publication customizations
collaborative filtering vectors
contact details
presentation preferences The customization of a publication is typically publication-specific, and so the customization information is maintained by the relevant netpage publication server.

A collaborative filtering vector consists of the user's ratings of a number of news items. It is used to correlate different users' interests for the purposes of making recommendations. Although there are benefits to maintaining a single collaborative filtering vector independently of any particular publication, there are two reasons why it is more practical to maintain a separate vector for each publication: there is likely to be more overlap between the vectors of subscribers to the same publication than between those of subscribers to different publications; and a publication is likely to want to present its users' collaborative filtering vectors as part of the value of its brand, not to be found elsewhere. Collaborative filtering vectors are therefore also maintained by the relevant netpage publication server.

Contact details, including name, street address, ZIP Code, state, country, telephone numbers, are global by nature, and are maintained by a netpage registration server.

Presentation preferences, including those for quantities, dates and times, are likewise global and maintained in the same way.

The localization of advertising relies on the locality indicated in the user's contact details, while the targeting of advertising relies on personal information such as date of birth, gender, marital status, income, profession, education, or qualitative derivatives such as age range and income range.

For those users who choose to reveal personal information for advertising purposes, the information is maintained by the relevant netpage registration server. In the absence of such information, advertising can be targeted on the basis of the demographic associated with the user's ZIP or ZIP+4 Code.

Each user, pen, printer, application provider and application is assigned its own unique identifier, and the netpage registration server maintains the relationships between them, as shown in FIGS. 21, 22, 23 and 24. For registration purposes, a publisher is a special kind of application provider, and a publication is a special kind of application.

Each user 800 may be authorized to use any number of printers 802, and each printer may allow any number of users to use it. Each user has a single default printer (at 66), to which periodical publications are delivered by default, whilst pages printed on demand are delivered to the printer through which the user is interacting. The server keeps track of which publishers a user has authorized to print to the user's default printer. A publisher does not record the ID of any particular printer, but instead resolves the ID when it is required.

When a user subscribes 808 to a publication 807, the publisher 806 (i.e. application provider 803) is authorized to print to a specified printer or the user's default printer. This authorization can be revoked at any time by the user. Each user may have several pens 801, but a pen is specific to a single user. If a user is authorized to use a particular printer, then that printer recognizes any of the user's pens.

The pen ID is used to locate the corresponding user profile maintained by a particular netpage registration server, via the DNS in the usual way.

A Web terminal 809 can be authorized to print on a particular netpage printer, allowing Web pages and netpage documents encountered during Web browsing to be conveniently printed on the nearest netpage printer.

The netpage system can collect, on behalf of a printer provider, fees and commissions on income earned through publications printed on the provider's printers. Such income can include advertising fees, click-through fees, e-commerce commissions, and transaction fees. If the printer is owned by the user, then the user is the printer provider.

Each user also has a netpage account 820 which is used to accumulate micro-debits and credits (such as those described in the preceding paragraph); contact details 815, including name, address and telephone numbers; global preferences 816, including privacy, delivery and localization settings; any number of biometric records 817, containing the user's encoded signature 818, fingerprint 819 etc; a handwriting model 819 automatically maintained by the system; and SET payment card accounts 821 with which e-commerce payments can be made.

2.3.2 Favorites List

Figure 41:
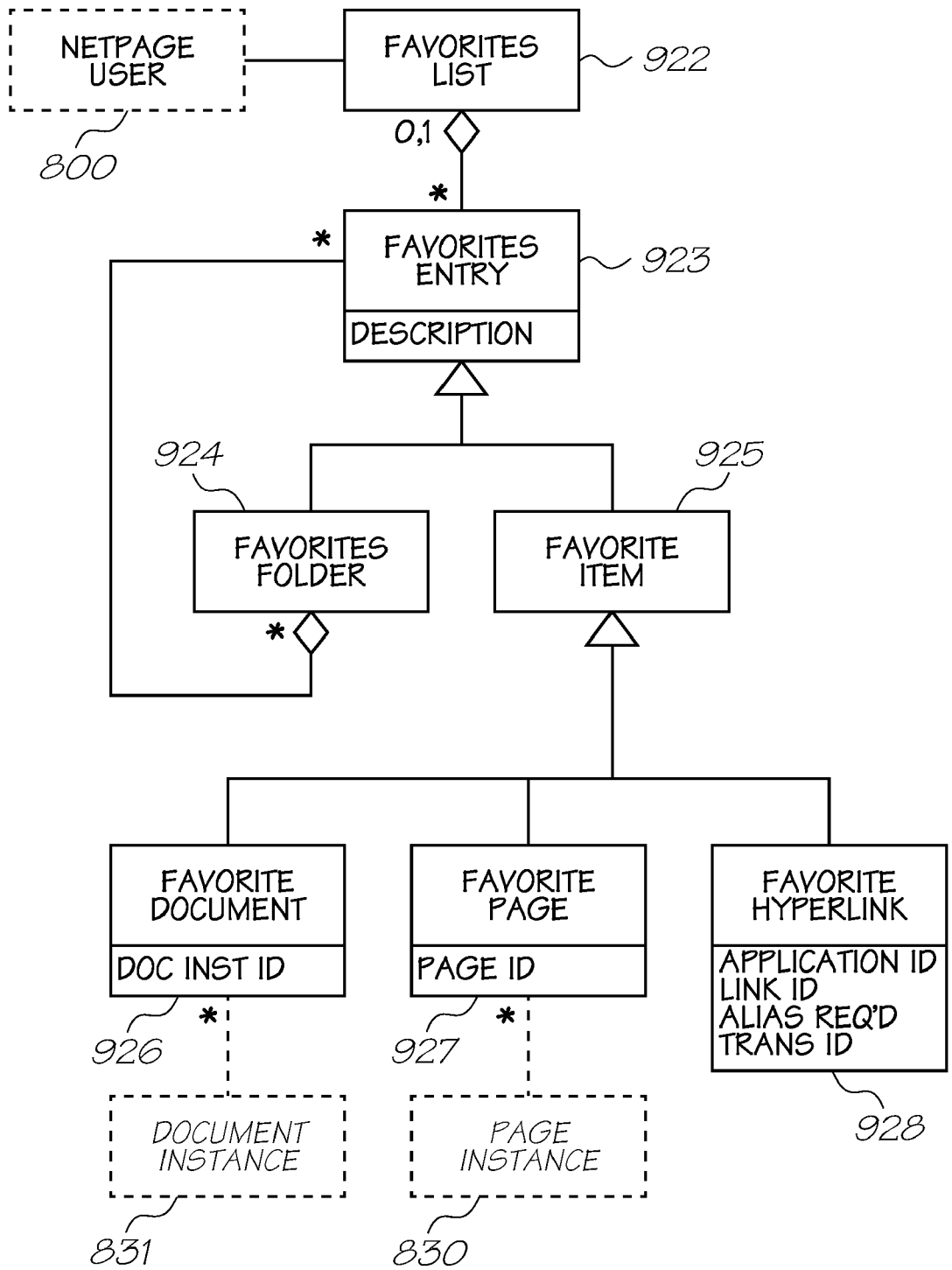
FIG. 41 is a schematic view of a favorites list class diagram.

A netpage user can maintain a list 922 of "favorites"—links to useful documents etc. on the netpage network. The list is maintained by the system on the user's behalf. It is organized as a hierarchy of folders 924, a preferred embodiment of which is shown in the class diagram in FIG. 41.

2.3.3 History List

Figure 42:
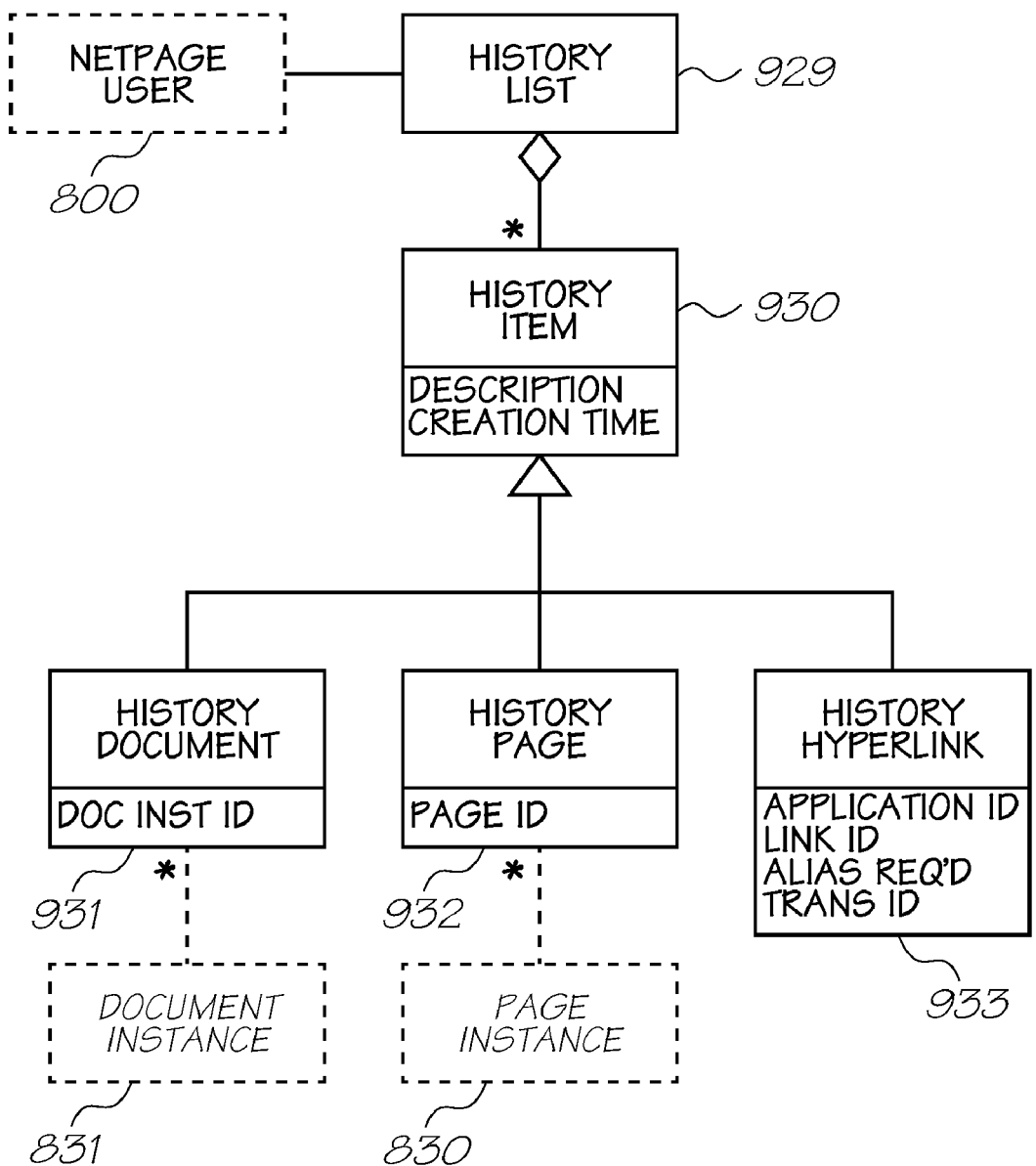
FIG. 42 is a schematic view of a history list class diagram.

The system maintains a history list 929 on each user's behalf, containing links to documents etc. accessed by the user through the netpage system. It is organized as a date-ordered list, a preferred embodiment of which is shown in the class diagram in FIG. 42.

2.4 Intelligent Page Layout

The netpage publication server automatically lays out the pages of each user's personalized publication on a section-by-section basis. Since most advertisements are in the form of pre-formatted rectangles, they are placed on the page before the editorial content.

The advertising ratio for a section can be achieved with wildly varying advertising ratios on individual pages within the section, and the ad layout algorithm exploits this. The algorithm is configured to attempt to co-locate closely tied editorial and advertising content, such as placing ads for roofing material specifically within the publication because of a special feature on do-it-yourself roofing repairs.

The editorial content selected for the user, including text and associated images and graphics, is then laid out according to various aesthetic rules.

The entire process, including the selection of ads and the selection of editorial content, must be iterated once the layout has converged, to attempt to more closely achieve the user's stated section size preference. The section size preference can, however, be matched on average over time, allowing significant day-to-day variations.

2.5 Document Format

Once the document is laid out, it is encoded for efficient distribution and persistent storage on the netpage network.

The primary efficiency mechanism is the separation of information specific to a single user's edition and information shared between multiple users' editions. The specific information consists of the page layout. The shared information consists of the objects to which the page layout refers, including images, graphics, and pieces of text.

A text object contains fully-formatted text represented in the Extensible Markup Language (XML) using the Extensible Stylesheet Language (XSL). XSL provides precise control over text formatting independently of the region into which the text is being set, which in this case is being provided by the layout. The text object contains embedded language codes to enable automatic translation, and embedded hyphenation hints to aid with paragraph formatting.

An image object encodes an image in the JPEG 2000 wavelet-based compressed image format. A graphic object encodes a 2D graphic in Scalable Vector Graphics (SVG) format.

The layout itself consists of a series of placed image and graphic objects, linked textflow objects through which text objects flow, hyperlinks and input fields as described above, and watermark regions. These layout objects are summarized in Table 3. The layout uses a compact format suitable for efficient distribution and storage.

TABLE 3 netpage layout objects

| Layout object | Attribute | Format of linked object |
|---|---|---|
| Image | Position | — |
| | Image object ID | JPEG 2000 |
| Graphic | Position | — |
| | Graphic object ID | SVG |
| Textflow | Textflow ID | — |
| | Zone | — |
| | Optional text object ID | XML/XSL |
| Hyperlink | Type | — |
| | Zone | — |
| | Application ID, etc. | — |
| Field | Type | — |
| | Meaning | — |
| | Zone | — |
| Watermark | Zone | — |

2.6 Document Distribution

As described above, for purposes of efficient distribution and persistent storage on the netpage network, a user-specific page layout is separated from the shared objects to which it refers.

When a subscribed publication is ready to be distributed, the netpage publication server allocates, with the help of the netpage ID server 12, a unique ID for each page, page instance, document, and document instance.

The server computes a set of optimized subsets of the shared content and creates a multicast channel for each subset, and then tags each user-specific layout with the names of the multicast channels which will carry the shared content used by that layout. The server then pointcasts each user's layouts to that user's printer via the appropriate page server, and when the pointcasting is complete, multicasts the shared content on the specified channels. After receiving its pointcast, each page server and printer subscribes to the multicast channels specified in the page layouts. During the multicasts, each page server and printer extracts from the multicast streams those objects referred to by its page layouts. The page servers persistently archive the received page layouts and shared content.

Once a printer has received all the objects to which its page layouts refer, the printer re-creates the fully-populated layout and then rasterizes and prints it.

Under normal circumstances, the printer prints pages faster than they can be delivered. Assuming a quarter of each page is covered with images, the average page has a size of less than 400 KB. The printer can therefore hold in excess of 100 such pages in its internal 64 MB memory, allowing for temporary buffers etc. The printer prints at a rate of one page per second. This is equivalent to 400 KB or about 3 Mbit of page data per second, which is similar to the highest expected rate of page data delivery over a broadband network.

Even under abnormal circumstances, such as when the printer runs out of paper, it is likely that the user will be able to replenish the paper supply before the printer's 100-page internal storage capacity is exhausted.

However, if the printer's internal memory does fill up, then the printer will be unable to make use of a multicast when it first occurs. The netpage publication server therefore allows printers to submit requests for re-multicasts. When a critical number of requests is received or a timeout occurs, the server re-multicasts the corresponding shared objects.

Once a document is printed, a printer can produce an exact duplicate at any time by retrieving its page layouts and contents from the relevant page server.

2.7 On-Demand Documents

When a netpage document is requested on demand, it can be personalized and delivered in much the same way as a periodical. However, since there is no shared content, delivery is made directly to the requesting printer without the use of multicast.

When a non-netpage document is requested on demand, it is not personalized, and it is delivered via a designated netpage formatting server which reformats it as a netpage document. A netpage formatting server is a special instance of a netpage publication server. The netpage formatting server has knowledge of various Internet document formats, including Adobe's Portable Document Format (PDF), and Hypertext Markup Language (HTML). In the case of HTML, it can make use of the higher resolution of the printed page to present Web pages in a multi-column format, with a table of contents. It can automatically include all Web pages directly linked to the requested page. The user can tune this behavior via a preference.

The netpage formatting server makes standard netpage behavior, including interactivity and persistence, available on any Internet document, no matter what its origin and format. It hides knowledge of different document formats from both the netpage printer and the netpage page server, and hides knowledge of the netpage system from Web servers.

3 Security

3.1 Cryptography

Cryptography is used to protect sensitive information, both in storage and in transit, and to authenticate parties to a transaction. There are two classes of cryptography in widespread use: secret-key cryptography and public-key cryptography. The netpage network uses both classes of cryptography.

Secret-key cryptography, also referred to as symmetric cryptography, uses the same key to encrypt and decrypt a message. Two parties wishing to exchange messages must first arrange to securely exchange the secret key.

Public-key cryptography, also referred to as asymmetric cryptography, uses two encryption keys. The two keys are mathematically related in such a way that any message encrypted using one key can only be decrypted using the other key. One of these keys is then published, while the other is kept private. The public key is used to encrypt any message intended for the holder of the private key. Once encrypted using the public key, a message can only be decrypted using the private key. Thus two parties can securely exchange messages without first having to exchange a secret key. To ensure that the private key is secure, it is normal for the holder of the private key to generate the key pair.

Public-key cryptography can be used to create a digital signature. The holder of the private key can create a known hash of a message and then encrypt the hash using the private key. Anyone can then verify that the encrypted hash constitutes the "signature" of the holder of the private key with respect to that particular message by decrypting the encrypted hash using the public key and verifying the hash against the message. If the signature is appended to the message, then the recipient of the message can verify both that the message is genuine and that it has not been altered in transit.

To make public-key cryptography work, there has to be a way to distribute public keys which prevents impersonation. This is normally done using certificates and certificate authorities. A certificate authority is a trusted third party which authenticates the connection between a public key and someone's identity. The certificate authority verifies the person's identity by examining identity documents, and then creates and signs a digital certificate containing the person's identity details and public key. Anyone who trusts the certificate authority can use the public key in the certificate with a high degree of certainty that it is genuine. They just have to verify that the certificate has indeed been signed by the certificate authority, whose public key is well-known.

In most transaction environments, public-key cryptography is only used to create digital signatures and to securely exchange secret session keys. Secret-key cryptography is used for all other purposes.

In the following discussion, when reference is made to the secure transmission of information between a netpage printer and a server, what actually happens is that the printer obtains the server's certificate, authenticates it with reference to the certificate authority, uses the public key-exchange key in the certificate to exchange a secret session key with the server, and then uses the secret session key to encrypt the message data. A session key, by definition, can have an arbitrarily short lifetime.

3.2 Netpage Printer Security

Each netpage printer is assigned a pair of unique identifiers at time of manufacture which are stored in read-only memory in the printer and in the netpage registration server database. The first ID 62 is public and uniquely identifies the printer on the netpage network. The second ID is secret and is used when the printer is first registered on the network.

When the printer connects to the netpage network for the first time after installation, it creates a signature public/private key pair. It transmits the secret ID and the public key securely to the netpage registration server. The server compares the secret ID against the printer's secret ID recorded in its database, and accepts the registration if the IDs match. It then creates and signs a certificate containing the printer's public ID and public signature key, and stores the certificate in the registration database.

The netpage registration server acts as a certificate authority for netpage printers, since it has access to secret information allowing it to verify printer identity.

When a user subscribes to a publication, a record is created in the netpage registration server database authorizing the publisher to print the publication to the user's default printer or a specified printer. Every document sent to a printer via a page server is addressed to a particular user and is signed by the publisher using the publisher's private signature key. The page server verifies, via the registration database, that the publisher is authorized to deliver the publication to the specified user. The page server verifies the signature using the publisher's public key, obtained from the publisher's certificate stored in the registration database.

The netpage registration server accepts requests to add printing authorizations to the database, so long as those requests are initiated via a pen registered to the printer.

3.3 Netpage Pen Security

Each netpage pen is assigned a unique identifier at time of manufacture which is stored in read-only memory in the pen and in the netpage registration server database. The pen ID 61 uniquely identifies the pen on the netpage network.

A netpage pen can "know" a number of netpage printers, and a printer can "know" a number of pens. A pen communicates with a printer via a radio frequency signal whenever it is within range of the printer. Once a pen and printer are registered, they regularly exchange session keys. Whenever the pen transmits digital ink to the printer, the digital ink is always encrypted using the appropriate session key. Digital ink is never transmitted in the clear.

A pen stores a session key for every printer it knows, indexed by printer ID, and a printer stores a session key for every pen it knows, indexed by pen ID. Both have a large but finite storage capacity for session keys, and will forget a session key on a least-recently-used basis if necessary.

When a pen comes within range of a printer, the pen and printer discover whether they know each other. If they don't know each other, then the printer determines whether it is supposed to know the pen. This might be, for example, because the pen belongs to a user who is registered to use the printer. If the printer is meant to know the pen but doesn't, then it initiates the automatic pen registration procedure. If the printer isn't meant to know the pen, then it agrees with the pen to ignore it until the pen is placed in a charging cup, at which time it initiates the registration procedure.

In addition to its public ID, the pen contains a secret key-exchange key. The key-exchange key is also recorded in the netpage registration server database at time of manufacture. During registration, the pen transmits its pen ID to the printer, and the printer transmits the pen ID to the netpage registration server. The server generates a session key for the printer and pen to use, and securely transmits the session key to the printer. It also transmits a copy of the session key encrypted with the pen's key-exchange key. The printer stores the session key internally, indexed by the pen ID, and transmits the encrypted session key to the pen. The pen stores the session key internally, indexed by the printer ID.

Although a fake pen can impersonate a pen in the pen registration protocol, only a real pen can decrypt the session key transmitted by the printer.

When a previously unregistered pen is first registered, it is of limited use until it is linked to a user. A registered but "un-owned" pen is only allowed to be used to request and fill in netpage user and pen registration forms, to register a new user to which the new pen is automatically linked, or to add a new pen to an existing user.

The pen uses secret-key rather than public-key encryption because of hardware performance constraints in the pen.

3.4 Secure Documents

The netpage system supports the delivery of secure documents such as tickets and coupons. The netpage printer includes a facility to print watermarks, but will only do so on request from publishers who are suitably authorized. The publisher indicates its authority to print watermarks in its certificate, which the printer is able to authenticate.

The "watermark" printing process uses an alternative dither matrix in specified "watermark" regions of the page. Back-to-back pages contain mirror-image watermark regions which coincide when printed. The dither matrices used in odd and even pages' watermark regions are designed to produce an interference effect when the regions are viewed together, achieved by looking through the printed sheet.

The effect is similar to a watermark in that it is not visible when looking at only one side of the page, and is lost when the page is copied by normal means.

Pages of secure documents cannot be copied using the built-in netpage copy mechanism described in Section 1.9 above. This extends to copying netpages on netpage-aware photocopiers.

Secure documents are typically generated as part of e-commerce transactions. They can therefore include the user's photograph which was captured when the user registered biometric information with the netpage registration server, as described in Section 2.

When presented with a secure netpage document, the recipient can verify its authenticity by requesting its status in the usual way. The unique ID of a secure document is only valid for the lifetime of the document, and secure document IDs are allocated non-contiguously to prevent their prediction by opportunistic forgers. A secure document verification pen can be developed with built-in feedback on verification failure, to support easy point-of-presentation document verification.

Clearly neither the watermark nor the user's photograph are secure in a cryptographic sense. They simply provide a significant obstacle to casual forgery. Online document verification, particularly using a verification pen, provides an added level of security where it is needed, but is still not entirely immune to forgeries.

3.5 Non-Repudiation

In the netpage system, forms submitted by users are delivered reliably to forms handlers and are persistently archived on netpage page servers. It is therefore impossible for recipients to repudiate delivery.

E-commerce payments made through the system, as described in Section 4, are also impossible for the payee to repudiate.

4 Electronic Commerce Model 4.1 Secure Electronic Transaction (SET)

The netpage system uses the Secure Electronic Transaction (SET) system as one of its payment systems. SET, having been developed by MasterCard and Visa, is organized around payment cards, and this is reflected in the terminology. However, much of the system is independent of the type of accounts being used.

In SET, cardholders and merchants register with a certificate authority and are issued with certificates containing their public signature keys. The certificate authority verifies a cardholder's registration details with the card issuer as appropriate, and verifies a merchant's registration details with the acquirer as appropriate. Cardholders and merchants store their respective private signature keys securely on their computers. During the payment process, these certificates are used to mutually authenticate a merchant and cardholder, and to authenticate them both to the payment gateway.

SET has not yet been adopted widely, partly because cardholder maintenance of keys and certificates is considered burdensome. Interim solutions which maintain cardholder keys and certificates on a server and give the cardholder access via a password have met with some success.

4.2 SET Payments

In the netpage system the netpage registration server acts as a proxy for the netpage user (i.e. the cardholder) in SET payment transactions.

The netpage system uses biometrics to authenticate the user and authorize SET payments. Because the system is pen-based, the biometric used is the user's on-line signature, consisting of time-varying pen position and pressure. A fingerprint biometric can also be used by designing a fingerprint sensor into the pen, although at a higher cost. The type of biometric used only affects the capture of the biometric, not the authorization aspects of the system.

The first step to being able to make SET payments is to register the user's biometric with the netpage registration server. This is done in a controlled environment, for example a bank, where the biometric can be captured at the same time as the user's identity is verified. The biometric is captured and stored in the registration database, linked to the user's record. The user's photograph is also optionally captured and linked to the record. The SET cardholder registration process is completed, and the resulting private signature key and certificate are stored in the database. The user's payment card information is also stored, giving the netpage registration server enough information to act as the user's proxy in any SET payment transaction.

When the user eventually supplies the biometric to complete a payment, for example by signing a netpage order form, the printer securely transmits the order information, the pen ID and the biometric data to the netpage registration server. The server verifies the biometric with respect to the user identified by the pen ID, and from then on acts as the user's proxy in completing the SET payment transaction.

4.3 Micro-Payments

The netpage system includes a mechanism for micro-payments, to allow the user to be conveniently charged for printing low-cost documents on demand and for copying copyright documents, and possibly also to allow the user to be reimbursed for expenses incurred in printing advertising material. The latter depends on the level of subsidy already provided to the user.

When the user registers for e-commerce, a network account is established which aggregates micro-payments. The user receives a statement on a regular basis, and can settle any outstanding debit balance using the standard payment mechanism.

The network account can be extended to aggregate subscription fees for periodicals, which would also otherwise be presented to the user in the form of individual statements.

4.4 Transactions

When a user requests a netpage in a particular application context, the application is able to embed a user-specific transaction ID 55 in the page. Subsequent input through the page is tagged with the transaction ID, and the application is thereby able to establish an appropriate context for the user's input.

When input occurs through a page which is not user-specific, however, the application must use the user's unique identity to establish a context. A typical example involves adding items from a pre-printed catalog page to the user's virtual "shopping cart". To protect the user's privacy, however, the unique user ID 60 known to the netpage system is not divulged to applications. This is to prevent different application providers from easily correlating independently accumulated behavioral data.

Figure 24:
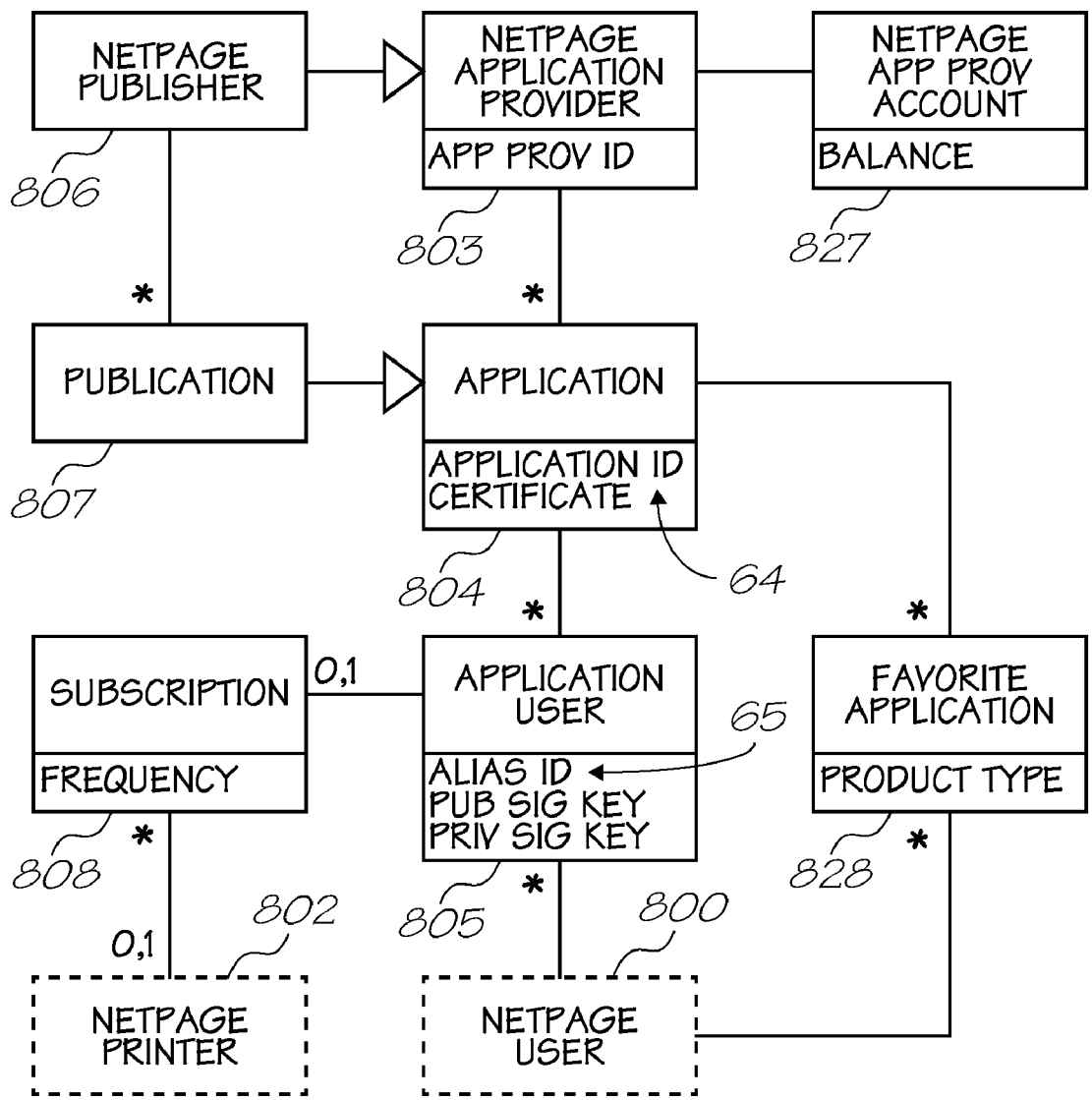
FIG. 24 is a schematic view of an application class diagram.

The netpage registration server instead maintains an anonymous relationship between a user and an application via a unique alias ID 65, as shown in FIG. 24. Whenever the user activates a hyperlink tagged with the "registered" attribute, the netpage page server asks the netpage registration server to translate the associated application ID 64, together with the pen ID 61, into an alias ID 65. The alias ID is then submitted to the hyperlink's application.

The application maintains state information indexed by alias ID, and is able to retrieve user-specific state information without knowledge of the global identity of the user.

The system also maintains an independent certificate and private signature key for each of a user's applications, to allow it to sign application transactions on behalf of the user using only application-specific information.

To assist the system in routing product bar code (UPC) "hyperlink" activations, the system records a favorite application on behalf of the user for any number of product types.

Each application is associated with an application provider, and the system maintains an account on behalf of each application provider, to allow it to credit and debit the provider for click-through fees etc.

An application provider can be a publisher of periodical subscribed content. The system records the user's willingness to receive the subscribed publication, as well as the expected frequency of publication.

4.5 Resource Descriptions and Copyright

Figure 40:
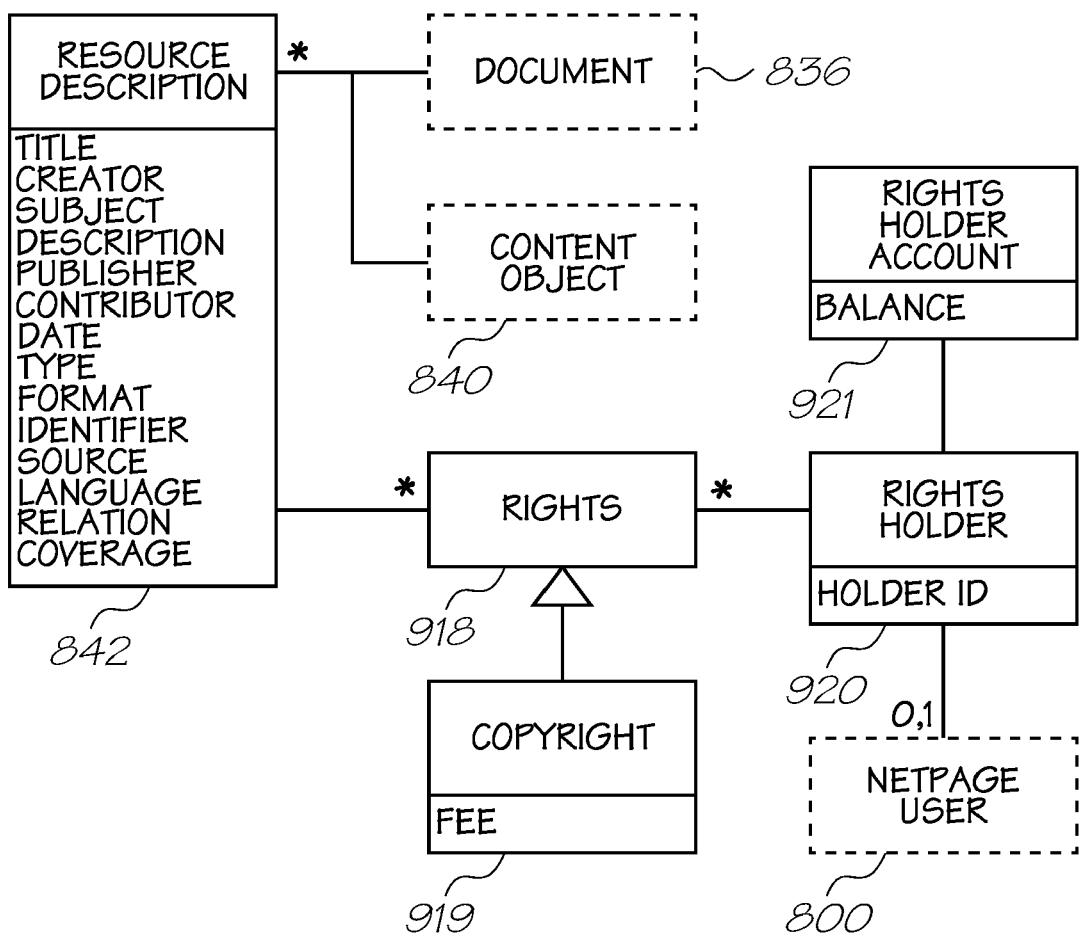
FIG. 40 is a schematic view of a resource description class diagram.

A preferred embodiment of a resource description class diagram is shown in FIG. 40. Each document and content object may be described by one or more resource descriptions 842. Resource descriptions use the Dublin Core metadata element set, which is designed to facilitate discovery of electronic resources. Dublin Core metadata conforms to the World Wide Web Consortium (W3C) Resource Description Framework (RDF).

A resource description may identify rights holders 920. The netpage system automatically transfers copyright fees from users to rights holders when users print copyright content.

Communications Protocols

A communications protocol defines an ordered exchange of messages between entities. In the netpage system, entities such as pens, printers and servers utilise a set of defined protocols to cooperatively handle user interaction with the netpage system.

Each protocol is illustrated by way of a sequence diagram in which the horizontal dimension is used to represent message flow and the vertical dimension is used to represent time. Each entity is represented by a rectangle containing the name of the entity and a vertical column representing the lifeline of the entity. During the time an entity exists, the lifeline is shown as a dashed line. During the time an entity is active, the lifeline is shown as a double line. Because the protocols considered here do not create or destroy entities, lifelines are generally cut short as soon as an entity ceases to participate in a protocol.

5.1 Subscription Delivery Protocol

Figure 43:
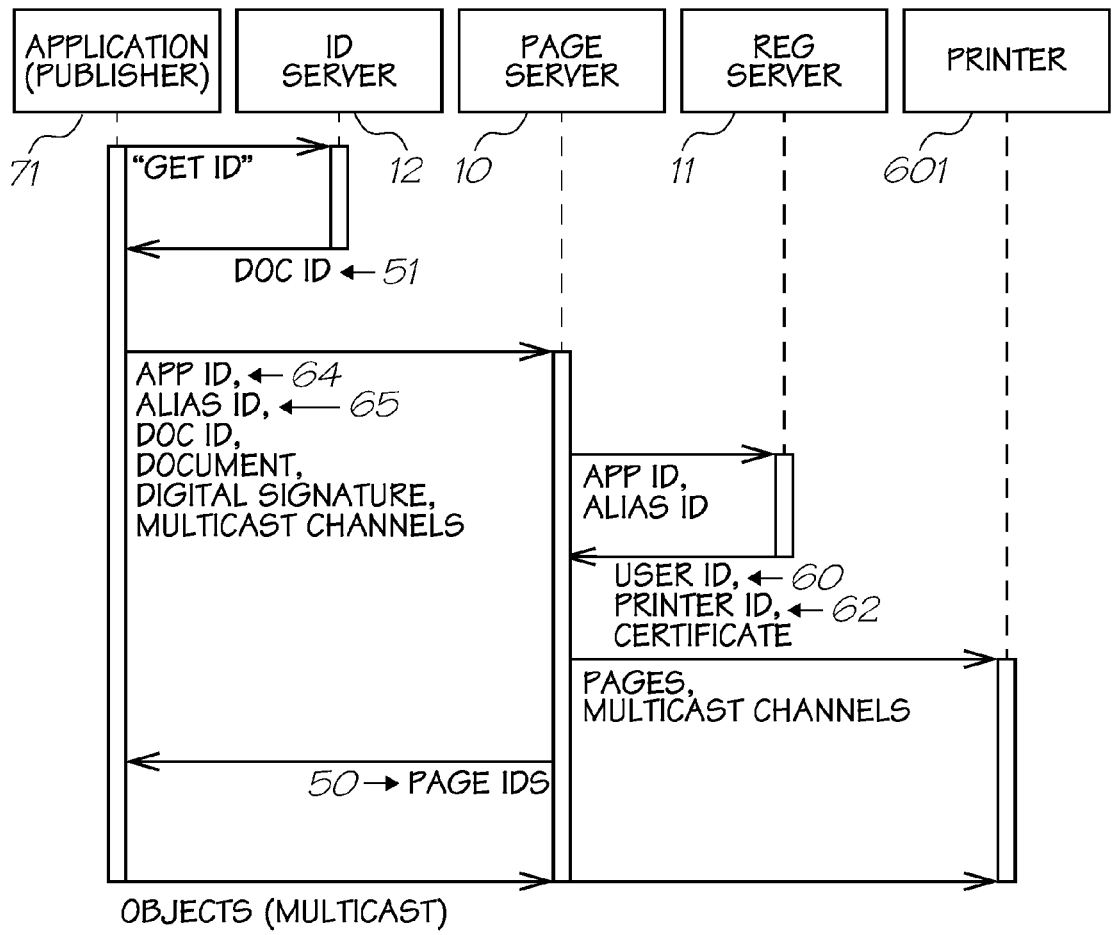
FIG. 43 is a schematic view of a subscription delivery protocol.

A preferred embodiment of a subscription delivery protocol is shown in FIG. 43.

A large number of users may subscribe to a periodical publication. Each user's edition may be laid out differently, but many users' editions will share common content such as text objects and image objects. The subscription delivery protocol therefore delivers document structures to individual printers via pointcast, but delivers shared content objects via multicast.

The application (i.e. publisher) first obtains a document ID 51 for each document from an ID server 12. It then sends each document structure, including its document ID and page descriptions, to the page server 10 responsible for the document's newly allocated ID. It includes its own application ID 64, the subscriber's alias ID 65, and the relevant set of multicast channel names. It signs the message using its private signature key.

The page server uses the application ID and alias ID to obtain from the registration server the corresponding user ID 60, the user's selected printer ID 62 (which may be explicitly selected for the application, or may be the user's default printer), and the application's certificate.

The application's certificate allows the page server to verify the message signature. The page server's request to the registration server fails if the application ID and alias ID don't together identify a subscription 808.

The page server then allocates document and page instance IDs and forwards the page descriptions, including page IDs 50, to the printer. It includes the relevant set of multicast channel names for the printer to listen to.

It then returns the newly allocated page IDs to the application for future reference.

Once the application has distributed all of the document structures to the subscribers' selected printers via the relevant page servers, it multicasts the various subsets of the shared objects on the previously selected multicast channels. Both page servers and printers monitor the appropriate multicast channels and receive their required content objects. They are then able to populate the previously pointcast document structures. This allows the page servers to add complete documents to their databases, and it allows the printers to print the documents.

5.2 Hyperlink Activation Protocol

Figure 45:
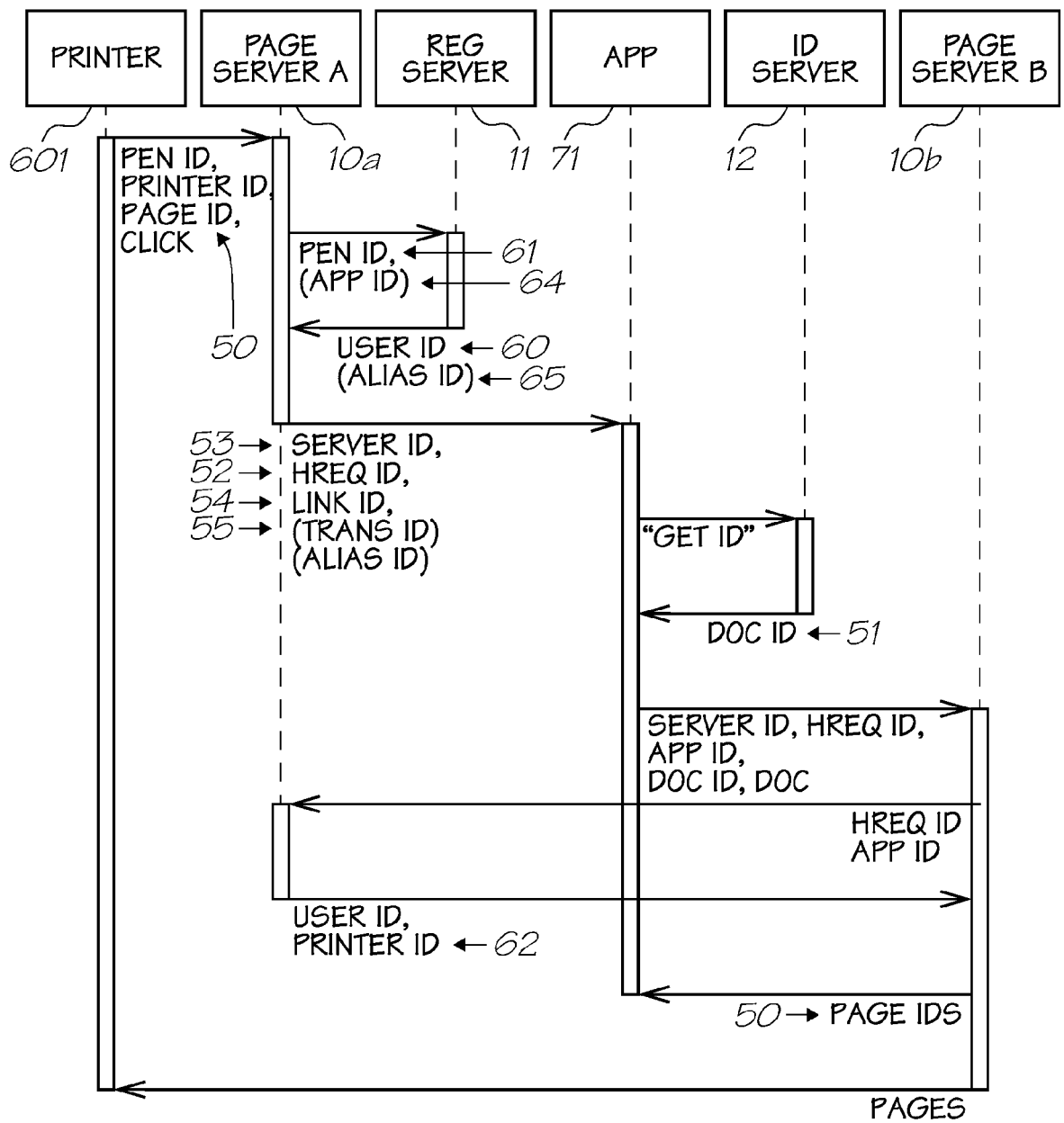
FIG. 45 is a schematic view of a hyperlink activation protocol.

A preferred embodiment of a hyperlink activation protocol is shown in FIG. 45.

When a user clicks on a netpage with a netpage pen, the pen communicates the click to the nearest netpage printer 601. The click identifies the page and a location on the page. The printer already knows the ID 61 of the pen from the pen connection protocol.

The printer determines, via the DNS, the network address of the page server 10a handling the particular page ID 50. The address may already be in its cache if the user has recently interacted with the same page. The printer then forwards the pen ID, its own printer ID 62, the page ID and click location to the page server.

The page server loads the page description 5 identified by the page ID and determines which input element's zone 58, if any, the click lies in. Assuming the relevant input element is a hyperlink element 844, the page server then obtains the associated application ID 64 and link ID 54, and determines, via the DNS, the network address of the application server hosting the application 71.

Figure 44:
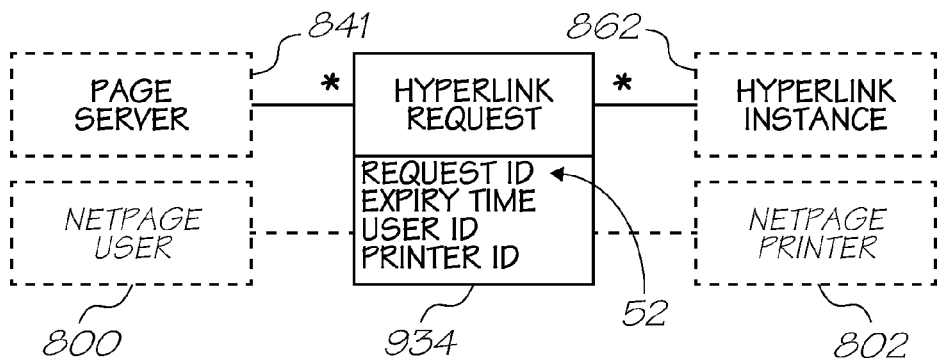
FIG. 44 is a schematic view of a hyperlink request class diagram.

The page server uses the pen ID 61 to obtain the corresponding user ID 60 from the registration server 11, and then allocates a globally unique hyperlink request ID 52 and builds a hyperlink request 934. The hyperlink request class diagram is shown in FIG. 44. The hyperlink request records the IDs of the requesting user and printer, and identifies the clicked hyperlink instance 862. The page server then sends its own server ID 53, the hyperlink request ID, and the link ID to the application.

The application produces a response document according to application-specific logic, and obtains a document ID 51 from an ID server 12. It then sends the document to the page server 10b responsible for the document's newly allocated ID, together with the requesting page server's ID and the hyperlink request ID.

The second page server sends the hyperlink request ID and application ID to the first page server to obtain the corresponding user ID and printer ID 62. The first page server rejects the request if the hyperlink request has expired or is for a different application.

The second page server allocates document instance and page IDs 50, returns the newly allocated page IDs to the application, adds the complete document to its own database, and finally sends the page descriptions to the requesting printer.

The hyperlink instance may include a meaningful transaction ID 55, in which case the first page server includes the transaction ID in the message sent to the application. This allows the application to establish a transaction-specific context for the hyperlink activation.

If the hyperlink requires a user alias, i.e. its "alias required" attribute is set, then the first page server sends both the pen ID 61 and the hyperlink's application ID 64 to the registration server 11 to obtain not just the user ID corresponding to the pen ID but also the alias ID 65 corresponding to the application ID and the user ID. It includes the alias ID in the message sent to the application, allowing the application to establish a user-specific context for the hyperlink activation.

5.3 Handwriting Recognition Protocol

When a user draws a stroke on a netpage with a netpage pen, the pen communicates the stroke to the nearest netpage printer. The stroke identifies the page and a path on the page.

The printer forwards the pen ID 61, its own printer ID 62, the page ID 50 and stroke path to the page server 10 in the usual way.

The page server loads the page description 5 identified by the page ID and determines which input element's zone 58, if any, the stroke intersects. Assuming the relevant input element is a text field 878, the page server appends the stroke to the text field's digital ink.

After a period of inactivity in the zone of the text field, the page server sends the pen ID and the pending strokes to the registration server 11 for interpretation. The registration server identifies the user corresponding to the pen, and uses the user's accumulated handwriting model 822 to interpret the strokes as handwritten text. Once it has converted the strokes to text, the registration server returns the text to the requesting page server. The page server appends the text to the text value of the text field.

5.4 Signature Verification Protocol

Assuming the input element whose zone the stroke intersects is a signature field 880, the page server 10 appends the stroke to the signature field's digital ink.

After a period of inactivity in the zone of the signature field, the page server sends the pen ID 61 and the pending strokes to the registration server 11 for verification. It also sends the application ID 64 associated with the form of which the signature field is part, as well as the form ID 56 and the current data content of the form. The registration server identifies the user corresponding to the pen, and uses the user's dynamic signature biometric 818 to verify the strokes as the user's signature. Once it has verified the signature, the registration server uses the application ID 64 and user ID 60 to identify the user's application-specific private signature key. It then uses the key to generate a digital signature of the form data, and returns the digital signature to the requesting page server. The page server assigns the digital signature to the signature field and sets the associated form's status to frozen.

The digital signature includes the alias ID 65 of the corresponding user. This allows a single form to capture multiple users' signatures.

5.5 Form Submission Protocol

Figure 46:
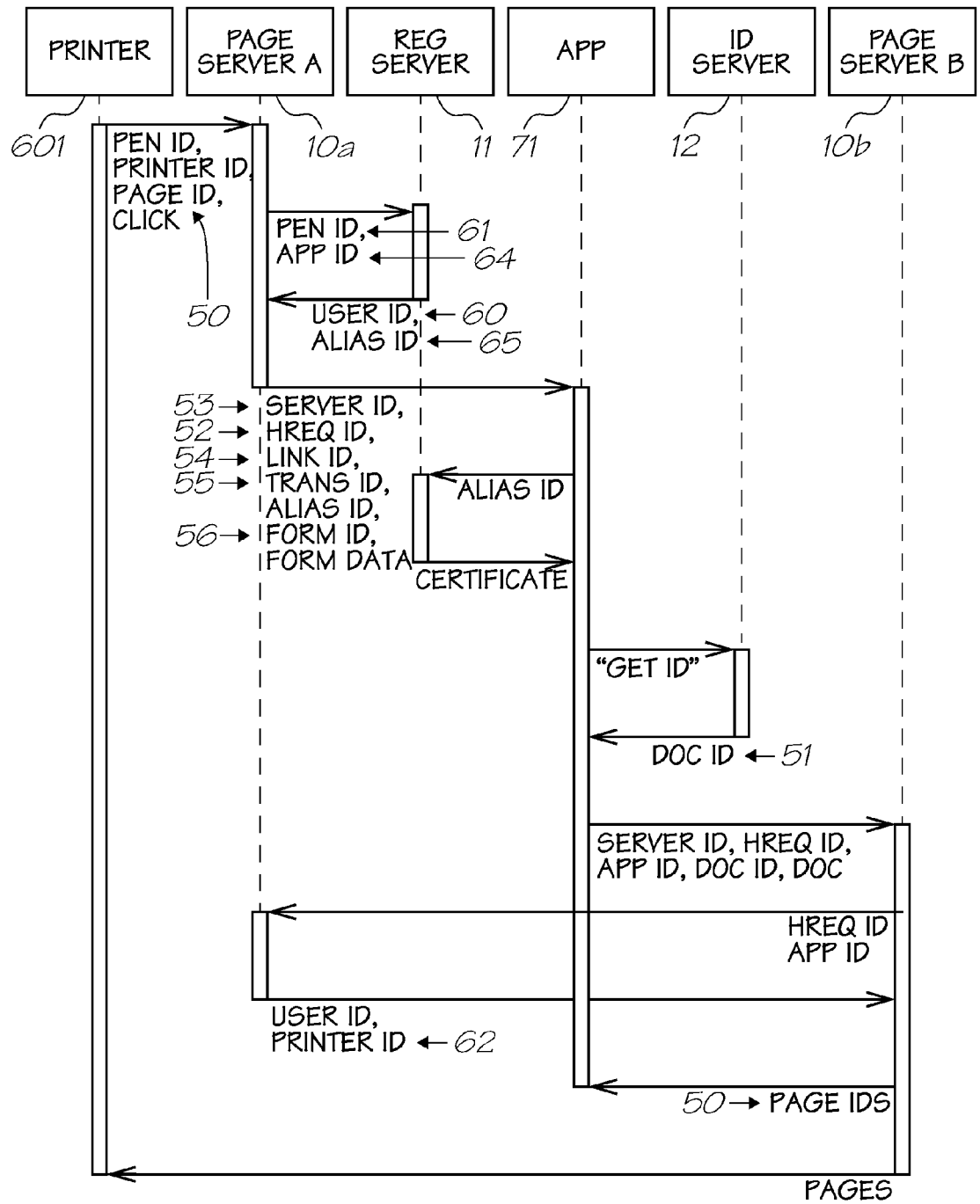
FIG. 46 is a schematic view of a form submission protocol.

A preferred embodiment of a form submission protocol is shown in FIG. 46.

Form submission occurs via a form hyperlink activation. It thus follows the protocol defined in Section 5.2, with some form-specific additions.

In the case of a form hyperlink, the hyperlink activation message sent by the page server 10 to the application 71 also contains the form ID 56 and the current data content of the form. If the form contains any signature fields, then the application verifies each one by extracting the alias ID 65 associated with the corresponding digital signature and obtaining the corresponding certificate from the registration server 11.

5.6 Commission Payment Protocol

Figure 47:
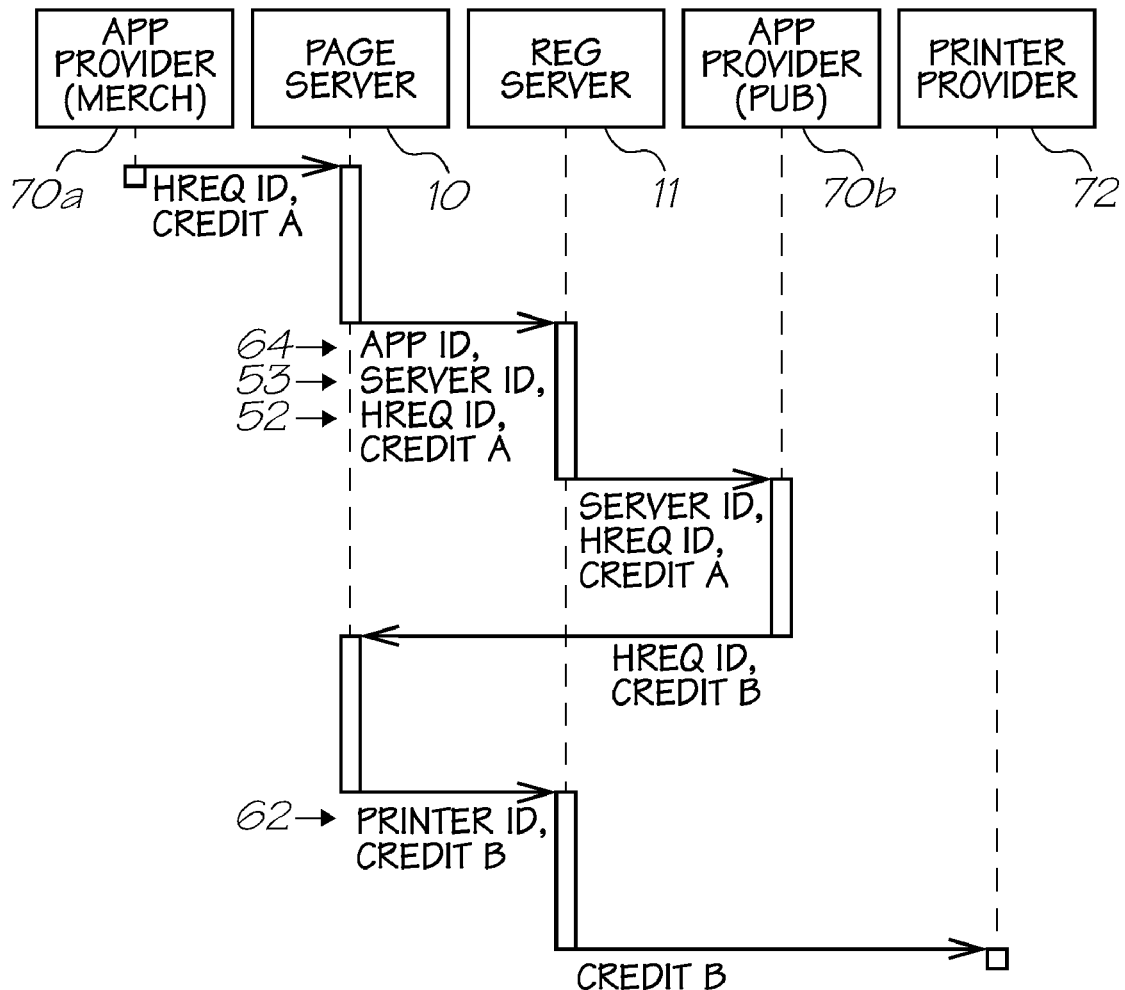
FIG. 47 is a schematic view of a commission payment protocol.

A preferred embodiment of a commission payment protocol is shown in FIG. 47.

In an e-commerce environment, fees and commissions may be payable from an application provider to a publisher on click-throughs, transactions and sales. Commissions on fees and commissions on commissions may also be payable from the publisher to the provider of the printer.

The hyperlink request ID 52 is used to route a fee or commission credit from the target application provider 70*a* (e.g. merchant) to the source application provider 70*b* (i.e. publisher), and from the source application provider 70*b* to the printer provider 72.

The target application receives the hyperlink request ID from the page server 10 when the hyperlink is first activated, as described in Section 5.2. When the target application needs to credit the source application provider, it sends the application provider credit to the original page server together with the hyperlink request ID. The page server uses the hyperlink request ID to identify the source application, and sends the credit on to the relevant registration server 11 together with the source application ID 64, its own server ID 53, and the hyperlink request ID. The registration server credits the corresponding application provider's account 827. It also notifies the application provider.

If the application provider needs to credit the printer provider, it sends the printer provider credit to the original page server together with the hyperlink request ID. The page server uses the hyperlink request ID to identify the printer, and sends the credit on to the relevant registration server together with the printer ID. The registration server credits the corresponding printer provider account 814.

The source application provider is optionally notified of the identity of the target application provider, and the printer provider of the identity of the source application provider.

6. Netpage Pen Description

6.1 Pen Mechanics

Referring to FIGS. 8 and 9, the pen, generally designated by reference numeral 101, includes a housing 102 in the form of a plastics moulding having walls 103 defining an interior space 104 for mounting the pen components. The pen top 105 is in operation rotatably mounted at one end 106 of the housing 102. A semi-transparent cover 107 is secured to the opposite end 108 of the housing 102. The cover 107 is also of moulded plastics, and is formed from semi-transparent material in order to enable the user to view the status of the LED mounted within the housing 102. The cover 107 includes a main part 109 which substantially surrounds the end 108 of the housing 102 and a projecting portion 110 which projects back from the main part 109 and fits within a corresponding slot 111 formed in the walls 103 of the housing 102. A radio antenna 112 is mounted behind the projecting portion 110, within the housing 102. Screw threads 113 surrounding an aperture 113A on the cover 107 are arranged to receive a metal end piece 114, including corresponding screw threads 115. The metal end piece 114 is removable to enable ink cartridge replacement.

Also mounted within the cover 107 is a tri-color status LED 116 on a flex PCB 117. The antenna 112 is also mounted on the flex PCB 117. The status LED 116 is mounted at the top of the pen 101 for good all-around visibility.

The pen can operate both as a normal marking ink pen and as a non-marking stylus. An ink pen cartridge 118 with nib 119 and a stylus 120 with stylus nib 121 are mounted side by side within the housing 102. Either the ink cartridge nib 119 or the stylus nib 121 can be brought forward through open end 122 of the metal end piece 114, by rotation of the pen top 105. Respective slider blocks 123 and 124 are mounted to the ink cartridge 118 and stylus 120, respectively. A rotatable cam barrel 125 is secured to the pen top 105 in operation and arranged to rotate therewith. The cam barrel 125 includes a cam 126 in the form of a slot within the walls 181 of the cam barrel. Cam followers 127 and 128 projecting from slider blocks 123 and 124 fit within the cam slot 126. On rotation of the cam barrel 125, the slider blocks 123 or 124 move relative to each other to project either the pen nib 119 or stylus nib 121 out through the hole 122 in the metal end piece 114. The pen 101 has three states of operation. By turning the top 105 through 90° steps, the three states are:

Stylus 120 nib 121 out;

Ink cartridge 118 nib 119 out; and

Neither ink cartridge 118 nib 119 out nor stylus 120 nib 121 out.

A second flex PCB 129, is mounted on an electronics chassis 130 which sits within the housing 102. The second flex PCB 129 mounts an infrared LED 131 for providing infrared radiation for projection onto the surface. An image sensor 132 is provided mounted on the second flex PCB 129 for receiving reflected radiation from the surface. The second flex PCB 129 also mounts a radio frequency chip 133, which includes an RF transmitter and RF receiver, and a controller chip 134 for controlling operation of the pen 101. An optics block 135 (formed from moulded clear plastics) sits within the cover 107 and projects an infrared beam onto the surface and receives images onto the image sensor 132. Power supply wires 136 connect the components on the second flex PCB 129 to battery contacts 137 which are mounted within the cam barrel 125. A terminal 138 connects to the battery contacts 137 and the cam barrel 125. A three volt rechargeable battery 139 sits within the cam barrel 125 in contact with the battery contacts. An induction charging coil 140 is mounted about the second flex PCB 129 to enable recharging of the battery 139 via induction. The second flex PCB 129 also mounts an infrared LED 143 and infrared photodiode 144 for detecting displacement in the cam barrel 125 when either the stylus 120 or the ink cartridge 118 is used for writing, in order to enable a determination of the force being applied to the surface by the pen nib 119 or stylus nib 121. The IR photodiode 144 detects light from the IR LED 143 via reflectors (not shown) mounted on the slider blocks 123 and 124.

Rubber grip pads 141 and 142 are provided towards the end 108 of the housing 102 to assist gripping the pen 101, and top 105 also includes a clip 142 for clipping the pen 101 to a pocket.

6.2 Pen Controller

The pen 101 is arranged to determine the position of its nib (stylus nib 121 or ink cartridge nib 119) by imaging, in the infrared spectrum, an area of the surface in the vicinity of the nib. It records the location data from the nearest location tag, and is arranged to calculate the distance of the nib 121 or 119 from the location tab utilising optics 135 and controller chip 134. The controller chip 134 calculates the orientation of the pen and the nib-to-tag distance from the perspective distortion observed on the imaged tag.

Utilising the RF chip 133 and antenna 112 the pen 101 can transmit the digital ink data (which is encrypted for security and packaged for efficient transmission) to the computing system.

When the pen is in range of a receiver, the digital ink data is transmitted as it is formed. When the pen 101 moves out of range, digital ink data is buffered within the pen 101 (the pen 101 circuitry includes a buffer arranged to store digital ink data for approximately 12 minutes of the pen motion on the surface) and can be transmitted later.

The controller chip 134 is mounted on the second flex PCB 129 in the pen 101. FIG. 10 is a block diagram illustrating in more detail the architecture of the controller chip 134. FIG. 10 also shows representations of the RF chip 133, the image sensor 132, the tri-color status LED 116, the IR illumination LED 131, the IR force sensor LED 143, and the force sensor photodiode 144.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor photodiode 144 to a digital signal.

An image sensor interface 152 interfaces with the image sensor 132. A transceiver controller 153 and base band circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor photodiode 144, controls the LEDs 116, 131 and 143, and handles short-range radio communication via the radio transceiver 153. It is a medium-performance (~40 MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC. Analog RF components (RF circuit 155 and RF resonators and inductors 156) are provided in the separate RF chip.

The image sensor is a 215×215 pixel CCD (such a sensor is produced by Matsushita Electronic Corporation, and is described in a paper by Itakura, K T Nobusada, N Okusenya, R Nagayoshi, and M Ozaki, "A 1 mm 50 k-Pixel IT CCD Image Sensor for Miniature Camera System", IEEE Transactions on Electronic Devices, Volt 47, number 1, January 2000, which is incorporated herein by reference) with an IR filter.

The controller ASIC 134 enters a quiescent state after a period of inactivity when the pen 101 is not in contact with a surface. It incorporates a dedicated circuit 150 which monitors the force sensor photodiode 144 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

In an alternative embodiment, the pen incorporates an Infrared Data Association (IrDA) interface for short-range communication with a base station or netpage printer.

In a further embodiment, the pen 101 includes a pair of orthogonal accelerometers mounted in the normal plane of the pen 101 axis. The accelerometers 190 are shown in FIGS. 9 and 10 in ghost outline.

The provision of the accelerometers enables this embodiment of the pen 101 to sense motion without reference to surface location tags, allowing the location tags to be sampled at a lower rate. Each location tag ID can then identify an object of interest rather than a position on the surface. For example, if the object is a user interface input element (e.g. a command button), then the tag ID of each location tag within the area of the input element can directly identify the input element.

The acceleration measured by the accelerometers in each of the x and y directions is integrated with respect to time to produce an instantaneous velocity and position.

Since the starting position of the stroke is not known, only relative positions within a stroke are calculated. Although position integration accumulates errors in the sensed acceleration, accelerometers typically have high resolution, and the time duration of a stroke, over which errors accumulate, is short.

7. Netpage Printer Description

7.1 Printer Mechanics

Figure 12A:
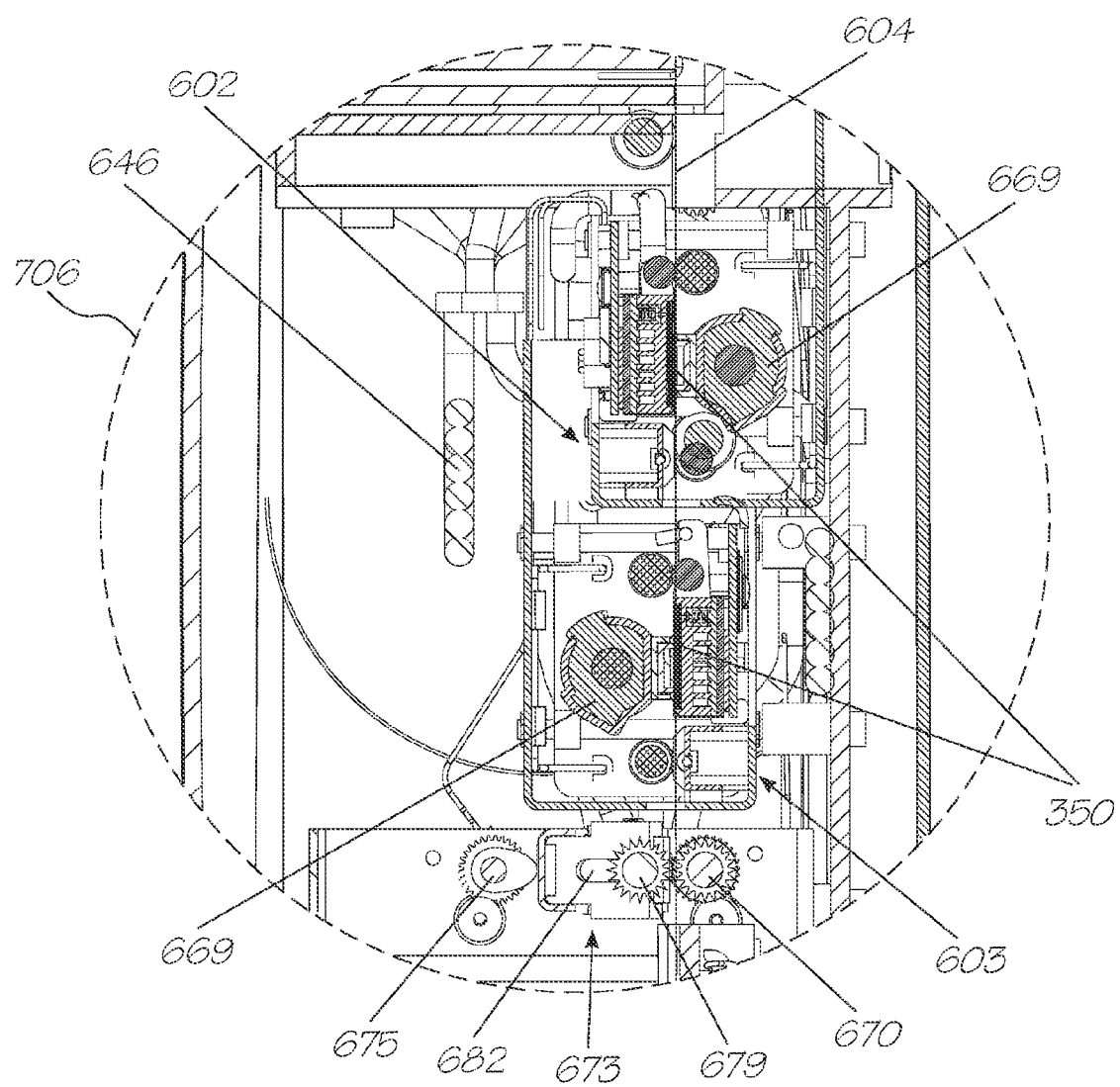
FIG. 12a is an enlarged portion of FIG. 12 showing a section of the duplexed print engines and glue wheel assembly.

The vertically-mounted netpage wallprinter 601 is shown fully assembled in FIG. 11. It prints netpages on Letter/A4 sized media using duplexed 8½" Memjet™ print engines 602 and 603, as shown in FIGS. 12 and 12a. It uses a straight paper path with the paper 604 passing through the duplexed print engines 602 and 603 which print both sides of a sheet simultaneously, in full color and with full bleed.

An integral binding assembly 605 applies a strip of glue along one edge of each printed sheet, allowing it to adhere to the previous sheet when pressed against it. This creates a final bound document 618 which can range in thickness from one sheet to several hundred sheets.

The replaceable ink cartridge 627, shown in FIG. 13 coupled with the duplexed print engines, has bladders or chambers for storing fixative, adhesive, and cyan, magenta, yellow, black and infrared inks. The cartridge also contains a micro air filter in a base molding. The micro air filter interfaces with an air pump 638 inside the printer via a hose 639. This provides filtered air to the printheads to prevent ingress of micro particles into the Memjet™ printheads 350 which might otherwise clog the printhead nozzles. By incorporating the air filter within the cartridge, the operational life of the filter is effectively linked to the life of the cartridge. The ink cartridge is a fully recyclable product with a capacity for printing and gluing 3000 pages (1500 sheets).

Referring to FIG. 12, the motorized media pick-up roller assembly 626 pushes the top sheet directly from the media tray past a paper sensor on the first print engine 602 into the duplexed Memjet™ printhead assembly. The two Memjet™ print engines 602 and 603 are mounted in an opposing in-line sequential configuration along the straight paper path. The paper 604 is drawn into the first print engine 602 by integral, powered pick-up rollers 626. The position and size of the paper 604 is sensed and full bleed printing commences. Fixative is printed simultaneously to aid drying in the shortest possible time.

The paper exits the first Memjet™ print engine 602 through a set of powered exit spike wheels (aligned along the straight paper path), which act against a rubberized roller. These spike wheels contact the 'wet' printed surface and continue to feed the sheet 604 into the second Memjet™ print engine 603.

Referring to FIGS. 12 and 12a, the paper 604 passes from the duplexed print engines 602 and 603 into the binder assembly 605. The printed page passes between a powered spike wheel axle 670 with a fibrous support roller and another movable axle with spike wheels and a momentary action glue wheel. The movable axle/glue assembly 673 is mounted to a metal support bracket and it is transported forward to interface with the powered axle 670 via gears by action of a camshaft. A separate motor powers this camshaft.

The glue wheel assembly 673 consists of a partially hollow axle 679 with a rotating coupling for the glue supply hose 641 from the ink cartridge 627. This axle 679 connects to a glue wheel, which absorbs adhesive by capillary action through radial holes. A molded housing 682 surrounds the glue wheel, with an opening at the front. Pivoting side moldings and sprung outer doors are attached to the metal bracket and hinge out sideways when the rest of the assembly 673 is thrust forward. This action exposes the glue wheel through the front of the molded housing 682. Tension springs close the assembly and effectively cap the glue wheel during periods of inactivity.

As the sheet 604 passes into the glue wheel assembly 673, adhesive is applied to one vertical edge on the front side (apart from the first sheet of a document) as it is transported down into the binding assembly 605.

7.2 Printer Controller Architecture

Figure 14:
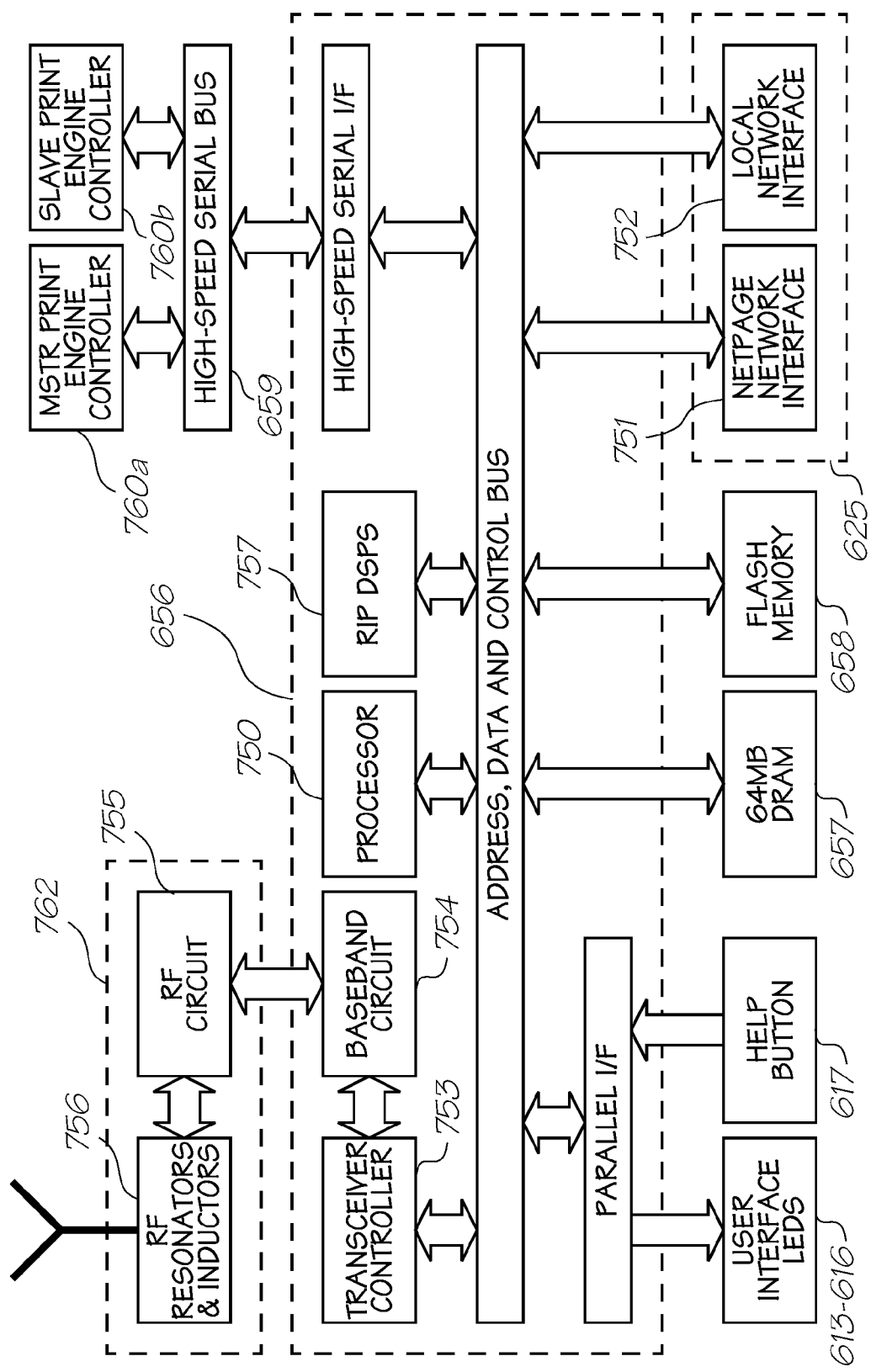
FIG. 14 is a schematic block diagram of a printer controller for the netpage printer shown in FIGS. 11 and 12.
Figure 15:
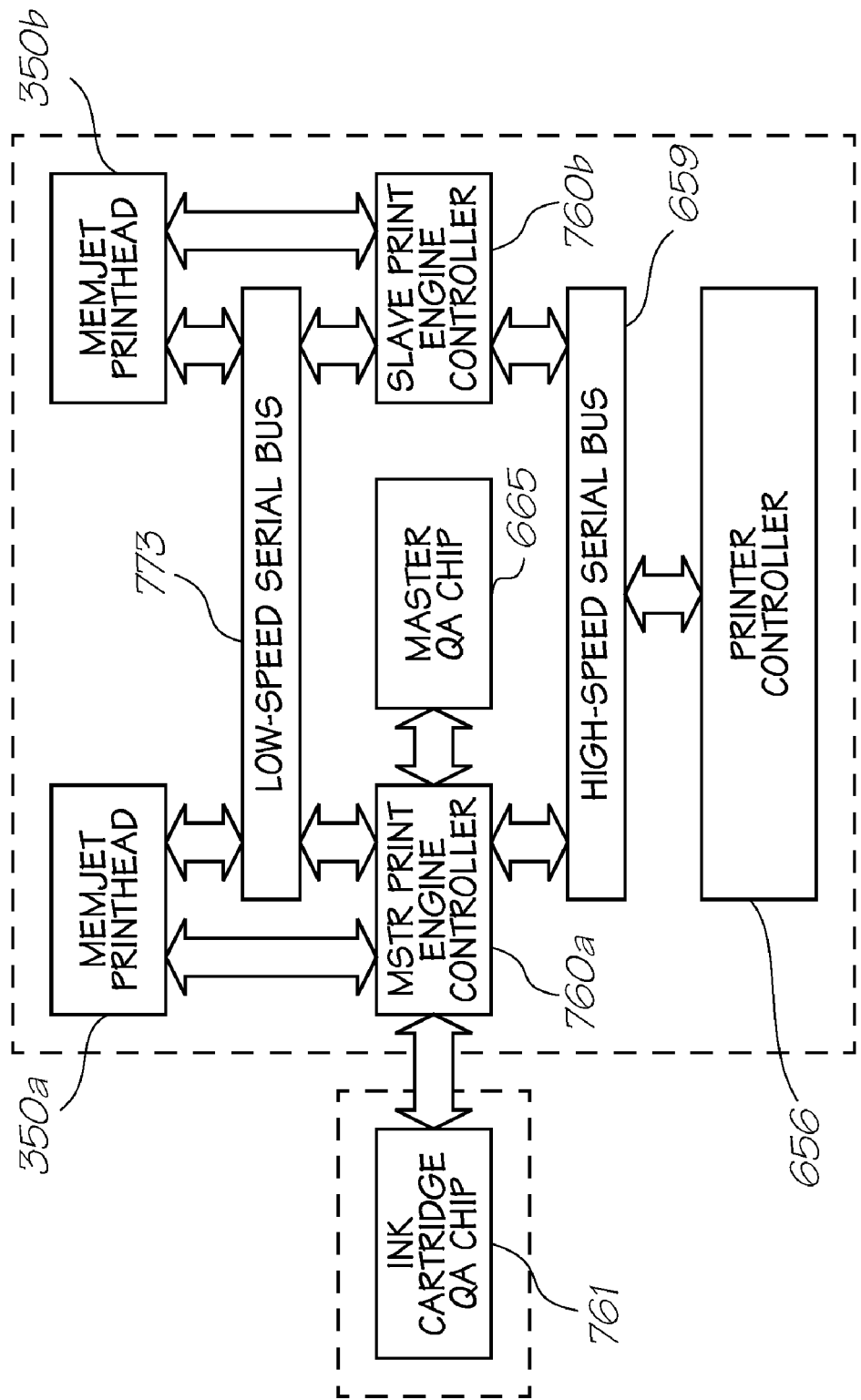
FIG. 15 is a schematic block diagram of duplexed print engine controllers and Memjet printheads associated with the printer controller shown in FIG. 14.
Figure 16:
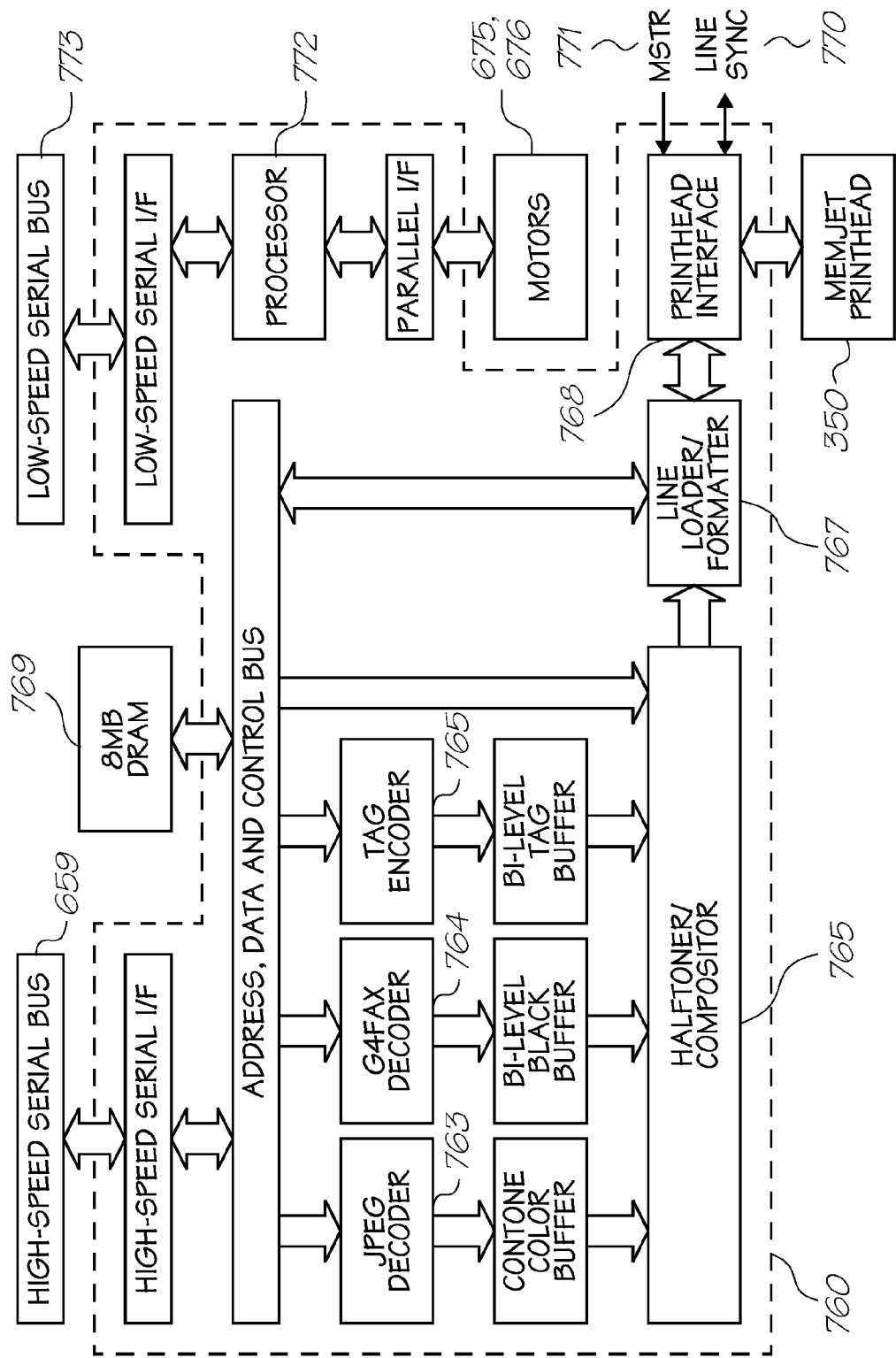
FIG. 16 is a schematic block diagram of the print engine controller shown in FIGS. 14 and 15.

The netpage printer controller consists of a controlling processor 750, a factory-installed or field-installed network interface module 625, a radio transceiver (transceiver controller 753, baseband circuit 754, RF circuit 755, and RF resonators and inductors 756), dual raster image processor (RIP) DSPs 757, duplexed print engine controllers 760*a* and 760*b*, flash memory 658, and 64 MB of DRAM 657, as illustrated in FIG. 14.

The controlling processor handles communication with the network 19 and with local wireless netpage pens 101, senses the help button 617, controls the user interface LEDs 613-616, and feeds and synchronizes the RIP DSPs 757 and print engine controllers 760. It consists of a medium-performance general-purpose microprocessor. The controlling processor 750 communicates with the print engine controllers 760 via a high-speed serial bus 659.

The RIP DSPs rasterize and compress page descriptions to the netpage printer's compressed page format. Each print engine controller expands, dithers and prints page images to its associated Memjet™ printhead 350 in real time (i.e. at over 30 pages per minute). The duplexed print engine controllers print both sides of a sheet simultaneously.

The master print engine controller 760*a* controls the paper transport and monitors ink usage in conjunction with the master QA chip 665 and the ink cartridge QA chip 761.

The printer controller's flash memory 658 holds the software for both the processor 750 and the DSPs 757, as well as configuration data. This is copied to main memory 657 at boot time.

The processor 750, DSPs 757, and digital transceiver components (transceiver controller 753 and baseband circuit 754) are integrated in a single controller ASIC 656. Analog RF components (RF circuit 755 and RF resonators and inductors 756) are provided in a separate RF chip 762. The network interface module 625 is separate, since netpage printers allow the network connection to be factory-selected or field-selected. Flash memory 658 and the 2×256 Mbit (64 MB) DRAM 657 is also off-chip. The print engine controllers 760 are provided in separate ASICs.

A variety of network interface modules 625 are provided, each providing a netpage network interface 751 and optionally a local computer or network interface 752. Netpage network Internet interfaces include POTS modems, Hybrid Fiber-Coax (HFC) cable modems, ISDN modems, DSL modems, satellite transceivers, current and next-generation cellular telephone transceivers, and wireless local loop (WLL) transceivers. Local interfaces include IEEE 1284 (parallel port), 10Base-T and 100Base-T Ethernet, USB and USB 2.0, IEEE 1394 (Firewire), and various emerging home networking interfaces. If an Internet connection is available on the local network, then the local network interface can be used as the netpage network interface.

The radio transceiver 753 communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

The printer controller optionally incorporates an Infrared Data Association (IrDA) interface for receiving data "squirted" from devices such as netpage cameras. In an alternative embodiment, the printer uses the IrDA interface for short-range communication with suitably configured netpage pens.

7.2.1 Rasterization and Printing

Once the main processor 750 has received and verified the document's page layouts and page objects, it runs the appropriate RIP software on the DSPs 757.

The DSPs 757 rasterize each page description and compress the rasterized page image. The main processor stores each compressed page image in memory. The simplest way to load-balance multiple DSPs is to let each DSP rasterize a separate page. The DSPs can always be kept busy since an arbitrary number of rasterized pages can, in general, be stored in memory. This strategy only leads to potentially poor DSP utilization when rasterizing short documents.

Watermark regions in the page description are rasterized to a contone-resolution bi-level bitmap which is losslessly compressed to negligible size and which forms part of the compressed page image.

The infrared (IR) layer of the printed page contains coded netpage tags at a density of about six per inch. Each tag encodes the page ID, tag ID, and control bits, and the data content of each tag is generated during rasterization and stored in the compressed page image.

The main processor 750 passes back-to-back page images to the duplexed print engine controllers 760. Each print engine controller 760 stores the compressed page image in its local memory, and starts the page expansion and printing pipeline. Page expansion and printing is pipelined because it is impractical to store an entire 114 MB bi-level CMYK+IR page image in memory.

7.2.2 Print Engine Controller

The page expansion and printing pipeline of the print engine controller 760 consists of a high speed IEEE 1394 serial interface 659, a standard JPEG decoder 763, a standard Group 4 Fax decoder 764, a custom halftoner/compositor unit 765, a custom tag encoder 766, a line loader/formatter unit 767, and a custom interface 768 to the Memjet™ printhead 350.

The print engine controller 360 operates in a double buffered manner. While one page is loaded into DRAM 769 via the high speed serial interface 659, the previously loaded page is read from DRAM 769 and passed through the print engine controller pipeline. Once the page has finished printing, the page just loaded is printed while another page is loaded.

The first stage of the pipeline expands (at 763) the JPEG-compressed contone CMYK layer, expands (at 764) the Group 4 Fax-compressed bi-level black layer, and renders (at 766) the bi-level netpage tag layer according to the tag format defined in section 1.2, all in parallel. The second stage dithers (at 765) the contone CMYK layer and composites (at 765) the bi-level black layer over the resulting bi-level CMYK layer. The resultant bi-level CMYK+IR dot data is buffered and formatted (at 767) for printing on the Memjet™ printhead 350 via a set of line buffers. Most of these line buffers are stored in the off-chip DRAM. The final stage prints the six channels of bi-level dot data (including fixative) to the Memjet™ printhead 350 via the printhead interface 768.

When several print engine controllers 760 are used in unison, such as in a duplexed configuration, they are synchronized via a shared line sync signal 770. Only one print engine 760, selected via the external master/slave pin 771, generates the line sync signal 770 onto the shared line.

The print engine controller 760 contains a low-speed processor 772 for synchronizing the page expansion and rendering pipeline, configuring the printhead 350 via a low-speed serial bus 773, and controlling the stepper motors 675, 676.

In the 8½" versions of the netpage printer, the two print engines each prints 30 Letter pages per minute along the long dimension of the page (11"), giving a line rate of 8.8 kHz at 1600 dpi. In the 12" versions of the netpage printer, the two print engines each prints 45 Letter pages per minute along the short dimension of the page (8½"), giving a line rate of 10.2 kHz. These line rates are well within the operating frequency of the Memjet™ printhead, which in the current design exceeds 30 kHz.

8. Print Engine Controller and Tag Encoder

A typically 12 inch printhead width is controlled by one or more PECs, as described below, to allow full-bleed printing of both A4 and Letter pages. Six channels of colored ink are the expected maximum in the present printing environment, these being:
  CMY, for regular color printing.
  K, for black text and other black printing.
  IR (infrared), for Netpage-enabled applications.
  F (fixative), to enable printing at high speed.

Because the printer is to be capable of fast printing, a fixative will be required to enable the ink to dry before the next page has completed printing at higher speeds. Otherwise the pages might bleed on each other. In lower speed printing environments the fixative will not be not required.

A PEC might be built in a single chip to interface with a printhead. It will contain four basic levels of functionality:
  receiving compressed pages via a serial interface such as IEEE 1394
  a print engine for producing a page from a compressed form. The print engine functionality includes expanding the page image, dithering the contone layer, compositing the black layer over the contone layer, and sending the resultant image to the printhead.
  a print controller for controlling the printhead and stepper motors.
  two standard low-speed serial ports for communication with the two QA chips. Note that there must be two ports and not a single port to ensure strong security during the authentication procedure.

Figure 48:
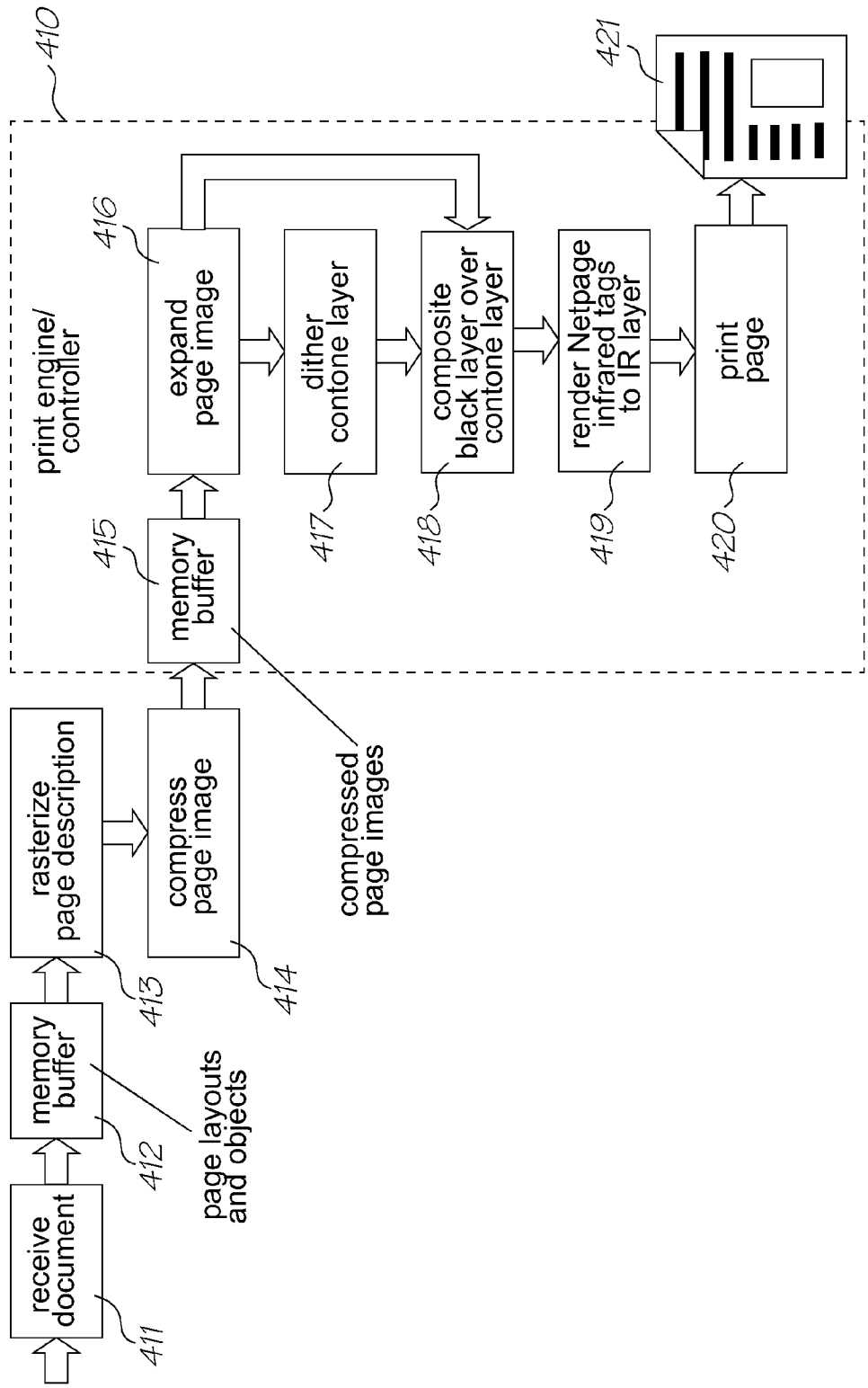
FIG. 48 is a diagram illustrating data flow and the functions performed by the print engine controller.

In FIG. 48 is seen the flow of data to send a document from computer system to printed page. A document is received at 411 and loaded to memory buffer 412 wherein page layouts may be effected and any required objects might be added. Pages from memory 412 are rasterized at 413 and compressed at 414 prior to transmission to the print engine controller 410. Pages are received as compressed two-layer page images within the print engine controller 410 into a memory buffer 415, from which they are fed to a page expander 416 wherein page images are retrieved. Any requisite dither might be applied to any contone layer at 417. Any black bi-level layer might be composited over the contone layer at 418 together with any infrared tags at 419. The composited page data is printed at 420 to produce page 421.

The print engine/controller takes the compressed page image and starts the page expansion and printing in pipeline fashion. Page expansion and printing is preferably pipelined because it is impractical to store a sizable bi-level CMYK+IR page image in memory.

The first stage of the pipeline expands a JPEG-compressed contone CMYK layer (see below), expands a Group 4 Fax-compressed bi-level dither matrix selection map (see below), and expands a Group 4 Fax-compressed bi-level black layer (see below), all in parallel. The second stage dithers the contone CMYK layer using a dither matrix selected by the dither matrix select map, and composites the bi-level black layer over the resulting bi-level K layer. In parallel with this, the tag encoder encodes bi-level IR tag data from the compressed page image. A fixative layer is also generated at each dot position wherever there is a need in any of C, M, Y, K, or IR channels. The last stage prints the bi-level CMYK+IR data through the printhead via a printhead interface (see below).

Figure 49:
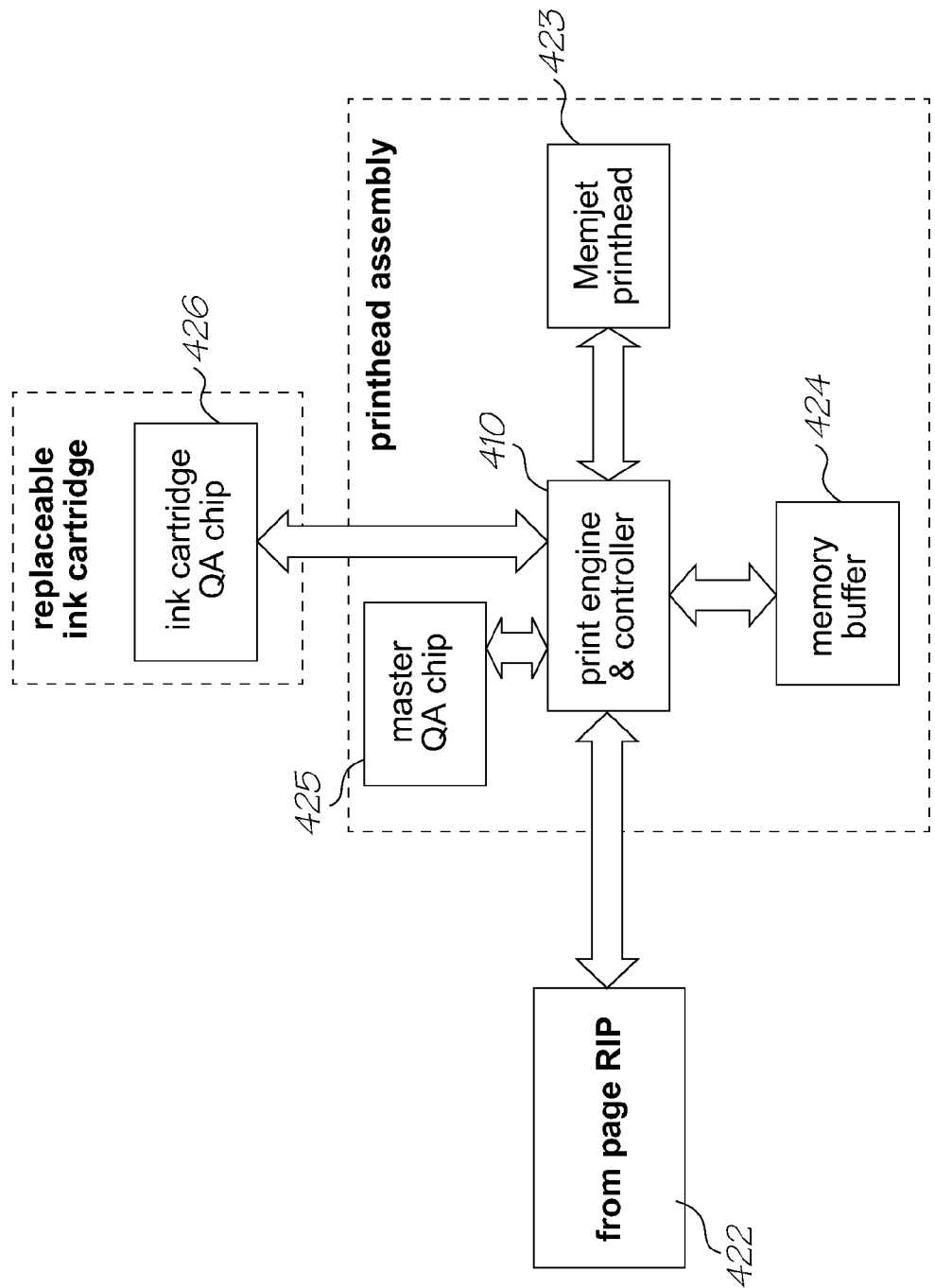
FIG. 49 shows the print engine controller in the context of the overall printer system architecture.

In FIG. 49 is seen how the print engine/controller 410 fits within the overall printer system architecture. The various components of the printer system might include
  a Print Engine/Controller (PEC). A PEC chip 410, or chips, is responsible for receiving the compressed page images for storage in a memory buffer 424, performing the page expansion, black layer compositing and sending the dot data to the printhead 423. It may also communicate with QA chips 425, 426 and provides a means of retrieving printhead characteristics to ensure optimum printing. The PEC is the subject of this specification.
  a memory buffer. The memory buffer 424 is for storing the compressed page image and for scratch use during the printing of a given page. The construction and working of memory buffers is known to those skilled in the art and a range of standard chips and techniques for their use might be utilised in use of the PEC of the invention.
  a master QA chip. The master chip 425 is matched to replaceable ink cartridge QA chips 426. The construction and working of QA units is known to those skilled in the art and a range of known QA processes might be utilised in use of the PEC of the invention. For example, a QA chip is described in co-pending United States patent applications:

| USSN | Our Docket Number | Our Title |
| --- | --- | --- |
| 7,249,108 | AUTH01US | Validation Protocol and System |
| 6,566,858 | AUTH02US | Circuit for Protecting Chips Against IDD Fluctuation Attacks |
| 6,331,946 | AUTH04US | Method for Protecting On-Chip Memory (Flash and RAM) |
| 6,246,970 | AUTH05US | Method for Making a Chip Tamper-Resistant |
| 6,442,525 | AUTH06US | A system for authenticating physical objects |
| 7,346,586 | AUTH07US | Validation Protocol and System |
| 09/505,951 | AUTH08US | Validation Protocol and System |
| 6,374,354 | AUTH09US | Consumable Authentication Protocol and System |
| 7,246,098 | AUTH10US | Consumable Authentication Protocol and System |
| 6,816,968 | AUTH11US | Consumable Authentication Protocol and System |
| 6,757,832 | AUTH12US | Unauthorized Modification of Values Stored in Flash Memory |

-continued

| USSN | Our Docket Number | Our Title |
|---|---|---|
| 6,334,190 | AUTH13US | A System for the Manipulation of Secure Data |
| 6,745,331 | AUTH14US | An Authentication Chip with Protection from Power Supply Attacks |
| 7,249,109 | AUTH15US | Shielding Manipulations of Secret Data |

QA chip communication may be best included within the overall functionality of the PEC chip since it has a role in the expansion of the image as well as running the physical printhead. By locating QA chip communication there it can be ensured that there is enough ink to print the page. Preferably the QA embedded in the printhead assembly is implemented using an authentication chip. Since it is a master QA chip, it only contains authentication keys, and does not contain user-data. However, it must match the ink cartridge's QA chip. The QA chip in the ink cartridge contains information required for maintaining the best possible print quality, and is implemented using an authentication chip.

Preferably a 64 MBit (8 MByte) memory buffer is used to store the compressed page image. While one page is being written to the buffer another is being read (double buffering). In addition, the PEC uses the memory to buffer the calculated dot information during the printing of a page. During the printing of page N, the buffer is used for:

Reading compressed page N

Reading and writing the bi-level dot information for page N

Writing compressed page N+1

Preferably a PEC chip will incorporate a simple microcontroller CPU core 435 to perform the following functions:

perform QA chip authentication protocols between print pages run the stepper motor at parallel interface 589 during a print (the stepper motor requires a 5 KHz process)

synchronize the various portions of the PEC chip during a print provide a means of interfacing with external data requests (programming registers etc.)

provide a means of interfacing with printhead segment low-speed data requests (such as reading the characterization vectors and writing pulse profiles)

provide a means of writing the portrait and landscape tag structures to external DRAM Since all of the image processing is performed by dedicated hardware, the CPU does not have to process pixels. As a result, the CPU can be extremely simple. A wide variety of CPU known cores are suitable: it can be any processor core with sufficient processing power to perform the required calculations and control functions fast enough. An example of a suitable core is a Philips 8051 micro-controller running at about 1 MHz. Associated with the CPU core 435 may be a program ROM and a small program scratch RAM. The CPU communicates with the other units within the PEC chip via memory-mapped I/O. Particular address ranges may map to particular units, and within each range, to particular registers within that particular unit. This includes the serial and parallel interfaces. A small program flash ROM may be incorporated into the PEC chip. Its size depends on the CPU chosen, but should not be more than 8 KB. Likewise, a small scratch RAM area can be incorporated into the PEC chip. Since the program code does not have to manipulate images, there is no need for a large scratch area. The RAM size depends on the CPU chosen (e.g. stack mechanisms, subroutine calling conventions, register sizes etc.), but should not be more than about 2 KB.

A PEC chip using the above referenced segment based page wide printhead can reproduce black at a full dot resolution (typically 1600 dpi), but reproduces contone color at a somewhat lower resolution using halftoning. The page description is therefore divided into a black bi-level layer and a contone layer. The black bi-level layer is defined to composite over the contone layer. The black bi-level layer consists of a bitmap containing a 1-bit opacity for each pixel. This black layer matte has a resolution which is an integer factor of the printer's dot resolution. The highest supported resolution is 1600 dpi, i.e. the printer's full dot resolution. The contone layer consists of a bitmap containing a 32-bit CMYK color for each pixel, where K is optional. This contone image has a resolution which is an integer factor of the printer's dot resolution. The highest supported resolution is 320 ppi over 12 inches for a single PEC, i.e. one-fifth the printer's dot resolution. For higher contone resolutions multiple PECs are required, with each PEC producing an strip of the output page. The contone resolution is also typically an integer factor of the black bi-level resolution, to simplify calculations in the RIPs. This is not a requirement, however. The black bi-level layer and the contone layer are both in compressed form for efficient storage in the printer's internal memory.

Figure 50:
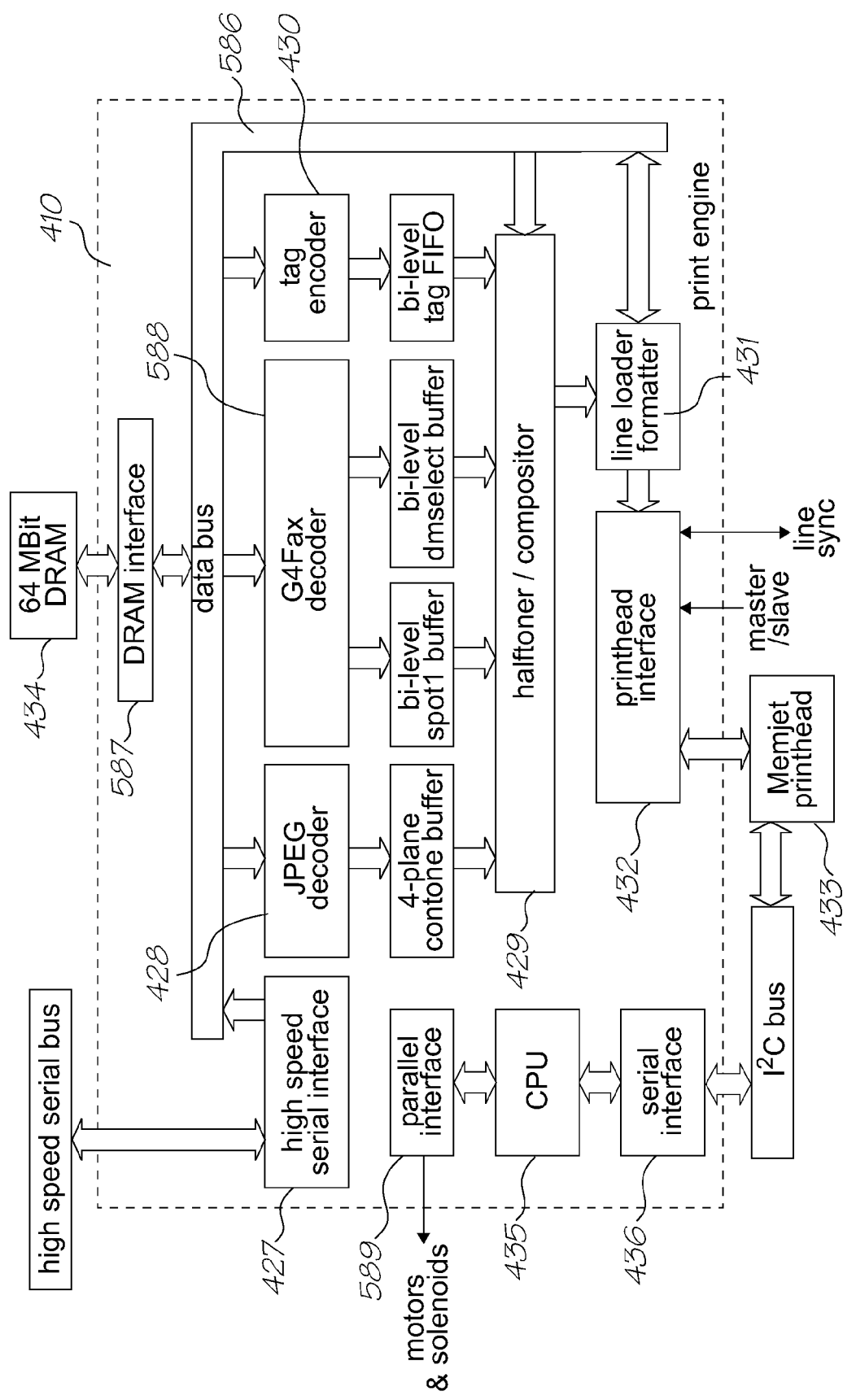
FIG. 50 illustrates the print engine controller architecture.

In FIG. 50 is seen the print engine architecture. The print engine's page expansion and printing pipeline consists of a high speed serial interface 427 (such as a standard IEEE 1394 interface), a standard JPEG decoder 428, a standard Group 4 Fax decoder, a custom halftoner/compositor unit 429, a custom tag encoder 430, a line loader/formatter unit 431, and a custom interface 432 to the printhead 433. The decoders 428, 588 and encoder 430 are buffered to the halftoner/compositor 429.

The tag encoder 430 establishes an infrared tag or tags to a page according to protocols dependent on what uses might be made of the page and the actual content of a tag is not the subject of the present invention.

The print engine works in a double buffered way. One page is loaded into DRAM 34 via a DRAM interface 587 on bus 586 and the high speed serial interface 27 while the previously loaded page is read from DRAM 434 and passed through the print engine pipeline. Once the page has finished printing, then the page just loaded becomes the page being printed, and a new page is loaded via the high speed serial interface 427. At the first stage the pipeline expands any JPEG-compressed contone (CMYK) layer, and expands any of two Group 4 Fax-compressed bi-level data streams. The two streams are the black layer (although the PEC is actually color agnostic and this bi-level layer can be directed to any of the output inks), and a matte for selecting between dither matrices for contone dithering (see below). At the second stage, in parallel with the first, is encoded any tags for later rendering in either IR or black ink. Finally the third stage dithers the contone layer, and composites position tags and the bi-level spot1 layer over the resulting bi-level dithered layer. The datastream is ideally adjusted to create smooth transitions across overlapping segments in the printhead and ideally it is adjusted to compensate for dead nozzles in the printhead. Up to 6 channels of bi-level data are produced from this stage. Note that not all 6 channels may be present on the printhead. For example, the printhead may be CMY only, with K pushed into the CMY channels and IR ignored. Alternatively, the position tags may be printed in K if IR ink is not available (or for testing purposes). The resultant bi-level CMYK-IR dot-data is buffered and formatted for printing on the printhead 33 via a set of line buffers (see below). The majority of these line buffers might be ideally stored on the off-chip DRAM 434. The final stage prints the 6 channels of bi-level dot data via the printhead interface 432.

Compression is used in a printing system that employs the PEC. This is to enable the data flow to keep ahead of the printhead that is run at a constant speed. At 267 ppi, a Letter page of contone CMYK data has a size of 25 MB. Using lossy contone compression algorithms such as JPEG (see below), contone images compress with a ratio up to 10:1 without noticeable loss of quality, giving a compressed page size of 2.5 MB. At 800 dpi, a Letter page of bi-level data has a size of 7 MB. Coherent data such as text compresses very well. Using lossless bi-level compression algorithms such as Group 4 Facsimile (see below), ten-point text compresses with a ratio of about 10:1, giving a compressed page size of 0.8 MB. Once dithered, a page of CMYK contone image data consists of 114 MB of bi-level data. The two-layer compressed page image format described below exploits the relative strengths of lossy JPEG contone image compression and lossless bi-level text compression. The format is compact enough to be storage-efficient, and simple enough to allow straightforward real-time expansion during printing. Since text and images normally don't overlap, the normal worst-case page image size is 2.5 MB (i.e. image only), while the normal best-case page image size is 0.8 MB (i.e. text only). The absolute worst-case page image size is 3.3 MB (i.e. text over image). Assuming a quarter of an average page contains images, the average page image size is 1.2 MB.

The Group 4 Fax (G4 Fax) decoder is responsible for decompressing bi-level data. Bi-level data is limited to a single spot color (typically black for text and line graphics), and a dither matrix select bit-map for use in subsequent dithering of the contone data (decompressed by the JPEG decoder). The input to the G4 Fax decoder is 2 planes of bi-level data, read from the external DRAM. The output of the G4 Fax decoder is 2 planes of decompressed bi-level data. The decompressed bi-level data is sent to the Halftoner/Compositor Unit (HCU) for the next stage in the printing pipeline. Two bi-level buffers provides the means for transferring the bi-level data between the G4 Fax decoder and the HCU. Each decompressed bi-level layer is output to two line buffers. Each buffer is capable of holding a full 12 inch line of dots at the expected maximum resolution. Having two line buffers allows one line to be read by the HCU while the other line is being written to by the G4 Fax decoder. This is important because a single bi-level line is typically less than 1600 dpi, and must therefore be expanded in both the dot and line dimensions. If the buffering were less than a full line, the G4 Fax decoder would have to decode the same line multiple times—once for each output 600 dpi dotline.

Spot color 1 is designed to allow high resolution dot data for a single color plane of the output image. While the contone layers provide adequate resolution for images, spot color 1 is targeted at applications such as text and line graphics (typically black). When used as text and line graphics, the typical compression ratio exceeds 10:1. Spot color 1 allows variable resolution up to 1600 dpi for maximum print quality. Each of the two line buffers is therefore total 2400 bytes (12 inches× 1600 dpi=19,200 bits).

The resolution of the dither matrix select map should ideally match the contone resolution. Consequently each of the two line buffers is therefore 480 bytes (3840 bits), capable of storing 12 inches at 320 dpi. When the map matches the contone resolution, the typical compression ratio exceeds 50:1.

In order to provide support for:
800 dpi spot color 1 layer (typically black)
320 dpi dither matrix select layer the decompression bandwidth requirements are 9.05 MB/sec for 1 page per second performance (regardless of whether the page width is 12 inches or 8.5 inches), and 20 MB/sec and 14.2 MB/sec for 12 inch and 8.5 inch page widths respectively during maximum printer speed performance (30,000 lines per second). Given that the decompressed data is output to a line buffer, the G4 Fax decoder can readily decompress a line from each of the outputs one at a time. The G4 Fax decoder is fed directly from the main memory via the DRAM interface. The amount of compression determines the bandwidth requirements to the external DRAM. Since G4 Fax is lossless, the complexity of the image impacts on the amount of data and hence the bandwidth. typically an 800 dpi black text/graphics layer exceeds 10:1 compression, so the bandwidth required to print 1 page per second is 0.78 MB/sec. Similarly, a typical 320 dpi dither select matrix compresses at more than 50:1, resulting in a 0.025 MB/sec bandwidth. The fastest printing speed configuration of 320 dpi for dither select matrix and 800 dpi for spot color 1 requires bandwidth of 1.72 MB/sec and 0.056 MB/sec respectively. A total bandwidth of 2 MB/sec should therefore be more than enough for the DRAM bandwidth.

The G4 Fax decoding functionality is implemented by means of a G4 Fax Decoder core. A wide variety of G4Fax Decoder cores are suitable: it can be any core with sufficient processing power to perform the required calculations and control functions fast enough. It must be capable of handling runlengths exceeding those normally encountered in 400 dpi facsimile applications, and so may require modification.

The CMYK (or CMY) contone layer is compressed to a planar color JPEG bytestream. If luminance/chrominance separation is deemed necessary, either for the purposes of table sharing or for chrominance subsampling, then CMYK is converted to YCrCb and Cr and Cb are duly subsampled. The JPEG bytestream is complete and self-contained. It contains all data required for decompression, including quantization and Huffman tables.

The JPEG decoder is responsible for performing the on-the-fly decompression of the contone data layer. The input to the JPEG decoder is up to 4 planes of contone data. This will typically be 3 planes, representing a CMY contone image, or 4 planes representing a CMYK contone image. Each color plane can be in a different resolution, although typically all color planes will be the same resolution. The contone layers are read from the external DRAM. The output of the JPEG decoder is the decompressed contone data, separated into planes. The decompressed contone image is sent to the halftoner/compositor unit (HCU) 429 for the next stage in the printing pipeline. The 4-plane contone buffer provides the means for transferring the contone data between the JPEG decoder and the HCU 429.

Each color plane of the decompressed contone data is output to a set of two line buffers (see below). Each line buffer is 3840 bytes, and is therefore capable of holding 12 inches of a single color plane's pixels at 320 ppi. The line buffering allows one line buffer to be read by the HCU while the other line buffer is being written to by the JPEG decoder. This is important because a single contone line is typically less than 1600 ppi, and must therefore be expanded in both the dot and line dimensions. If the buffering were less than a full line, the JPEG decoder would have to decode the same line multiple times—once for each output 600 dpi dotline. Although a variety of resolutions is supported, there is a tradeoff between the resolution and available bandwidth. As resolution and number of colors increase, bandwidth requirements also increase. In addition, the number of segments being targeted by the PEC chip also affects the bandwidth and possible resolutions. Note that since the contone image is processed in a planar format, each color plane can be stored at a different resolution (for example CMY may be a higher resolution than the K plane). The highest supported contone resolution is 1600 ppi (matching the printer's full dot resolution). However there is only enough output line buffer memory to hold enough contone pixels for a 320 ppi line of length 12 inches. If the full 12 inches of output was required at higher contone resolution, multiple PEC chips would be required, although it should be noted that the final output on the printer will still only be bi-level. With support for 4 colors at 320 ppi, the decompression output bandwidth requirements are 40 MB/sec for 1 page per second performance (regardless of whether the page width is 12 inches or 8.5 inches), and 88 MB/sec and 64 MB/sec for 12 inch and 8.5 inch page widths respectively during maximum printer speed performance (30,000 lines per second). Table 5 can be used to determine the bandwidth required for different resolution/color plane/page width combinations.

The JPEG decoder is fed directly from the main memory via the DRAM interface. The amount of compression determines the bandwidth requirements to the external DRAM. As the level of compression increases, the bandwidth decreases, but the quality of the final output image can also decrease. The DRAM bandwidth for a single color plane can be readily calculated by applying the compression factor to the output bandwidth shown in Table 5. For example, a single color plane at 320 ppi with a compression factor of 10:1 requires 1 MB/sec access to DRAM to produce a single page per second.

Figure 51:
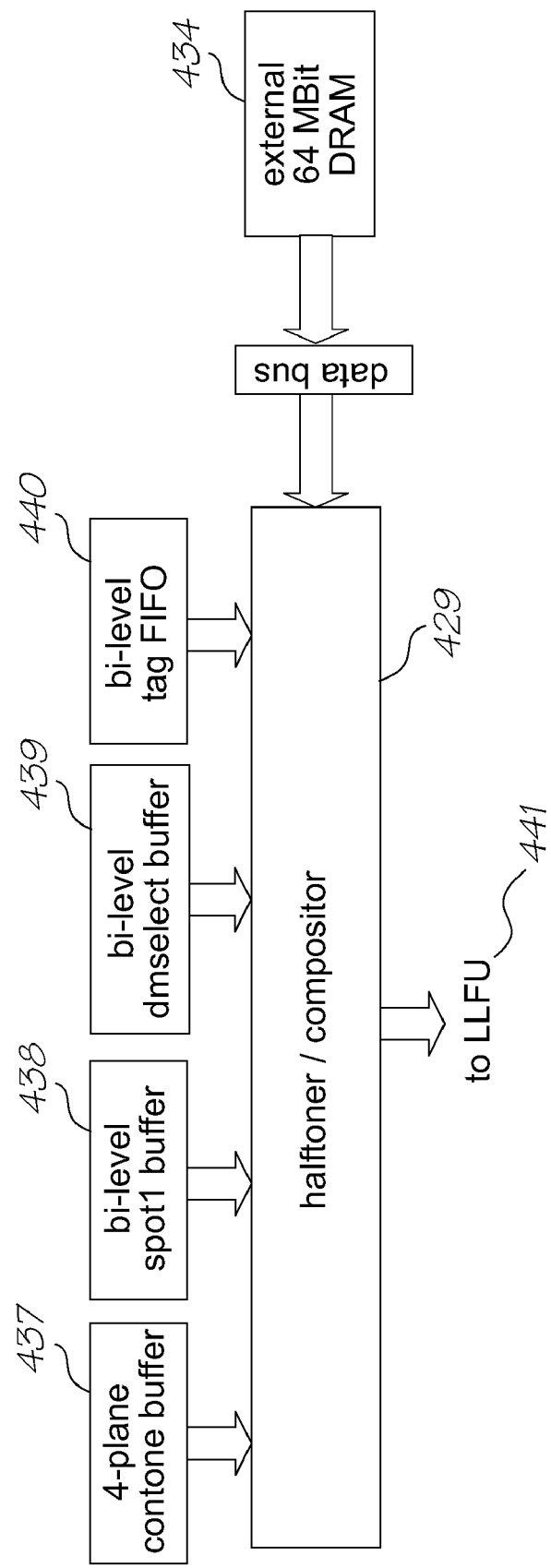
FIG. 51 illustrates the external interfaces to the halftoner/compositor unit (HCU) of FIG. 50.

The JPEG functionality is implemented by means of a JPEG core. A wide variety of JPEG cores are suitable: it can be any JPEG core with sufficient processing power to perform the required calculations and control functions fast enough. For example, the BTG X-Match core has decompression speeds up to 140 MBytes/sec, which allows decompression of 4 color planes at contone resolutions up to 400 ppi for the maximum printer speed (30,000 lines at 1600 dpi per second), and 800 ppi for 1 page/sec printer speed. Note that the core needs to only support decompression, reducing the requirements that are imposed by more generalized JPEG compression/decompression cores. The size of the core is expected to be no more than 100,000 gates. Given that the decompressed data is output to a line buffer, the JPEG decoder can readily decompress an entire line for each of the color planes one at a time, thus saving on context switching during a line and simplifying the control of the JPEG decoder. 4 contexts must be kept (1 context for each color plane), and includes current address in the external DRAM as well as appropriate JPEG decoding parameters In FIG. 51 the halftoner/compositor unit (HCU) 429 combines the functions of halftoning the contone (typically CMYK) layer to a bi-level version of the same, and compositing the spot1 bi-level layer over the appropriate halftoned contone layer(s). If there is no K ink in the printer, the HCU 429 is able to map K to CMY dots as appropriate. It also selects between two dither matrices on a pixel by pixel basis, based on the corresponding value in the dither matrix select map. The input to the HCU 429 is an expanded contone layer (from the JPEG decoder unit) through buffer 437, an expanded bi-level spot1 layer through buffer 438, an expanded dither-matrix-select bitmap at typically the same resolution as the contone layer through buffer 439, and tag data at full dot resolution through buffer 440. The HCU 429 uses up to two dither matrices, read from the external DRAM 434. The output from the HCU 429 to the line loader/format unit (LLFU) at 441 is a set of printer resolution bi-level image lines in up to 6 color planes. Typically, the contone layer is CMYK or CMY, and the bi-level spot1 layer is K.

Figure 52:
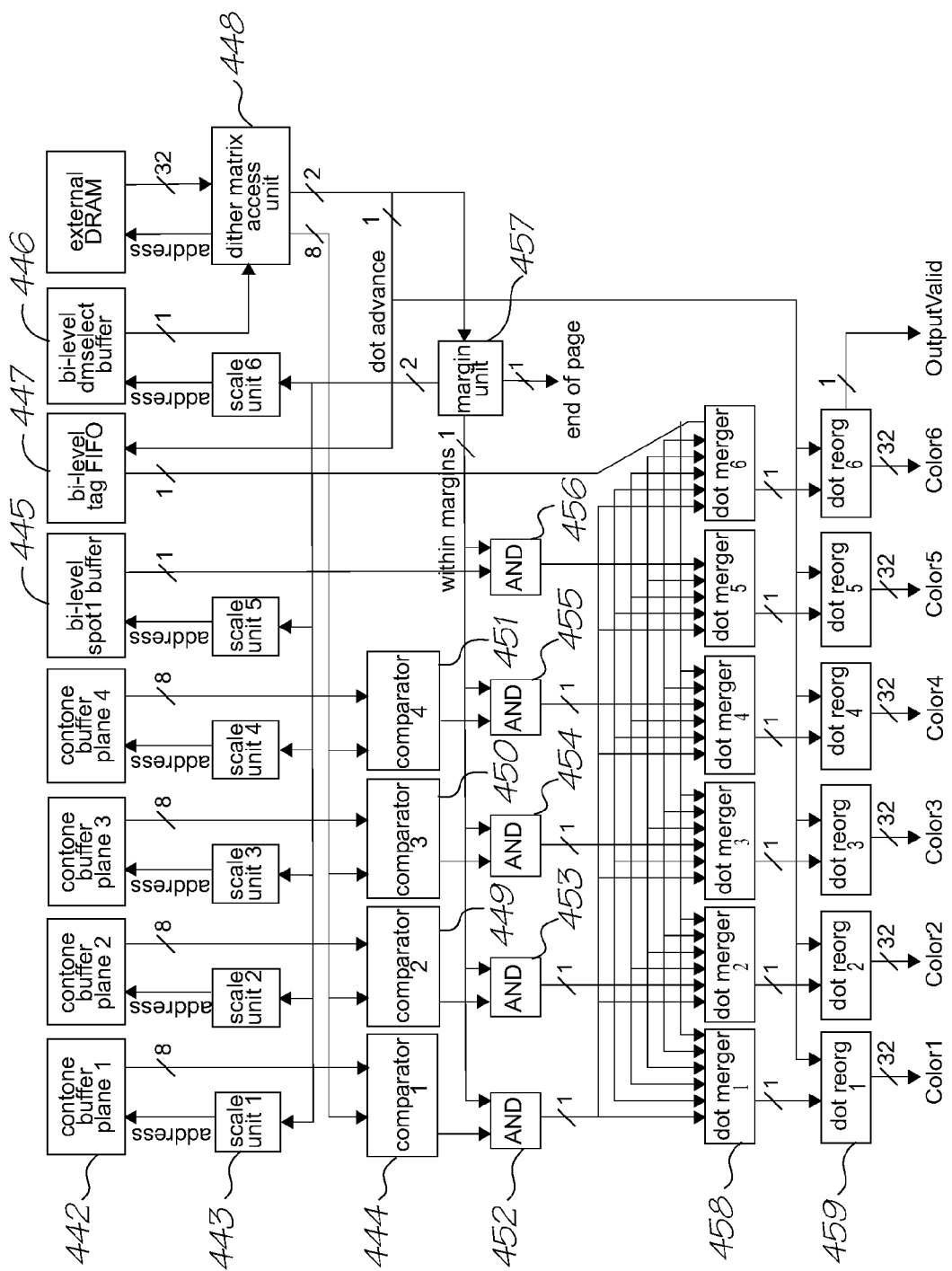
FIG. 52 is a diagram showing internal circuitry to the HCU of FIG. 51.

In FIG. 52 is seen the HCU in greater detail. Once started, the HCU proceeds until it detects an end-of-page condition, or until it is explicitly stopped via its control register. The first task of the HCU is to scale, in the respective scale units such as the scale unit 443, all data, received in the buffer planes such as 442, to printer resolution both horizontally and vertically. The scale unit provides a means of scaling contone or bi-level data to printer resolution both horizontally and vertically. Scaling is achieved by replicating a data value an integer number of times in both dimensions. Processes by which to scale data will be familiar to those skilled in the art. Since each of the contone layers can be a different resolution, they are scaled independently. The bi-level spot1 layer at buffer 445 and the dither matrix select layer at buffer 446 also need to be scaled. The bi-level tag data at buffer 447 is established at the correct resolution and does not need to be scaled. The scaled-up dither matrix select bit is used by the dither matrix access unit 448 to select a single 8-bit value from the two dither matrices. The 8-bit value is output to the 4 comparators 444, and 449 to 451, which simply compare it to the specific 8-bit contone value. The generation of an actual dither matrix is dependent on the structure of the printhead and the general processes by which to generate one will be familiar to those skilled in the art. If the contone value is greater than or equal to the 8-bit dither matrix value a 1 is output. If not, then a 0 is output. These bits are then all ANDed at 452 to 456 with an in Page bit from the margin unit 457 (whether or not the particular dot is inside the printable area of the page). The final stage in the HCU is the compositing stage. For each of the 6 output layers there is a single dot merger unit, such as unit 458, each with 6 inputs. The single output bit from each dot merger unit is a combination of any or all of the input bits. This allows the spot color to be placed in any output color plane (including infrared for testing purposes), black to be merged into cyan, magenta and yellow (if no black ink is present in the printhead), and tag dot data to be placed in a visible plane. A fixative color plane can also be readily generated. The dot reorg unit (DRU) 459 is responsible for taking the generated dot stream for a given color plane and organizing it into 32-bit quantities so that the output is in segment order, and in dot order within segments. Minimal reordering is required due to the fact that dots for overlapping segments are not generated in segment order.

Two control bits are provided to the scale units by the margin unit 457: advance dot and advance line. The advance dot bit allows the state machine to generate multiple instances of the same dot data (useful for page margins and creating dot data for overlapping segments in the Memjet printhead). The advance line bit allows the state machine to control when a particular line of dots has been finished, thereby allowing truncation of data according to printer margins. It also saves the scale unit from requiring special end-of-line logic.

The comparator unit contains a simple 8-bit "greater-than-or-equal" comparator. It is used to determine whether the 8-bit contone value is greater than or equal to the 8-bit dither matrix value. As such, the comparator unit takes two 8-bit inputs and produces a single 1-bit output.

Figure 53:
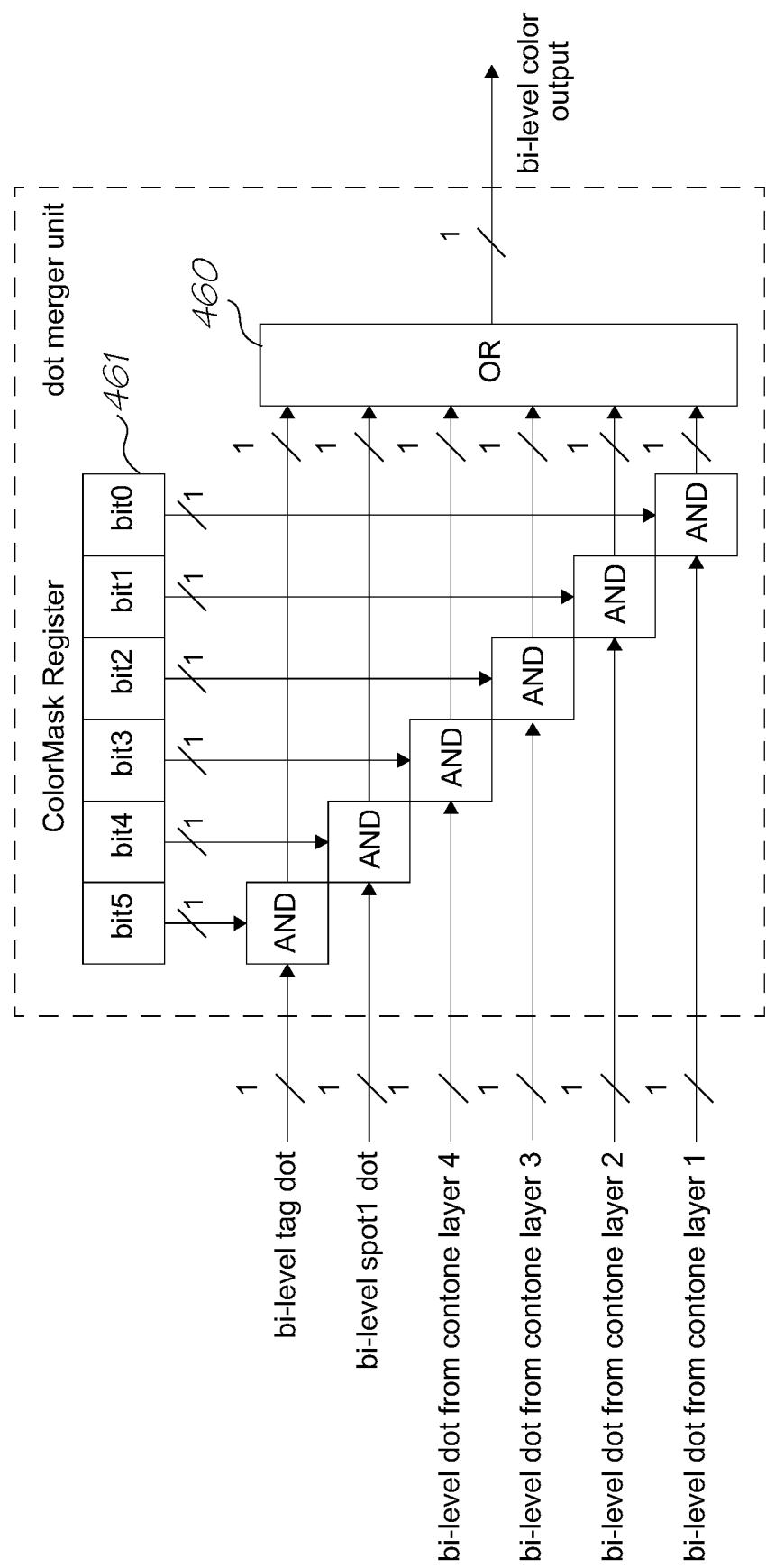
FIG. 53 shows a block diagram illustrating the process within the dot merger unit of FIG. 52.

In FIG. 53 is seen more detail of the dot merger unit. It provides a means of mapping the bi-level dithered data, the spot1 color, and the tag data to output inks in the actual printhead. Each dot merger unit takes 6 1-bit inputs and produces a single bit output that represents the output dot for that color plane. The output bit at 460 is a combination of any or all of the input bits. This allows the spot color to be placed in any output color plane (including infrared for testing purposes), black to be merged into cyan, magenta and yellow (in the case of no black ink in the printhead), and tag dot data to be placed in a visible plane. An output for fixative can readily be generated by simply combining all of the input bits. The dot merger unit contains a 6-bit ColorMask register 461 that is used as a mask against the 6 input bits. Each of the input bits is ANDed with the corresponding ColorMask register bit, and the resultant 6 bits are then ORed together to form the final output bit.

Figure 54:
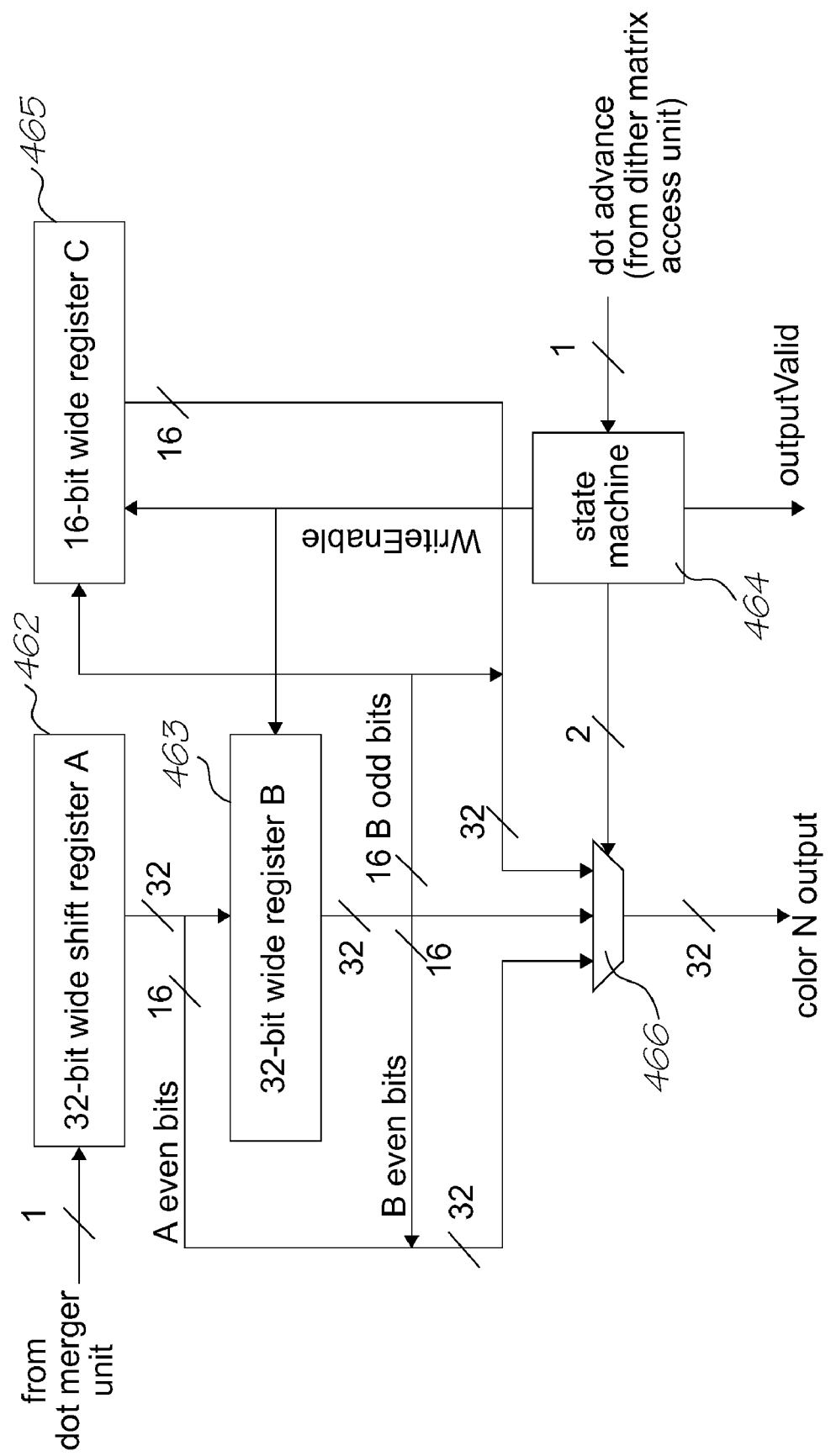
FIG. 54 shows a diagram illustrating the process within the dot reorganization unit of FIG. 52.

In FIG. 54 is seen the dot reorg unit (DRU) which is responsible for taking the generated dot stream for a given color plane and organizing it into 32-bit quantities so that the output is in segment order, and in dot order within segments. Minimal reordering is required due to the fact that dots for overlapping segments are not generated in segment order. The DRU contains a 32-bit shift register, a regular 32-bit register, and a regular 16-bit register. A 5-bit counter keeps track of the number of bits processed so far. The dot advance signal from the dither matrix access unit (DMAU) is used to instruct the DRU as to which bits should be output.

In FIG. 54 register(A) 462 is clocked every cycle. It contains the 32 most recent dots produced by the dot merger unit (DMU). The full 32-bit value is copied to register(B) 463 every 32 cycles by means of a WriteEnable signal produced by the DRU state machine 464 via a simple 5-bit counter. The 16 odd bits (bits 1, 3, 5, 7 etc.) from register(B) 463 are copied to register(C) 465 with the same WriteEnable pulse. A 32-bit multiplexor 466 then selects between the following 3 outputs based upon 2 bits from the state machine:

The full 32 bits from register B

A 32-bit value made up from the 16 even bits of register A (bits 0, 2, 4, 6 etc.) and the 16 even bits of register B. The 16 even bits from register A form bits 0 to 15, while the 16 even bits from register B form bits 16-31.

A 32-bit value made up from the 16 odd bits of register B (bits 1, 3, 5, 7 etc.) and the 16 bits of register C. The bits of register C form bits 0 to 15, while the odd bits from register B form bits 16-31.

The state machine for the DRU can be seen in Table 1. It starts in state 0. It changes state every 32 cycles. During the 32 cycles a single noOverlap bit collects the AND of all the dot advance bits for those 32 cycles (noOverlap=dot advance for cycle 0, and noOverlap=noOverlap AND dot advance for cycles 1 to 31).

TABLE 1

State machine for DRU

| state | NoOverlap | Output | output Valid | Comment | Next state |
|---|---|---|---|---|---|
| 0 | X | B | 0 | Startup state | 1 |
| 1 | 1 | B | 1 | Regular non-overlap | 1 |
| 1 | 0 | B | 1 | A contains first overlap | 2 |
| 2 | X | Even A, even B | 1 | A contains second overlap B contains first overlap | 3 |
| 3 | X | C, odd B | 1 | C contains first overlap B contains second overlap | 1 |

The margin unit (MU) 457, in FIG. 52, is responsible for turning advance dot and advance line signals from the dither matrix access unit (DMAU) 448 into general control signals based on the page margins of the current page. It is also responsible for generating the end of page condition. The MU keeps a counter of dot and line across the page. Both are set to 0 at the beginning of the page. The dot counter is advanced by 1 each time the MU receives a dot advance signal from the DMAU. When the MU receives a line advance signal from the DMAU, the line counter is incremented and the dot counter is reset to 0. Each cycle, the current line and dot values are compared to the margins of the page, and appropriate output dot advance, line advance and within margin signals are given based on these margins. The DMAU contains the only substantial memory requirements for the HCU.

Apart from being implicitly defined in relation to the printable page area, each page description is complete and self-contained. There is no data stored separately from the page description to which the page description refers. PEC relies on dither matrices and tag structures to have already been set up, but these are not considered to be part of a general page format.

The page description consists of a page header which describes the size and resolution of the page, followed by one or more page bands which describe the actual page content.

Table 2 shows the format of the page header.

TABLE 2

Page header format

| Field | format | Description |
|---|---|---|
| Signature | 16-bit integer | Page header format signature. |
| Version | 16-bit integer | Page header format version number. |
| structure size | 16-bit integer | Size of page header. |
| target resolution (dpi) | 16-bit integer | Resolution of target page. This is always 1600 for the present printer. |
| target page width | 16-bit integer | Width of target page, in dots. |
| target page height | 16-bit integer | Height of target page, in dots. |
| target left margin | 16-bit integer | Width of target left margin, in dots. |
| target top margin | 16-bit integer | Height of target top margin, in dots. |
| tag flags | 16-bit integer | Bit 0 specifies whether to generate tags for this page (0 = no, 1 = yes). Bit 1 specifies the tag orientation (0 = portrait, 1 = landscape). Bit 2 specifies whether the fixed tag data should be redundantly encoded by PEC or directly used (0 = directly use, 1 = encode). Bit 3 specifies whether the variable tag data should be redundantly encoded by PEC or directly used (0 = directly use, 1 = encode). The remaining bits are reserved. |
| fixed tag data | 128-bit integer | This is only valid if the generate tags flag is set (bit 0 of tag flags). If bit 1 of tag flags is clear, then the lower 120 bits of fixed tag data contain the pre-encoded fixed data. If bit 1 of tag flags is set, then the lower 40 bits contain the unencoded fixed data that is to be encoded by PEC. The upper 8 bits are reserved. |
| black scale factor | 16-bit integer | Scale factor from black bi-level resolution to target resolution (must be 1 or greater). |
| black page width | 16-bit integer | Width of black page, in black pixels. |

TABLE 2-continued

Page header format

| Field | format | Description |
|---|---|---|
| black page height | 16-bit integer | Height of black page, in black pixels. |
| contone color space | 16-bit integer | Defines the number of contone JPEG channels. Typically 3 or 4 for CMY vs CMYK. |
| contone1 scale factor | 16-bit integer | Scale factor from contone channel 1 resolution to target resolution (must be 1 or greater) |
| contone1 page width | 16-bit integer | Width of contone page, in contone1 pixels. |
| contone1 page height | 16-bit integer | Height of contone page, in contone1 pixels. |
| contone2 scale factor | 16-bit integer | Scale factor from contone channel 2 resolution to target resolution (must be 1 or greater) |
| contone2 page width | 16-bit integer | Width of contone page, in contone2 pixels. |
| contone2 page height | 16-bit integer | Height of contone page, in contone2 pixels. |
| contone3 scale factor | 16-bit integer | Scale factor from contone channel 3 resolution to target resolution (must be 1 or greater) |
| contone3 page width | 16-bit integer | Width of contone page, in contone3 pixels. |
| contone3 page height | 16-bit integer | Height of contone page, in contone3 pixels. |
| contone4 scale factor | 16-bit integer | Scale factor from contone channel 4 resolution to target resolution (must be 1 or greater) |
| contone4 page width | 16-bit integer | Width of contone page, in contone4 pixels. |
| contone4 page height | 16-bit integer | Height of contone page, in contone4 pixels. |

The page header contains a signature and version which allow the print engine to identify the page header format. If the signature and/or version are missing or incompatible with the print engine, then the print engine can reject the page. The contone color space defines how many contone layers are present, which typically is used for defining whether the contone layer is CMY or CMYK. The page header defines the resolution and size of the target page. The black and contone layers are clipped to the target page if necessary. This happens whenever the black or contone scale factors are not factors of the target page width or height. The target left and top margins define the positioning of the target page within the printable page area.

The tag parameters specify whether or not Netpage tags should be produced for this page and what orientation the tags should be produced at (landscape or portrait mode). The fixed tag data is also provided.

The black layer parameters define the pixel size of the bi-level black layer, and its integer scale factor to the target resolution. The contone layer parameters define the pixel size of each of the four contone layers and their integer scale factor to the target resolution.

Table 3 shows the format of the page band header.

TABLE 3

Page band header format

| Field | format | description |
|---|---|---|
| Signature | 16-bit integer | Page band header format signature. |
| Version | 16-bit integer | Page band header format version number. |

TABLE 3-continued

Page band header format

| Field | format | description |
|---|---|---|
| Structure size | 16-bit integer | Size of page band header. |
| Black band height | 16-bit integer | Height of black band, in black pixels. |
| Black band data size | 32-bit integer | Size of black band data, in bytes. |
| Contone band height | 16-bit integer | Height of contone band, in contone pixels. |
| contone band data size | 32-bit integer | Size of contone band data, in bytes. |
| dither matrix select map band data size | 32-bit integer | Size of dither matrix select map band data, in bytes. If the size = 0 only one dither matrix is used. |
| Tag band data size | 32-bit integer | Size of unencoded tag data band, in bytes. Can be 0 which indicates that no tag data is provided. |

The black (bi-level) layer parameters define the height of the black band, and the size of its compressed band data. The variable-size black data follows the page band header. The contone layer parameters define the height of the contone band, and the size of its compressed page data, consisting of the contone color data and the associated bi-level dither matrix select map. The variable-size contone data follows the black data. The variable-size bi-level dither matrix select map data follows the contone data.

The tag band data is the set of tag data half-lines as required by the tag encoder. The format of the tag data is found below. The tag band data follows the dither matrix select map.

Table 4 shows the format of the variable-size compressed band data which follows the page band header.

TABLE 4

Page band data format

| Field | format | description |
|---|---|---|
| black data | G4Fax bytestream | Compressed bi-level black data. |
| contone data | JPEG bytestream | Compressed contone CMYK or CMY data. |
| dither matrix select map | G4Fax bytestream | Compressed bi-level dither matrix select map data. |
| tag data map | bitmap | Tag data format. See Section 9.2.2. |

Each variable-size segment of band data is aligned to an 8-byte boundary.

The tag encoder (TE) 430 in FIG. 50, provides functionality for tag-enabled applications, and it typically requires the presence of IR ink at the print head (although K ink or other might be used for tags in limited circumstances). The TE encodes fixed data for the page being printed, together with specific tag data values into an error-correctable encoded tag which is subsequently printed in infrared or black ink on the page. The TE might place tags on a triangular grid (see FIG. 55), allowing for both landscape and portrait orientations. Basic tag structures are rendered at 1600 dpi, while tag data might be encoded as arbitrarily shaped macrodots (with a minimum size of 1 dot at 1600 dpi).

The TE takes the following as input:

A portrait/landscape flag
A template defining the structure of a single tag
A number of fixed data bits (fixed for the page)

A flag that defines whether or not to redundantly encode the fixed data bits or whether to treat the bits as already having been encoded A number of variable data bit records, where each record contains the variable data bits for the tags on a given line of tags A flag that defines whether or not to redundantly encode the variable data bits or whether to treat the bits as already having been encoded.

The output from the tag encoder (TE) is a 1600 dpi bi-level layer of where tag data should be printed. The output is via a 1-bit wide FIFO 447 (in FIGS. 50 and 52) which is in turn used as input by the HCU 429 in FIG. 50. The tags are subsequently preferably printed with an infrared-absorptive ink that can be read by a tag sensing device. Since black ink can be IR absorptive, limited functionality can be provided on offset-printed pages using black ink on otherwise blank areas of the page—for example to encode buttons. Alternatively an invisible infrared ink can be used to print the position tags over the top of a regular page. However, if invisible IR ink is used, care must be taken to ensure that any other printed information on the page is printed in infrared-transparent CMY ink, for black ink will obscure the infrared tags. The monochromatic scheme is preferred to maximize dynamic range in blurry reading environments.

When multiple PEC chips are used for printing the same side of a page, it is possible that a single tag will be produced by two PEC chips. This implies that the tag encoder must be able to print partial tags.

Since the tag encoder (TE) outputs 1600 dpi bi-level data, the internal workings of the TE are completely hidden from the half-toner/compositor unit (the user of tag data).

Even though the conceptual implementation of the tag encoder (TE) allows tags to have a variable structure as well as fixed and variable data components, this implementation of the TE does impose range restrictions on certain encoding parameters. Table 5 lists the encoding parameters as well as the range restrictions. However, these restrictions are a direct result of buffer sizes and the number of addressing bits, chosen for the most likely encoding scenarios. It is a simple matter to adjust the buffer sizes and corresponding addressing to allow arbitrary encoding parameters in other implementations.

TABLE 5

Encoding parameters

| Name | Definition | maximum value imposed by TE |
|---|---|---|
| W | page width | 12 inches |
| S | tag size | minimum is 2 mm × 2 mm |
| N | number of dots in each dimension of the tag | 384 dots (minimum of 92 dots given E) |
| E | Redundancy encoding for tag data | Reed-Solomon GF($2^4$) at 5:10 |
| $D_F$ | size of fixed data (unencoded) | 40 bits |
| $R_F$ | size of redundancy encoded fixed data | 120 bits |
| $D_V$ | size of variable data (unencoded) | 120 bits |
| $R_V$ | size of redundancy encoded variable data | 360 bits |
| T | tags per page width | 152 (allows for packed 2 mm × 2 mm tags) |
| M | Macrodot size | Minimum is 1 dot |

Of particular note is the fixed and variable data component in each tag. The fixed data component is the part of tag data that does not change (different to the part of the tag structure that does change). The fixed data is either read by the PEC chip in its unencoded form and encoded once within PEC, or it can is read and used as-is (the fixed data should therefore be redundantly encoded externally). The variable data bits are those data bits that are variable for each tag, and are as with fixed data, are redundancy encoded inside the TE as required or used as-is.

The mapping of data bits (both fixed and variable) to redundancy encoded bits relies heavily on the method of redundancy encoding employed. Reed-Solomon encoding was chosen for its ability to deal with burst errors and effectively detect and correct errors using a minimum of redundancy. Reed Solomon encoding is discussed in Lyppens, H., "Reed-Solomon Error Correction", Dr. Dobb's Journal Vol. 22, No. 1, January 1997, Rorabaugh, C, *Error Coding Cookbook*, McGraw-Hill 1996, and Wicker, S., and Bhargava, V., *Reed-Solomon Codes and their Applications*, IEEE Press 1994.

In the present implementation of the tag encoder (TE) is used Reed-Solomon encoding over the Galois Field GF($2^4$). Symbol size is 4 bits. Each codeword contains 15 4-bit symbols for a codeword length of 60 bits. Of the 15 symbols, 5 are original data (20 bits), and 10 are redundancy bits (40 bits). The 10 redundancy symbols mean that we can correct up to 5 symbols in error.

The total amount of original data per tag is 160 bits (40 fixed, 120 variable). This is redundancy encoded to give a total amount of 480 bits (120 fixed, 360 variable) as follows:

Each tag contains up to 40 bits of fixed original data. Therefore 2 codewords are required for the fixed data, giving a total encoded data size of 120 bits. Note that this fixed data only needs to be encoded once per page.

Each tag contains up to 120 bits of variable original data. Therefore 6 codewords are required for the variable data, giving a total encoded data size of 360 bits.

The TE writes a bi-level tag bitstream to the bi-level tag FIFO. The TE is responsible for merging the encoded tag data with the basic tag structure, and placing the dots in the output FIFO in the correct order for subsequent printing. The encoded tag data is generated from the original data bits on-the-fly to minimize buffer space.

Figure 55:
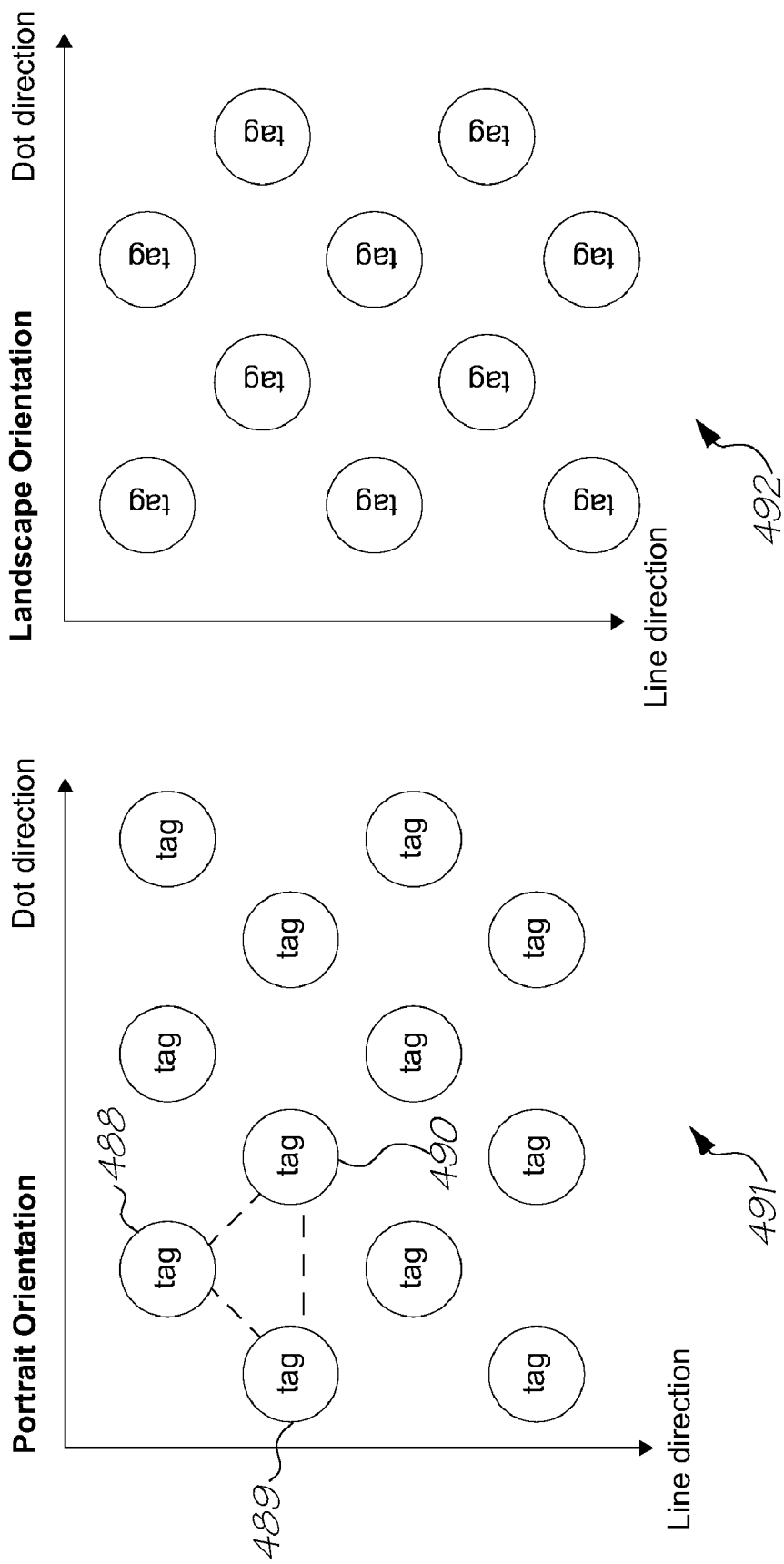
FIG. 55 illustrates a placement of tags in portrait and landscape modes.

In FIG. 55 is seen the placement of tags for portrait and landscape printing. The TE preferably places tags 488 on the page in a triangular grid arrangement, 488,489,490, accounting for both landscape 492 and portrait orientations 491. The triangular mesh of tags 488,489,490 combined with the restriction of only two printing orientations (landscape and portrait) and no overlap of columns or rows of tags means that the process of tag placement is greatly simplified.

Figure 56:
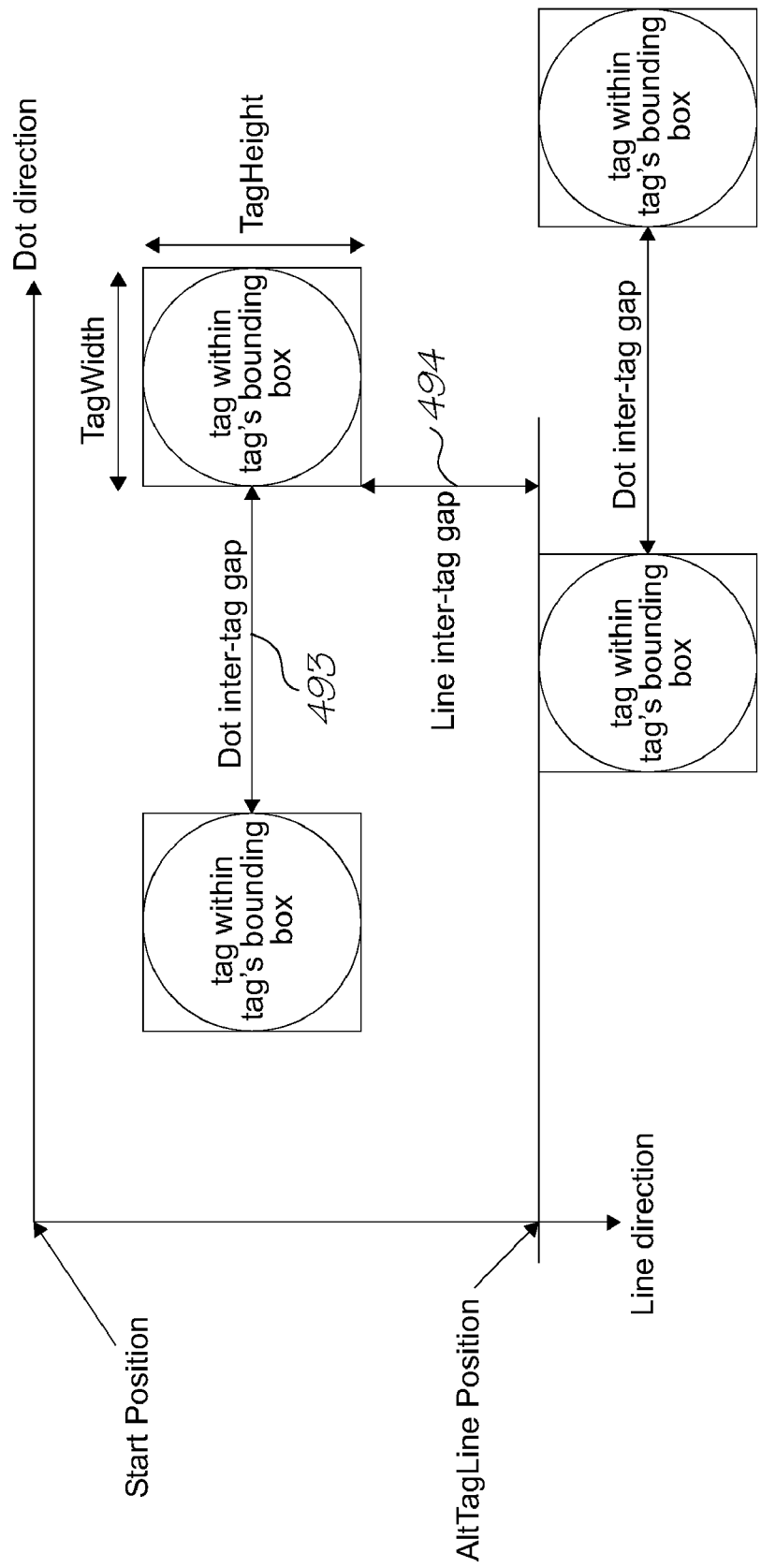
FIG. 56 represents the parameters used to define tag placement.
Figure 57:
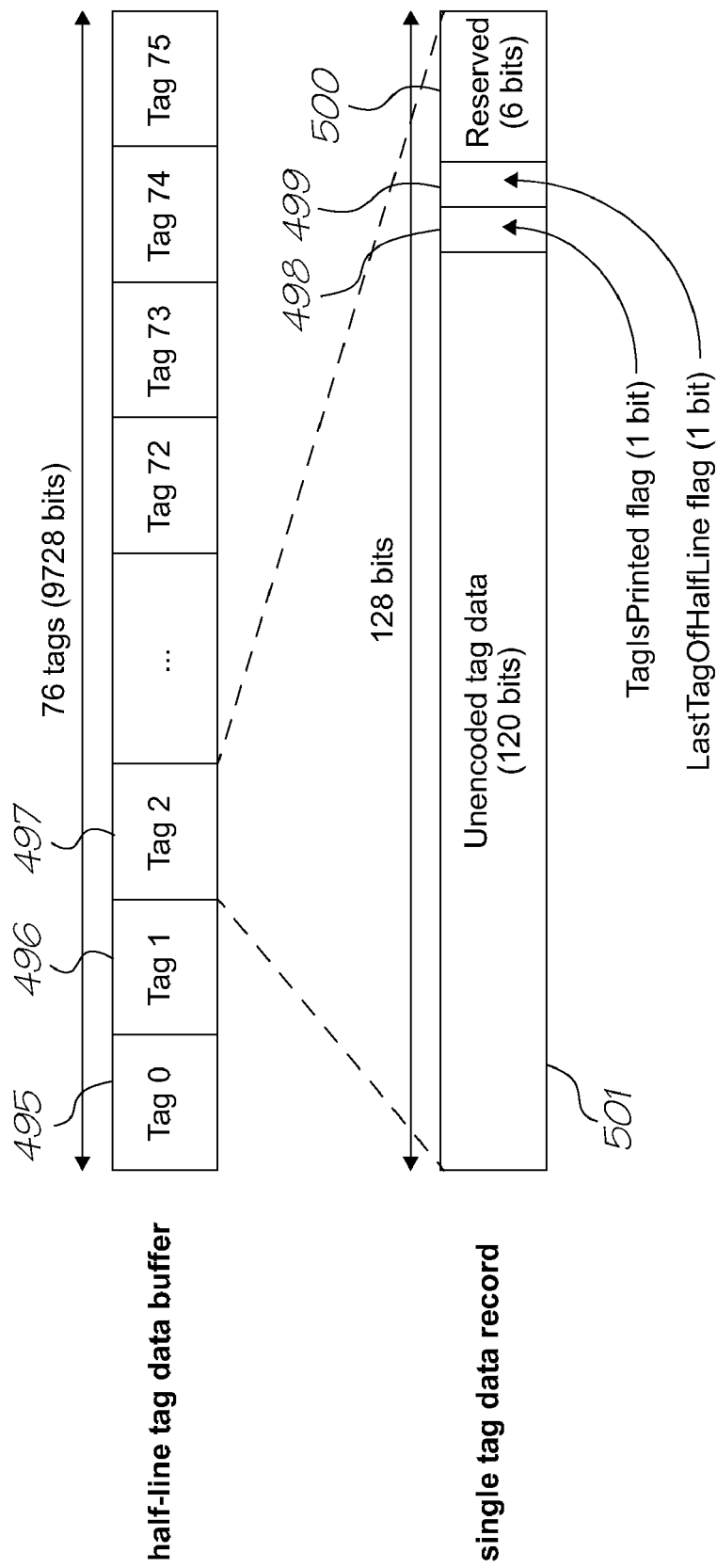
FIG. 57 indicates a half line tag data buffer structure.

In FIG. 56 is seen the general case for placement of tags therefore relies on a number of parameters. For a given line of dots, all the tags on that line correspond to the same part of the general tag structure. The triangular placement can be considered as alternative lines of tags, where one line of tags is inset by one amount in the dot dimension, and the other line of dots is inset by a different amount. The dot inter-tag gap 493 is the same in both lines of tag, and is different from the line inter-tag gap 494.

The parameters are more formally described in Table 6 and Table 7. Note that only one set of parameters are required—those for portrait printing. If the orientation changes from portrait to landscape, then tag height and tag width parameters, and general dot and line parameters are simply interchanged.

TABLE 6

Tag placement parameters

| Parameter | Description | Restrictions |
| --- | --- | --- |
| TagHeight | The number of dot lines in a tag's bounding box | minimum 1 |
| TagWidth | The number of dots in a single line of the tag's bounding box. The number of dots in the tag itself will vary depending on the shape of the tag, but the number of dots in the the bounding box will be constant (by definition). | minimum 1 |
| Dot inter-tag gap | The number of dots from the edge of one tag's bounding box to the start of the next tag's bounding box, in the dot direction. | minimum = 0 |
| Line inter-tag gap | The number of dot lines from the edge of one tag's bounding box to the start of the next tag's bounding box, in the line direction. | minimum = 0 |
| Start Position | The Current Position Record (see Table 10) for the start of the first row of dots on the page (or strip if multiple PECs are used) and the first row of tags. To increase the size of the non-tagged section beyond the size of the inter-tag gap, use non-printed tags. | see Table 10 |
| AltTagLinePosition | The Current Position record for the start of the alternate row of tags. The dot parameter is used for portrait mode printing, and the line parameter is used for landscape mode printing. | see Table |

TABLE 7

Current position record

| Name | Description |
| --- | --- |
| TagStateDot | 0 = in inter-tag gap<br>1 = in tag |
| TagStateLine | 0 = in inter-tag gap<br>1 = in tag |
| LocalOffsetDot | Current dot position within the inter-tag gap or tag, minimum = 0 |
| LocalOffsetLine | Current line position within the inter-tag gap or tag, minimum = 0 |

The TE makes use of several specific data structures:

- a TEOrientation flag, that determines whether the page is being printed using portrait or landscape tag placement rules.
- a tag format structure. A template detailing the composition of a generic tag in terms of fixed tag structure, variable data bits and fixed data bits. It is composed of a number of tag line structures, one for each 1600 dpi line in the tag. There are two tag format structures—one for portrait and one for landscape printing.
- a fixed tag data buffer. Contains the redundancy encoded fixed data component for all tags on the page (or part of a page when multiple PEC chips are used).
- a TagIsPrinted flag. Specifies whether a particular tag is to be printed or not. Directs the encoder whether to ignore the tag format structure and simply output no tag.
- a half-line tag data buffer. Contains the unencoded data and TagIsPrinted flags for the tags in half of a given line of tags (a line is the width of the strip printed by this PEC chip). If only part of a tag is printed by this PEC then the whole tag's data must be present.
- a variable tag data buffer. Contains the redundancy encoded variable data for a single tag.

The data structures are described in more detail below. Note that the sizes of the various structures are based on the tag encoding parameters as listed in Table 5. For different sets of encoding parameters the sizes of the structures and the corresponding number of address bits should be appropriately changed.

The TE supports both landscape and portrait printing. The mode is completely independent of the length of the printhead connected to the PEC. Given correct paper feed, a 12 inch printhead can print Letter and A4 pages in both landscape and portrait, and multiple PEC chips can be combined to produce arbitrary sized pages. As a result the TE contains a flag to determine the orientation of the tags.

TEOrientation is therefore a 1 bit flag with values as shown in Table 8.

TABLE 8

TEOrientation Register Values

| Value | Description |
| --- | --- |
| 0 | Landscape |
| 1 | Portrait |

Each 10-bit entry is interpreted independently as described by Table 9, and has no reliance on state information. This is important so that random access to the entries is possible, especially during the rendering of one side of a partial tag (spread over 2 PECs).

TABLE 9

Interpretation of 10-bit entry in Tag Line Structure

| bit 9 | Interpretation |
| --- | --- |
| 0 | This dot is part of the basic tag structure. Bit 8 contains the dot output value. The remaining 8 bits are reserved and should be set to 0. |
| 1 | This dot is derived from the data part of the tag.<br>The lower 9 bits are used to determine the actual data bit to use. If the upper 2 bits of the address are set, the remaining 7 bits are used to address the 120 bits of encoded fixed data for the page. If the upper 2 bits of the address are not both set, the full 9 bit address is used to address the 360 bits of encoded variable data for the tag. |

Since the Tag Format Structure (TFS) is line based, we have two such structures stored in the external DRAM—one for portrait orientation, and one for landscape orientation printing. The TEOrientation flag determines which of the two will be used. The two tag format structures are supplied by an external process, are stored in the external DRAM, and therefore can be arbitrarily different. In practice however, they are the same tag rotated through 90 degrees. The total memory required by a single TFS is 3840×TagHeight bits. The maximum amount of memory required is for a tag of height 384, and totals 180 KBytes. A maximum total of 360 KBytes is therefore required for the two orientations.

As seen in FIG. 55, for a given line of dots, all the tags on that line correspond to the same tag line structure. Consequently, for a given line of output dots, a single tag line structure is required, and not the entire TFS. Double buffering allows the next tag line structure to be fetched from the TFS in DRAM while the existing tag line structure is used to render the current tag line. Reading a line of tag structure data consequently consumes the same DRAM bandwidth regardless of the orientation. The entire TFS might be stored on the PEC chip, in which case the rotation could be performed on-the-fly. The memory requirements for the TFS is therefore a double buffered tag line structure on chip (totalling 3840 bits×2=7,680 bits, or 960 bytes), and up to 360 KBytes in the external DRAM for the portrait TFS and landscape TFS. In terms of bandwidth, the writing of the portrait TFS and landscape TFS only has to be done once, so is not an issue. Reading the appropriate TFS during printing however, is an issue. Assuming a worst case of adjacent tags, there is a need to read a tag line structure each output line. Each tag line structure is 480 bytes. For a maximum print speed of 30,000 lines per second, the TFS access amounts to 13.8 MB/sec.

The fixed tag data buffer is a 120-bit data buffer, addressed by 7 bits. The buffer holds the encoded fixed component of the tag data for the page. The fixed tag data buffer is written to once per page either directly from the 120 bits of original fixed data input or after the lower 40 bits of original fixed data has been Reed-Solomon encoded.

A TagIsPrinted flag specifies whether or not a particular tag should be printed. Only a single bit, this flag is double buffered for a total of 2 bits. Double buffering allows the TagIsPrinted flag for the next tag to be determined while the current tag is being rendered. TagIsPrinted is therefore a 1 bit flag with values as shown in Table 10.

TABLE 10

TagIsPrinted register values

| Value | Description |
|---|---|
| 0 | Don't print the tag. Ignore the TFS as well as tag fixed and variable data values. Output 0 for each dot within the tag bounding box. |
| 1 | Print the tag as specified by the various tag structures. |

A Half-Line Tag Data Buffer contains the unencoded variable tag data for up to a half the tags on a line. Since each line can contain a maximum of 152 tags (a tag size of 2 mm×2 mm closely packed over a length of 12 inches), each half-line tag buffer contains at most 76 tags. 128 bits are allocated to each tag 495, 496, 497 and so on as shown in FIG. 55: 120 bits of unencoded data 501, a 1 bit TagIsPrinted flag 498, a 1 bit LastTagOfHalfLine flag 499, and 6 reserved bits (set to 0) 500. The size of a single buffer is therefore 9728 bits (1216 bytes). The allocation of 1 bit to the TagIsPrinted flag 498, instead of having a magic value for the unencoded data (eg 0) means that the unencoded data is 120 bits of completely unrestricted data.

Rather than double buffering an entire line of tag data, we triple buffer a half line of tag data.

This saves 1216 bytes (compared to the double buffered full tag line), but comes with a timing restriction in that instead of having an entire line time to read the full tag line, the half-line tag data must be read in half a dotline. Note that it is important to have three half-line buffers and not just two. With only two half-line buffers the same tag data needs to be re-read as a given set of tags extends over multiple dot lines. The triple buffer allows the same two half-line tag buffers to be used multiple times (once for each line of the tag) without having to be re-read from DRAM. The third half-line tag buffer is used to load the first half of the next tag-line's data, during the processing of the current set of tags, and is used to load the second half of the next tag-line's data during the processing of the first half of the next tag-line. Note that a given tag-line's data is only read once during the entire print process. Consequently a 1-bit FirstTimeProcessed flag is associated with each half-line buffer to specify if the tags on this half-line have been processed before. The first time a given half-line is processed, the next half-line buffer is loaded from DRAM.

The tag data is arranged in DRAM in terms of half-lines. If there are N tags on a given line, each half-line stored in DRAM contains the data for N/2 tags. If N is odd, one of the half-lines will contain 1 less tag than the other. The LastTagOfHalfLine flag will be set in tag N/2 for one half line, and tag (N/2−1) for the other. Regardless, the offset from one tag half-line to the next is the same in both cases. Portrait and landscape pages balance each other out in terms of total number of tags. Assuming a worst case of adjacent 2 mm×2 mm tags, there are 76 tags per half-line, and for an 8.5 inch long page there are 107 tags in the line dimension. The size of the entire data in DRAM is therefore 1216×2×108=255 KBytes. For a print speed of 1 page per second, the bandwidth to DRAM is therefore 255 KB/sec. For a maximum print speed of 30,000 lines per second, the TFS access amounts to approximately 561 KBytes/sec.

The variable tag data buffer holds the 360 bits of encoded variable data for a single tag. The TE double buffers the variable tag data buffer for a total of 720 bits. Double buffering allows the raw 120 bits of variable data for the next tag to be redundancy encoded (if required) and stored in one variable tag data buffer while the other is being used to generate dots for the current tag. Note that if the variable tag data is not encoded by PEC, only the first 120 bits of the 360 variable data bits are valid, and it is the responsibility of the external page provider to ensure that the 120 bits of variable tag data have appropriate redundancy encoding already applied.

Figure 58:
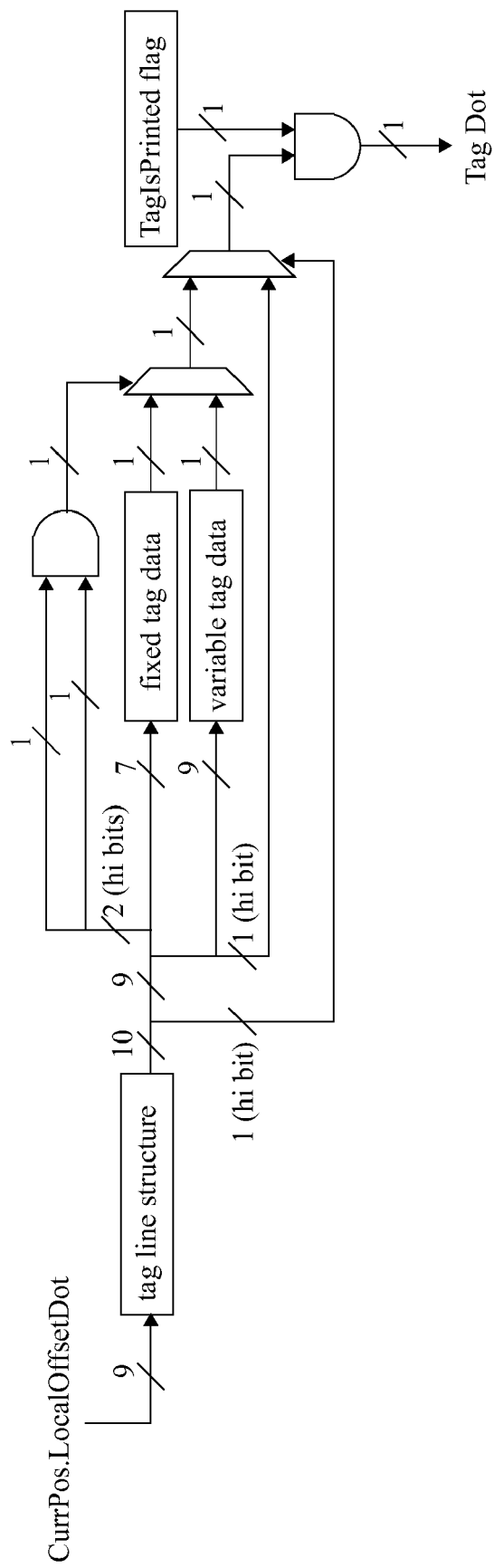
FIG. 58 shows a circuit by which to generate a single tag dot.
Figure 59:
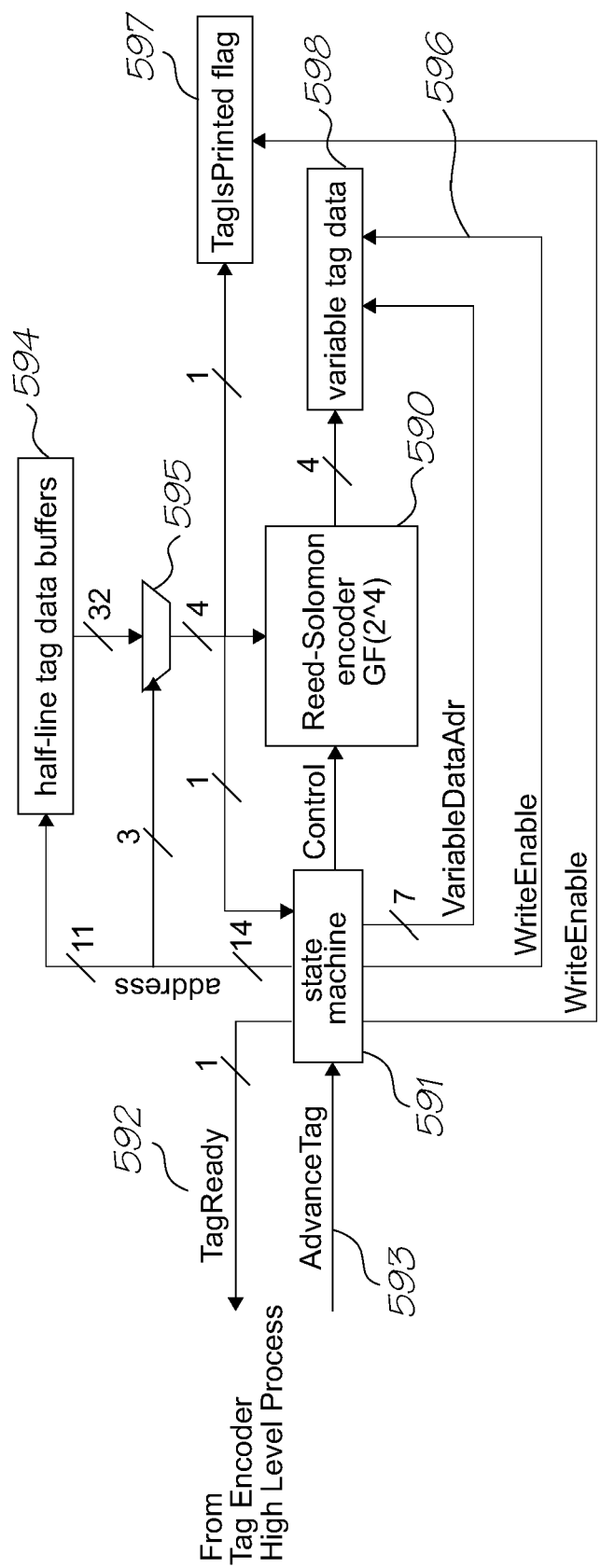
FIG. 59 shows a Reed-Solomon based circuit encoding tag data.

The variable tag data buffer shown in FIG. 58 is the current tag's variable data. While the dots for the current tag are being produced, the variable data for the next tag is being encoded to a second variable tag data buffer, as shown in FIG. 59.

Rather than store the entire tag format structure, or the variable tag data for all tags, the data is loaded from the external DRAM in a just-in-time way. Appropriate trade-offs are made between buffer sizes and transfer bandwidth. Processing ahead to ensure data is available just in time works occurs in both the dot and line directions.

As the dots for one tag are being generated in the dot direction, the variable data component for the next tag are being redundancy encoded into a second variable data buffer, and the next tag's TagIsPrinted flag is being determined. Both of these tasks involve reading the from the half-line tag data buffer, and does not involve an access to the external DRAM.

The first time a half-line tag data buffer is used, the next half-line of unencoded tag data is fetched from DRAM. Nothing is read from DRAM when a half-line of tag data is used again. Since there are 3 half-line tag buffers, two buffers can be used multiple times for a single line of tags while the data for the next half-line of tags is ready. Note that this allows each tag's unencoded data to be read from DRAM only once.

While the dots for one line of tags are being produced, the next line of the tag format structure is read from external DRAM. This is only required if the current output line is actually part of a tag. In the case of the last line of a tag the first line of the tag is reread. Nothing is read while processing an inter-tag line.

Table 11 summarizes the memory requirements for the TE, both in terms of on-chip and off-chip (external DRAM) requirements.

TABLE 11

TE memory requirements

| Name | On Chip Total Requirements | Off Chip worst case (external DRAM) |
| --- | --- | --- |
| TEOrientation | 1 bit | — |
| Tag Format Structure | 960 bytes | 360 KBytes (total) |
| Fixed tag data buffer | 120 bits | — |
| TagIsPrinted flag | 2 bits | |
| Half-line tag data buffers | 3648 bytes | 255 KBytes (per page) |
| Variable tag data buffer | 720 bits | — |
| TOTAL | 5018 bytes | |

At the highest level, a state machine in the TE steps through the output lines of a page one line at a time, with the starting position either in an inter-tag gap or in a tag (a PEC may be only printing part of a tag due to multiple PECs printing a single line). If the current position is within an inter-tag gap, an output of 0 is generated. If the current position is within a tag, the tag format structure is used to determine the value of the output dot, using the appropriate encoded data bit from the fixed or variable data buffers as necessary. The TE then advances along the line of dots, moving through tags and inter-tag gaps according to the tag placement parameters. Once the entire line of output dots has been produced, the TE advances to the next line of dots, moving through tags and inter-tag gaps according to the tag placement rules for the line direction. An output dot must be generated each cycle in order to keep up with other dot generating processes in the PEC. In pseudocode, the process is as follows. Note that the logic for accessing DRAM is not shown.

```
If (TEOrientation = Portrait)
    maxTagComponentLine[0] = LineInterTagGap
    maxTagComponentLine[1] = TagHeight
    maxTagComponentDot[0] = DotInterTagGap
    maxTagComponentDot[1] = TagWidth
    startDotOffset[0] = StartPosition.LocalOffsetDot
    startDotState[0] = StartPosition.TagStateDot
    startDotOffset[1] = AltTagLinePosition.LocalOffsetDot
    startDotState[1] = AltTagLinePosition.TagStateDot
    CurrPos.TagStateLine = StartPosition.TagStateLine
    CurrPos.LocalOffsetLine = StartPosition.LocalOffsetLine
Else
    maxTagComponentLine[0] = DotInterTagGap
    maxTagComponentLine[1] = TagWidth
    maxTagComponentDot[0] = LineInterTagGap
    maxTagComponentDot[1] = TagHeight
    startDotOffset[0] = StartPosition.LocalOffsetLine
    startDotState[0] = StartPosition.TagStateLine
    startDotOffset[1] = AltTagLinePosition.LocalOffsetLine
    startDotState[1] = AltTagLinePosition.TagStateLine
    CurrPos.TagStateLine = StartPosition.TagStateDot
    CurrPos.LocalOffsetLine = StartPosition.LocalOffsetDot
EndIf
```

Stall until the RSEncoder's output TagReady flag is set
transfer TagIsPrinted flag from RSEncoder to DotGenerator transfer variable tag data buffer from RSEncoder to DotGenerator send AdvanceTag signal to RSEncoder to begin encoding the next tag

```
tagLineType = 0
LineCount = 0
While (LineCount < MaxLine)
Do
    CurrPos.TagStateDot = startDotState[tagLineType]
    CurrPos.LocalOffsetDot = startDotOffset[tagLineType]
    DotCout = 0
    While (DotCount < MaxDot)
    Do
        If (CurrPos.TagStateLine == inInterTagGap)
            Write 0 to FIFO
        Else
            If (CurrPos.TagStateDot == inTag)
                Write (Decode TagLineStructure[CurrPos.LocalOffsetDot])
                    to FIFO
            Else
                Write 0 to FIFO
            EndIf
        increment CurrPos.LocalOffsetDot
        If (CurrPos.LocalOffsetDot >
        maxTagComponentDot[CurrPos.TagStateDot])
            CurrPos.LocalOffsetDot = 0
            CurrPos.TagStateDot = ((~currPos.TagStateDot) OR
                    (dotInterTagGap == 0))
            If (CurrPos.TagStateDot == inTag)
                transfer TagIsPrinted flag from RSEncoder to DotGenerator
                transfer variable tag data buffer from RSEncoder to
                DotGenerator
                send AdvanceTag signal to RSEncoder to begin encoding
                    the next tag
            EndIf
        EndIf
    EndIf
    increment DotCount
    EndDo
    increment lineCount
    increment CurrPos.LocalOffsetLine
    If (CurrPos.LocalOffsetLine >
    maxTagComponentLine[CurrPos.TagStateLine])
        CurrPos.TagStateLine = ((~currPos.TagStateLine) OR
            (lineInterTagGap == 0))
        CurrPos.LocalOffsetLine = 0
        If (CurrPos.TagStateLine == inTag)
            tagLineType = ~tagLineType
        EndIf
    EndIf
EndDo
```

The outputting of a single bit based upon the position within the tag depends on having access to the appropriate tag line structure, the encoded fixed and variable tag data for the current tag, and the TagIsPrinted flag for the current tag. Assuming that these have been appropriately loaded, and assuming the encoding parameters of Table 5, the generation of a single tag dot can be seen in FIG. 58 in block diagram form.

In FIG. 59 is seen a block diagram of the encoder. The TE contains a symbol-at-a-time $GF(2^4)$ Reed-Solomon encoder 590. Symbol size is 4 bits. Each codeword contains 15 4-bit symbols for a codeword length of 60 bits. Of the 15 symbols, 5 are original data (20 bits), and 10 are redundancy bits (40 bits). Since each tag contains 120 bits of variable original data, 6 codewords are required for a total encoded data size of 360 bits. The fixed tag data is also encoded using the same Reed-Solomon encoder. The fixed tag data is also encoded using the same Reed-Solomon encoder. The fixed data is constant over all tags for a given page (or strip of a page if multiple PECs are used), so only needs to be set up once before a print (or set of prints). The unencoded fixed data is 40 bits in length. These 40 bits are encoded to produce 120 bits. To encode the fixed data, the CPU loads the fixed data into the first 40 bits of the unencoded tag data buffer and then starts the state machine to encode two codewords. The resultant 120 bits in the variable tag data are then transferred to the fixed tag data buffer where they will stay for the printing of at least one page, and in most cases many pages. If the fixed data is not to be encoded by PEC then all 120 bits of the fixed data are copied directly to the fixed tag data buffer. The state machine 591 is responsible for producing the addressing and control signals for encoding the tag data. Table 13 shows the registers used to program the state machine 591.

The TagReady flag is cleared at 592 by the state machine 591 at startup, and subsequently whenever the AdvanceTag signal is received at 593. The flag is set once the entire set of codewords has been appropriately Reed-Solomon encoded. The TagReady flag allows external users of the encoded data to stall appropriately.

To produce an encoding of 5:10 symbols, the state machine 591 gates 4-bit data at 595 from the appropriate half-line tag buffer 594 into the symbol-width Reed-Solomon decoder 590. A clock-data signal is supplied for the first 5 clocks, and the inverse of that is supplied for the next 10. This is repeated NumberOfCodewords times. 90 clocks are therefore required to encode the entire tag data (6 codewords×15 clocks). A further 2 clocks are required to skip over the remaining 8 bits, thus taking the total to 92 cycles. The state machine 591 sets the TagReady flag at 592, and stalls until the Advance signal on 593 is given from the TE's high level process (the time taken for this signal to be given will depend on the width of the tag. A tag size of 92 gives a minimum delay). On the first of these last 2 clocks, a WriteEnable signal is generated on 596 so that the TagIsPrinted flag 597 is set to the 1st bit of 4 read from the unencoded tag data buffer 594 (bit 121 of tag data). During the same clock, the 2nd bit of 4 is passed to the state machine. This 2nd bit, called LastTagInHalfLine determines whether the tag just processed is in fact the last tag to be processed in the half-line buffer.

The address generated by the state machine 591 for the half-line tag buffer 594 is 14 bits. The high 2 bits select which of the 3 data buffers are addressed. The next 9 bits determine which 32-bit quantity to read from the buffer, and the lower 3 bits are used to determine which of the 8 sets of 4-bits should be selected. Of the 14 address bits, the lower 12-bit address starts at 0, and increments each cycle until it has advanced 32 times. The counter then stalls until the AdvanceTag signal on 593 comes in from the high level encoding process. If however, the LastTagInHalfLine flag is set (read as bit 122 from the latest processed tag), then the lower 12-bit address is cleared to 0, the tag half-line buffer 2-bit index is updated, and the load process for the next half-line of tag data from DRAM is potentially started.

The state machine 591 keeps a 10-bit TagLineCounter for the number of half-lines processed for this full tag line. The TagLineCounter is cleared at startup, and then incremented each time the state machine finishes encoding a tag whose LastTagInHalfLine flag is set. When the TagLineCounter is incremented, the 10 bits are used to determine the new value for the half-line index as well as potentially resetting the TagLineCounter itself. When in the first half of the line (the lowest bit of TagLineCounter=0), the next half-line buffer will always be the second half-line of the same tag line. This simply means updating the 2-bit index. When in the second half of the line (the lowest bit of TagLineCounter=1), the next half line depends on whether we have finished processing this tag line or not. If we have not finished processing the tag line (the 9 highest bits of TagLineCounter don't match either TagHeight or TagWidth, depending on the value in TEOrientation), the next half-line is the same as the previous half-line. If we have finished the tag line, the next half-line comes from the next line, and therefore we use the next tag line's half-line buffer. Since we are starting a new tag line, the counter is cleared to 0 as well. Table 12 shows the relationship between old and new counter and half-line buffer indexes.

TABLE 12

What to do when LastTagInHalfLine is set

| Lo bit of TagLineCounter | Upper bits of TagLineCounter = tag height | Current Index Value | Next Index Value | Clear Counter? |
|---|---|---|---|---|
| $0^{10}$ | $X^{11}$ | 0 | 1 | No |
| 0 | X | 1 | 2 | No |
| 0 | X | 2 | 0 | No |
| $1^{12}$ | 0 | 0 | 2 | No |
| 1 | 0 | 1 | 0 | No |
| 1 | 0 | 2 | 1 | No |
| 1 | 1 | 0 | 1 | Yes |
| 1 | 1 | 1 | 2 | Yes |
| 1 | 1 | 2 | 0 | Yes |

[10] signifies first half of line
[11] don't care state
[12] signifies second half of line Whenever the index value changes, the old index is kept and the FirstTimeProcessed flag for the half-line buffer associated with the new index is checked. If the FirstTimeProcessed flag is clear, nothing more is done. However, if the FirstTimeProcessed flag is set, it is cleared and the process of reading the next set of data for the next half-line from DRAM into the half-line specified by the old index is started. The FirstTimeProcessed flag for the half-line associated with the old index is then set. The number of 32-bit words to be read from DRAM is specified by the HalfLineSize register, as described in Table 13. The current address for reading tag half lines is then incremented by HalfLineSize so that it is pointing at the next half-line to be read. This scheme causes a single half-line to be read in anticipation at the end of the page. Since the data is not sent to the page, it does not matter.

TABLE 13

Registers for manipulating tag's variable data

| Parameter | Description | Typical Value |
|---|---|---|
| DataSymbols | The number of data symbols in an output codeword | 5 |
| RedundancySymbols | The number of redundancy symbols in an output codeword | 10 |
| NumberOfCodeWords | The number of codewords to encode | 6 |
| HalfLineSize | The number of 32-bit quantities in a half-line of variable tag data to be loaded from DRAM | 304 |
| EncodeSelect | If this bit is set, then data is Reed-Solomon encoded. If clear, the data is merely copied. | 1 |

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A printer comprising:
   a media path along which media is transported;
   at least one pagewidth printhead arranged to print on the media on the media path; and
   a binder arranged on the media path for binding the printed media,
   wherein the printhead and the binder are arranged so that the media path is substantially straight.

2. A printer as claimed in claim 1, further comprising a collector arranged on the media path to receive the bound printed media from the binder.

3. A printer as claimed in claim 2, wherein the collector incorporates a retractable tray.

4. A printer as claimed in claim 1, comprising a pair of the pagewidth printheads arranged on opposite sides of the media path so as to print on the opposite sides of the media.

5. A printer as claimed in claim 4, wherein the pair of the printheads are offset with respect to each other and the media path.

6. A printer as claimed in claim 1, wherein the binder is configured to apply binding adhesive to the printed media.

7. A printer as claimed in claim 1, further comprising a body for housing the printhead and the binder, the body having a mounting arrangement for vertical mounting of the printer.

* * * * *